(12) United States Patent
Wang et al.

(10) Patent No.: US 12,445,604 B2
(45) Date of Patent: Oct. 14, 2025

(54) METHOD, APPARATUS, AND MEDIUM FOR VIDEO PROCESSING

(71) Applicants: Beijing Bytedance Network Technology Co., Ltd., Beijing (CN); Bytedance Inc., Los Angeles, CA (US)

(72) Inventors: Yang Wang, Beijing (CN); Kai Zhang, Los Angeles, CA (US); Na Zhang, Beijing (CN); Li Zhang, Los Angeles, CA (US); Hongbin Liu, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/732,427

(22) Filed: Jun. 3, 2024

(65) Prior Publication Data
US 2024/0323352 A1    Sep. 26, 2024

Related U.S. Application Data

(63) Continuation of application No. PCT/CN2022/136321, filed on Dec. 2, 2022.

(30) Foreign Application Priority Data

Dec. 3, 2021 (WO) ................ PCT/CN2021/135449

(51) Int. Cl.
*H04N 19/105* (2014.01)
*H04N 19/139* (2014.01)
*H04N 19/176* (2014.01)

(52) U.S. Cl.
CPC ......... *H04N 19/105* (2014.11); *H04N 19/139* (2014.11); *H04N 19/176* (2014.11)

(58) Field of Classification Search
CPC .......................... H04N 19/105; H04N 19/139
See application file for complete search history.

(56) References Cited

U.S. PATENT DOCUMENTS

| | | | |
|---|---|---|---|
| 11,606,566 B2* | 3/2023 | Lee ................ | H04N 19/105 |
| 11,706,409 B2* | 7/2023 | Zhang ............. | H04N 19/105 |
| | | | 375/240.02 |

(Continued)

FOREIGN PATENT DOCUMENTS

| | | |
|---|---|---|
| CN | 110313180 A | 10/2019 |
| CN | 110662030 A | 1/2020 |

(Continued)

OTHER PUBLICATIONS

Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11 7th Meeting: Torino, IT, Jul. 2017, pp. 1-50.

(Continued)

*Primary Examiner* — Irfan Habib
(74) *Attorney, Agent, or Firm* — Astute IP Law Group

(57) ABSTRACT

Embodiments of the present disclosure provide a solution for video processing. A method for video processing is proposed. The method comprises: applying, during a conversion between a target block of a video and a bitstream of the target block, a processing procedure to at least one motion candidate in a motion candidate list; reordering the motion candidate list by applying a first reordering process to the motion candidate list after the processing procedure; and performing the conversion based on the reordered motion candidate list.

19 Claims, 33 Drawing Sheets

(56) References Cited

U.S. PATENT DOCUMENTS

| | | | | |
|---|---|---|---|---|
| 11,800,090 | B2* | 10/2023 | Zhang | H04N 19/82 |
| 11,895,321 | B2* | 2/2024 | Zhang | H04N 19/105 |
| 11,936,899 | B2* | 3/2024 | Zhang | H04N 19/513 |
| 12,015,762 | B2* | 6/2024 | Sethuraman | H04N 19/154 |
| 12,069,289 | B2* | 8/2024 | Chuang | H04N 19/139 |
| 2019/0342557 | A1 | 11/2019 | Robert et al. | |
| 2020/0068218 | A1* | 2/2020 | Chen | H04N 19/82 |
| 2020/0296414 | A1 | 9/2020 | Park et al. | |
| 2021/0014522 | A1* | 1/2021 | Jung | H04N 19/176 |
| 2021/0037238 | A1* | 2/2021 | Park | H04N 19/105 |
| 2021/0120262 | A1* | 4/2021 | Chen | H04N 19/513 |
| 2024/0364904 | A1* | 10/2024 | Kang | H04N 19/44 |

FOREIGN PATENT DOCUMENTS

| | | | |
|---|---|---|---|
| CN | 113273186 | A | 8/2021 |
| CN | 113330739 | A | 8/2021 |
| CN | 114175656 | A | 3/2022 |
| GB | 2611367 | A | 4/2023 |
| WO | 2019066602 | A1 | 4/2019 |
| WO | 2019244669 | A1 | 12/2019 |

OTHER PUBLICATIONS

Esenlik et al., "CE9: DMVR with Bilateral Matching (Test2.9)", Joint Video Experts Team (JVET) of ITU-T SG 16 WP 3 and ISO/IEC JTC 1/SC 29/WG 11 11th Meeting: Ljubljana, SI, Jul. 2018, pp. 1-5.

International Search Report for PCT/CN2023/084741, mailed Jul. 7, 2023, 4 pages.

International Search Report for PCT/CN2023/087694, mailed May 22, 2023, 4 pages.

Park et al., "CE9: Template matching based reordering and refining (CE9-3.7, CE9-3.8 and CE9-4.1)", Joint Video Exploration Team (JVET) of ITU-T SG 16 WP 3 and ISO/IEC JTC 1/SC 29/WVG 11 11th Meeting: Ljubljana, SL, Jul. 2018, pp. 1-10.

Zhang et al., "AHG12: Adaptive Reordering of Merge Candidates with Template Matching", Joint Video Experts Team (JVET) of ITU-T SG 16 WP 3 and ISO/IEC JTC 1/SC 29 22nd Meeting, by teleconference, Apr. 2021, pp. 1-4.

Zhang, Na., "CE9.4.3: Template Matching based Adaptive Merge Candidate Reorder", Joint Video Experts Team (JVET) of ITU-T SG 16 WP 3 and ISO/IEC JTC 1/SC 29/WG 11 11th Meeting: Ljubljana, SI, Jul. 2018, pp. 1-4.

International Search Report for PCT/CN2022/136321, mailed Feb. 16, 2023, 5 pages.

Office Action for Japanese Patent Application No. 2024-533129, mailed on Aug. 5, 2025, 8 pages.

* cited by examiner

METHOD, APPARATUS, AND MEDIUM FOR VIDEO PROCESSING

CROSS-REFERENCE TO RELATED APPLICATIONS

This application is a continuation of International Application No. PCT/CN2022/136321, filed on Dec. 2, 2022, which claims the benefit of International Application No. PCT/CN2021/135449 filed on Dec. 3, 2021. The entire contents of these applications are hereby incorporated by reference in their entireties.

FIELD

Embodiments of the present disclosure relates generally to video coding techniques, and more particularly, to motion candidate list reordering with refined motion information.

BACKGROUND

In nowadays, digital video capabilities are being applied in various aspects of peoples' lives. Multiple types of video compression technologies, such as MPEG-2, MPEG-4, ITU-TH.263, ITU-TH.264/MPEG-4 Part 10 Advanced Video Coding (AVC), ITU-TH.265 high efficiency video coding (HEVC) standard, versatile video coding (VVC) standard, have been proposed for video encoding/decoding. However, coding efficiency of video coding techniques is generally expected to be further improved.

SUMMARY

Embodiments of the present disclosure provide a solution for video processing.

In a first aspect, a method for video processing is proposed. The method comprises: applying, during a conversion between a target block of a video and a bitstream of the target block, a processing procedure to at least one motion candidate in a motion candidate list; reordering the motion candidate list by applying a first reordering process to the motion candidate list after the processing procedure; and performing the conversion based on the reordered motion candidate list. Compared with conventional technologies, a higher coding gain can be achieved. Furthermore, coding efficiency can be improved.

In a second aspect, another method for video processing is proposed. The method comprises: applying, during a conversion between a target block of a video and a bitstream of the target block, a reordering process using refined motion information to the target block that is coded with an inter mode with a decoder side motion vector refinement (DMVR), to reorder at least one of a first motion candidate list or a second motion candidate list, wherein a first set of motion candidates in the first motion candidate list are refined in one direction and a second set of motion candidates in the second motion candidate list are refined in another direction; and performing the conversion based on the at least one of the reordered first motion candidate list or the reordered second motion candidate list. Compared with conventional technologies, a higher coding gain can be achieved. Furthermore, coding efficiency can be improved.

In a third aspect, another method for video processing is proposed. The method comprises: updating, during a conversion between a target block of a video and a bitstream of the target block, at least one motion candidate list for an adaptive decoder side motion vector refinement (DMVR) by removing a set of redundant motion candidates from the at least one motion candidate list; and performing the conversion based on the at least one updated motion candidate list. Compared with conventional technologies, a higher coding gain can be achieved. Furthermore, coding efficiency can be improved.

In a fourth aspect, another method for video processing is proposed. The method comprises: generating, during a conversion between a target block of a video and a bitstream of the target block, a first number of motion candidates for a motion candidate list associated with the target block, and wherein a second number of motion candidates are allowed for the motion candidate list, and wherein the first number is larger than the second number; and performing the conversion based on the motion candidate list. Compared with conventional technologies, a higher coding gain can be achieved. Furthermore, coding efficiency can be improved.

In a fifth aspect, another method for video processing is proposed. The method comprises: generating, during a conversion between a target block of a video and a bitstream of the target block, a cost value in a refining process of a motion candidate list for the target block; applying a reordering process to the motion candidate list using the cost value; and performing the conversion based on the motion candidate list. Compared with conventional technologies, a higher coding gain can be achieved. Furthermore, coding efficiency can be improved.

In a sixth aspect, another method for video processing is proposed. The method comprises: reordering, during a conversion between a target block of a video and a bitstream of the target block, a set of merge candidates for the target block according to a set of merge types; constructing an adaptive decoder side motion vector refinement (DMVR) merge candidate list using first N merge candidates of each of the set of merge types, and wherein N is an integer number; and performing the conversion based on the constructed adaptive DMVR merge candidate list. Compared with conventional technologies, a higher coding gain can be achieved. Furthermore, coding efficiency can be improved.

In a seventh aspect, an apparatus for processing video data is proposed. The apparatus for processing video data comprises a processor and a non-transitory memory with instructions thereon, where the instructions upon execution by the processor, cause the processor to perform a method in accordance with any of the first, second, third, fourth, fifth, or sixth aspect.

In an eighth aspect, a non-transitory computer-readable storage medium is proposed. The non-transitory computer-readable storage medium stores instructions that cause a processor to perform a method in accordance with any of the first, second, third, fourth, fifth, or sixth aspect.

In a ninth aspect, a non-transitory computer-readable recording medium is proposed. The non-transitory computer-readable recording medium stores a bitstream of a video which is generated by a method performed by a video processing apparatus. The method comprises: applying a processing procedure to at least one motion candidate in a motion candidate list for the target block; reordering the motion candidate list by applying a first reordering process to the motion candidate list after the processing procedure; and generating a bitstream of the target block based on the reordered motion candidate list.

In a tenth aspect, a method for storing bitstream of a video, comprises: applying a processing procedure to at least one motion candidate in a motion candidate list for the target block; reordering the motion candidate list by applying a first reordering process to the motion candidate list after the processing procedure; generating a bitstream of the target block based on the reordered motion candidate list; and storing the bitstream in a non-transitory computer-readable recording medium.

In an eleventh aspect, another non-transitory computer-readable recording medium is proposed. The non-transitory computer-readable recording medium stores a bitstream of a video which is generated by a method performed by a video processing apparatus. The method comprises: applying a reordering process using refined motion information to a target block of the video that is coded with an inter mode with a decoder side motion vector refinement (DMVR) to reorder at least one of a first motion candidate list or a second motion candidate list, wherein a first set of motion candidates in the first motion candidate list are refined in one direction and a second set of motion candidates in the second motion candidate list are refined in another direction; and generating a bitstream of the target block based on the at least one of the reordered first motion candidate list or the reordered second motion candidate list.

In a twelfth aspect, a method for storing bitstream of a video, comprises: applying a reordering process using refined motion information to a target block of the video that is coded with an inter mode with a decoder side motion vector refinement (DMVR) to reorder at least one of a first motion candidate list or a second motion candidate list, wherein a first set of motion candidates in the first motion candidate list are refined in one direction and a second set of motion candidates in the second motion candidate list are refined in another direction; generating a bitstream of the target block based on the at least one of the reordered first motion candidate list or the reordered second motion candidate list; and storing the bitstream in a non-transitory computer-readable recording medium.

In a thirteenth aspect, another non-transitory computer-readable recording medium is proposed. The non-transitory computer-readable recording medium stores a bitstream of a video which is generated by a method performed by a video processing apparatus. The method comprises: updating at least one motion candidate list for an adaptive decoder side motion vector refinement (DMVR) of a target block of the video by removing a set of redundant motion candidates from the at least one motion candidate list; and generating a bitstream of the target block based on the at least one updated motion candidate list.

In a fourteenth aspect, a method for storing bitstream of a video, comprises: updating at least one motion candidate list for an adaptive decoder side motion vector refinement (DMVR) of a target block of the video by removing a set of redundant motion candidates from the at least one motion candidate list; generating a bitstream of the target block based on the at least one updated motion candidate list; and storing the bitstream in a non-transitory computer-readable recording medium.

In a fifteenth aspect, another non-transitory computer-readable recording medium is proposed. The non-transitory computer-readable recording medium stores a bitstream of a video which is generated by a method performed by a video processing apparatus. The method comprises: generating a first number of motion candidates for a motion candidate list associated with a target block of the video, and wherein a second number of motion candidates are allowed for the motion candidate list, and wherein the first number is larger than the second number; and generating a bitstream of the target block based on the motion candidate list.

In a sixteenth aspect, a method for storing bitstream of a video, comprises: generating a first number of motion candidates for a motion candidate list associated with a target block of the video, and wherein a second number of motion candidates are allowed for the motion candidate list, and wherein the first number is larger than the second number; generating a bitstream of the target block based on the motion candidate list; and storing the bitstream in a non-transitory computer-readable recording medium.

In a seventeenth aspect, another non-transitory computer-readable recording medium is proposed. The non-transitory computer-readable recording medium stores a bitstream of a video which is generated by a method performed by a video processing apparatus. The method comprises: generating a cost value in a refining process of a motion candidate list for a target block of the video; applying a reordering process to the motion candidate list using the cost value; and generating a bitstream of the target block based on the motion candidate list.

In an eighteenth aspect, a method for storing bitstream of a video, comprises: generating a cost value in a refining process of a motion candidate list for a target block of the video; applying a reordering process to the motion candidate list using the cost value; generating a bitstream of the target block based on the motion candidate list; and storing the bitstream in a non-transitory computer-readable recording medium.

In a nineteenth aspect, another non-transitory computer-readable recording medium is proposed. The non-transitory computer-readable recording medium stores a bitstream of a video which is generated by a method performed by a video processing apparatus. The method comprises: reordering a set of merge candidates for a target block of the video according to a set of merge types; constructing an adaptive decoder side motion vector refinement (DMVR) merge candidate list using first N merge candidates of each of the set of merge types, and wherein N is an integer number; and generating a bitstream of the target block based on the constructed adaptive DMVR merge candidate list.

In a twentieth aspect, a method for storing bitstream of a video, comprises: reordering a set of merge candidates for a target block of the video according to a set of merge types; constructing an adaptive decoder side motion vector refinement (DMVR) merge candidate list using first N merge candidates of each of the set of merge types, and wherein N is an integer number; generating a bitstream of the target block based on the constructed adaptive DMVR merge candidate list; and storing the bitstream in a non-transitory computer-readable recording medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

FIGS. 18a and 18b illustrate the SbTMVP process in VVC, wherein FIG. 15a illustrates spatial neighboring blocks used by ATVMP, and FIG. 15b illustrates deriving sub-CU motion field by applying a motion shift from spatial neighbor and scaling the motion information from the corresponding collocated sub-CUs;

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
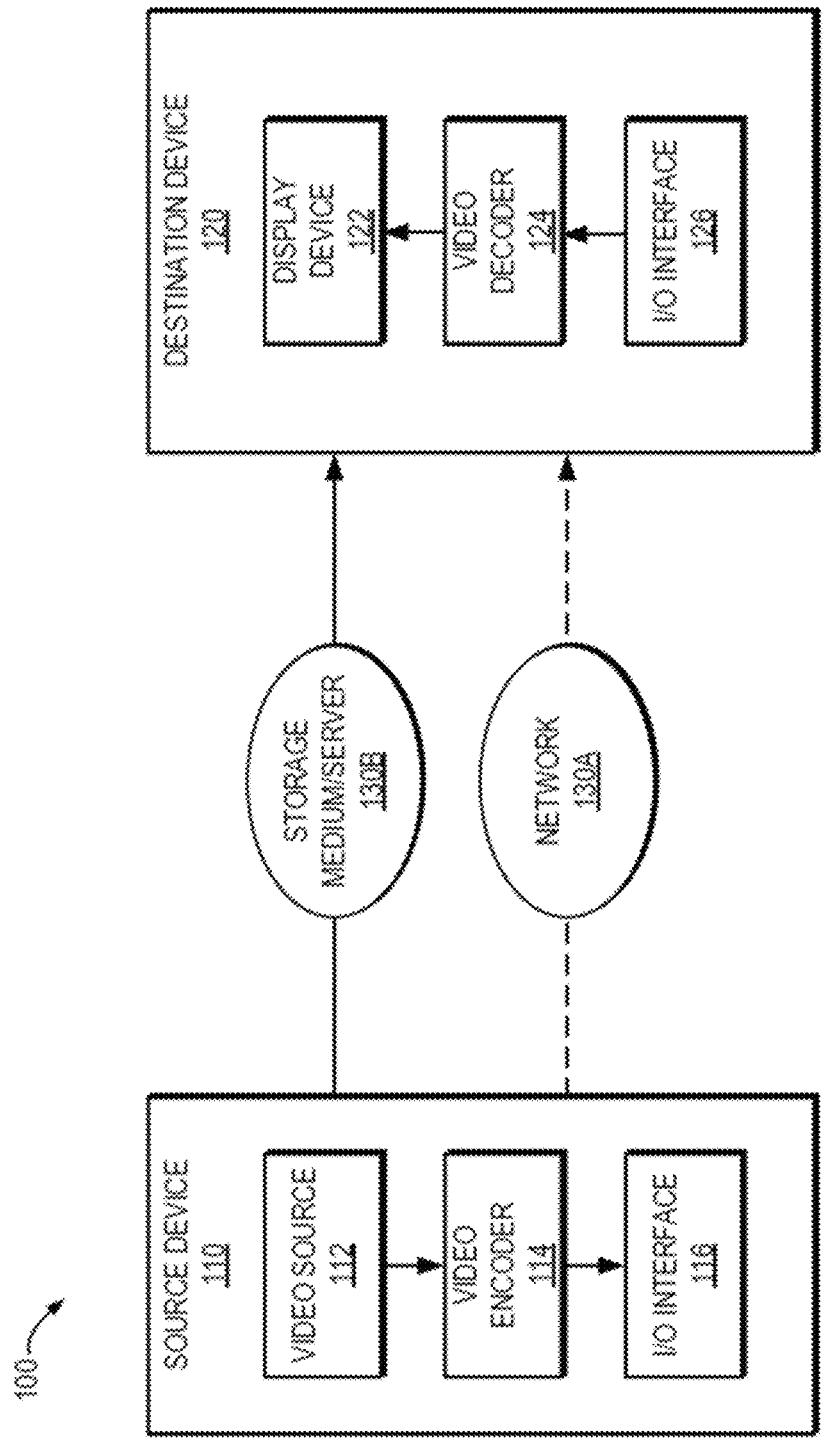
FIG. 1 illustrates a block diagram that illustrates an example video coding system, in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
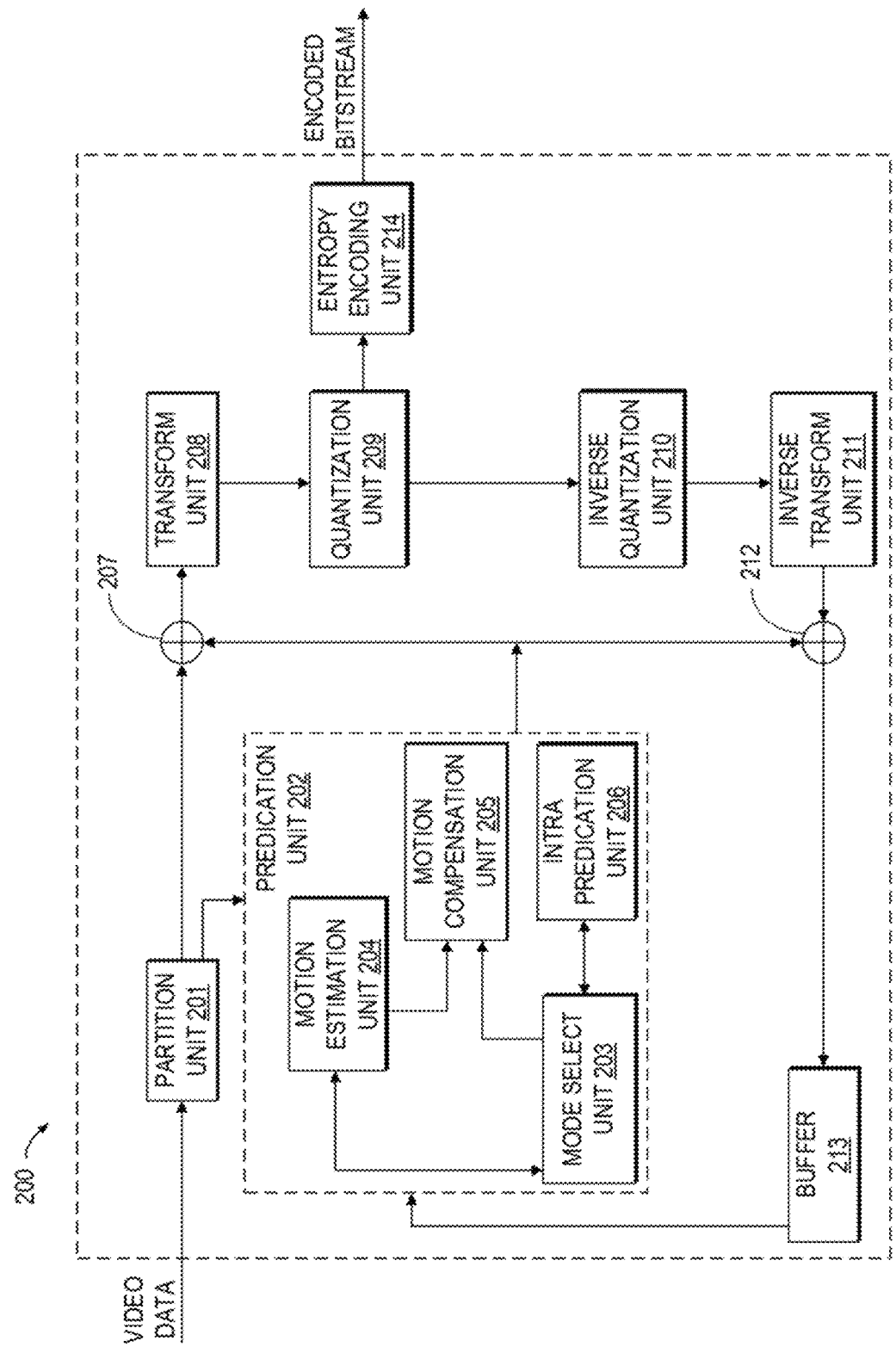
FIG. 2 illustrates a block diagram that illustrates a first example video encoder, in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter predication (CIIP) mode in which the predication is based on an inter predication signal and an intra predication signal. The mode select unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When the entropy encoding unit 214 receives the data, the entropy encoding unit 214 may perform one or more entropy encoding operations to generate entropy encoded data and output a bitstream that includes the entropy encoded data.

Figure 3:
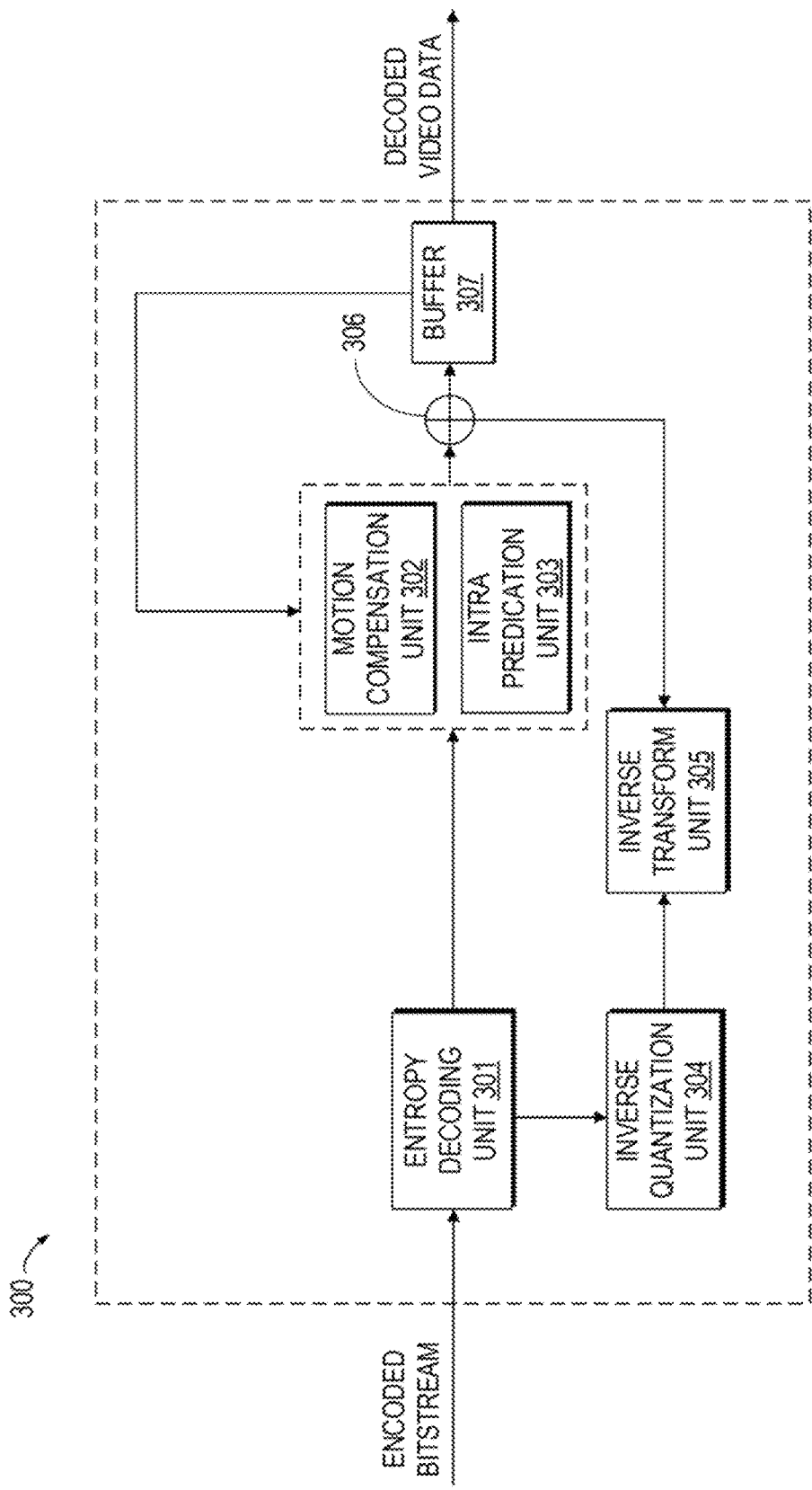
FIG. 3 illustrates a block diagram that illustrates an example video decoder, in accordance with some embodiments of the present disclosure.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by the video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes, i.e., de-quantizes, the quantized video block coefficients provided in the bitstream and decoded by entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra predication and also produces decoded video for presentation on a display device.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. SUMMARY

The present disclosure is related to video coding technologies. Specifically, it is related to motion candidate list for inter coding which reorders the motion candidate list using refined motion information, how to and/or whether to apply the reordering process of motion candidate list, and other coding tools in image/video coding. It may be applied to the existing video coding standard like HEVC, or Versatile Video Coding (VVC). It may be also applicable to future video coding standards or video codec.

2. BACKGROUND

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 10) could be found at: http://phenix.it-sud-paris.eu/jvet/doc_end_user/documents/20_Teleconference/wg11/JVET-T2001-v1.zip The latest reference software of VVC, named VTM, could be found at:

https://vcgit.hhi.fraunhofer.de/jvet/VVCSoftware_VTM/-/tags/VTM-11.0.

2.1. Coding Flow of a Typical Video Codec

Figure 4:
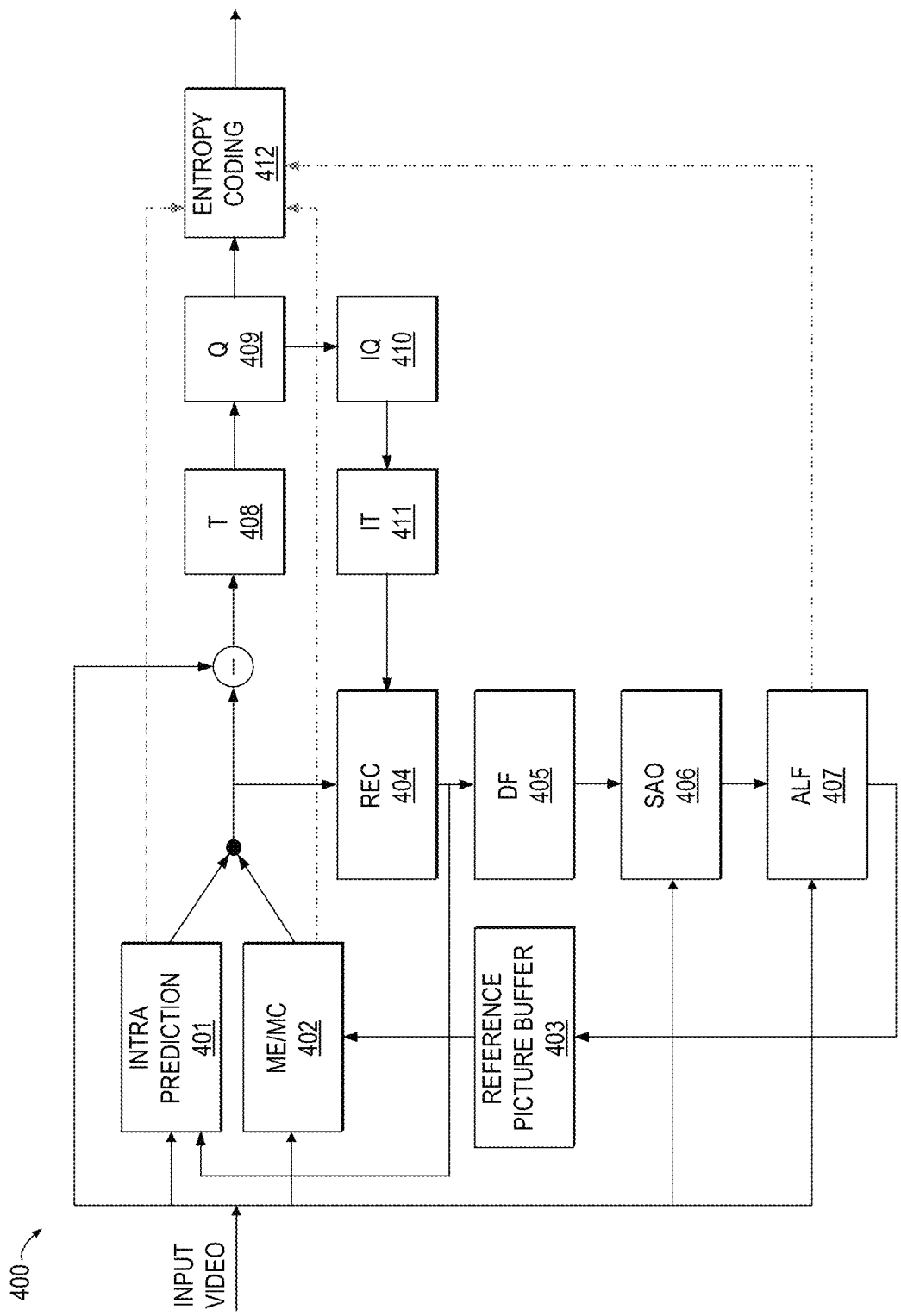
FIG. 4 illustrates a schematic diagram of example of encoder block diagram.

FIG. 4 shows an example of encoder block diagram of VVC, which contains three in-loop filtering blocks: deblocking filter (DF), sample adaptive offset (SAO) and ALF. Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signalling the offsets and filter coefficients. ALF is located at the last processing stage of each picture and can be regarded as a tool trying to catch and fix artifacts created by the previous stages.

2.2. Intra Mode Coding with 67 Intra Prediction Modes

Figure 5:
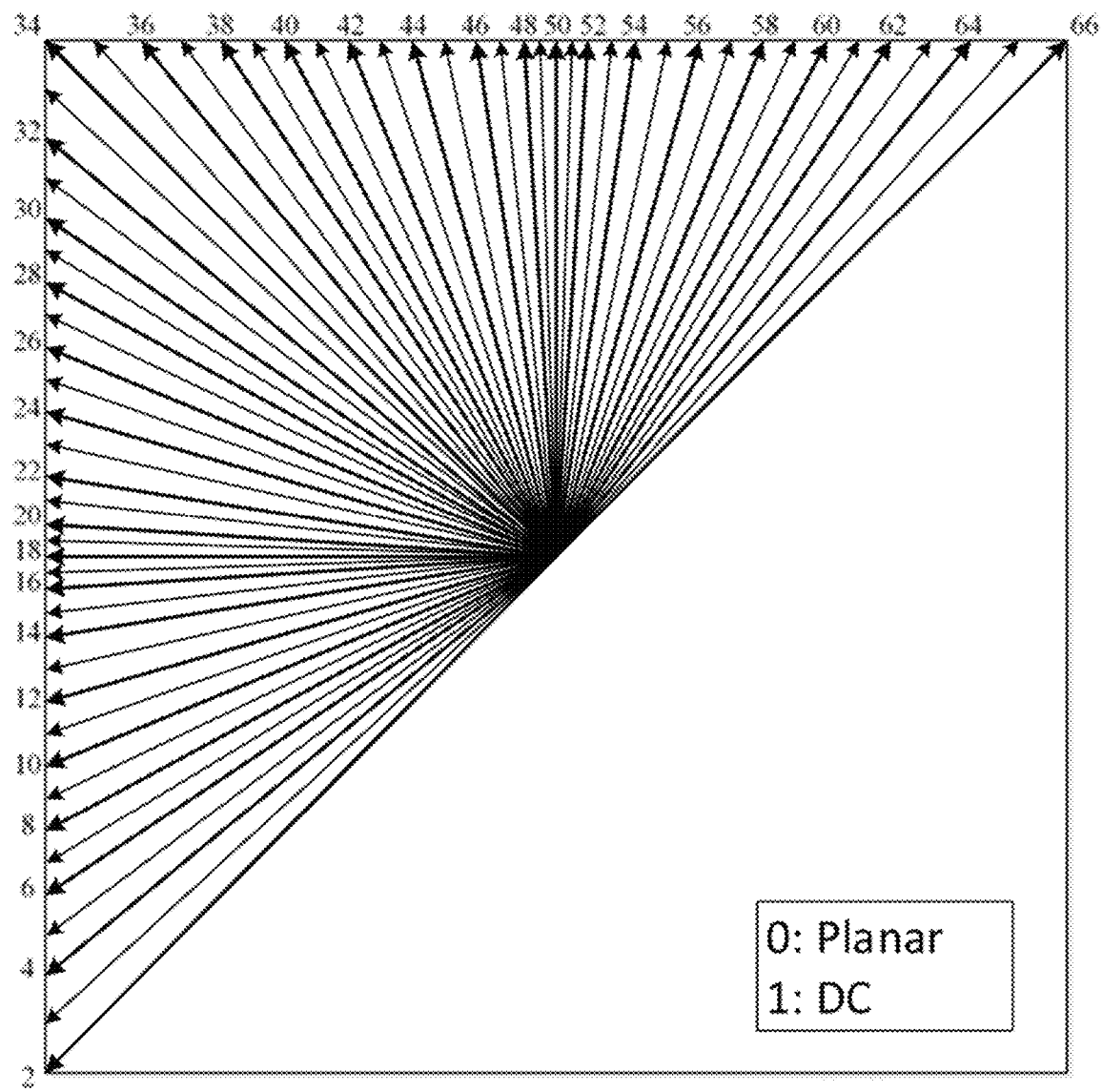
FIG. 5 illustrates a schematic diagram of 67 intra prediction modes.

To capture the arbitrary edge directions presented in natural video, the number of directional intra modes is extended from 33, as used in HEVC, to 65, as shown in FIG. 5, and the planar and DC modes remain the same. These denser directional intra prediction modes apply for all block sizes and for both luma and chroma intra predictions.

In the HEVC, every intra-coded block has a square shape and the length of each of its side is a power of 2. Thus, no division operations are required to generate an intra-predictor using DC mode. In VVC, blocks can have a rectangular shape that necessitates the use of a division operation per block in the general case. To avoid division operations for DC prediction, only the longer side is used to compute the average for non-square blocks.

2.2.1. Wide Angle Intra Prediction

Although 67 modes are defined in the VVC, the exact prediction direction for a given intra prediction mode index is further dependent on the block shape. Conventional angular intra prediction directions are defined from 45 degrees to −135 degrees in clockwise direction. In VVC, several conventional angular intra prediction modes are adaptively replaced with wide-angle intra prediction modes for non-square blocks. The replaced modes are signalled using the original mode indexes, which are remapped to the indexes of wide angular modes after parsing. The total number of intra prediction modes is unchanged, i.e., 67, and the intra mode coding method is unchanged.

Figure 6:
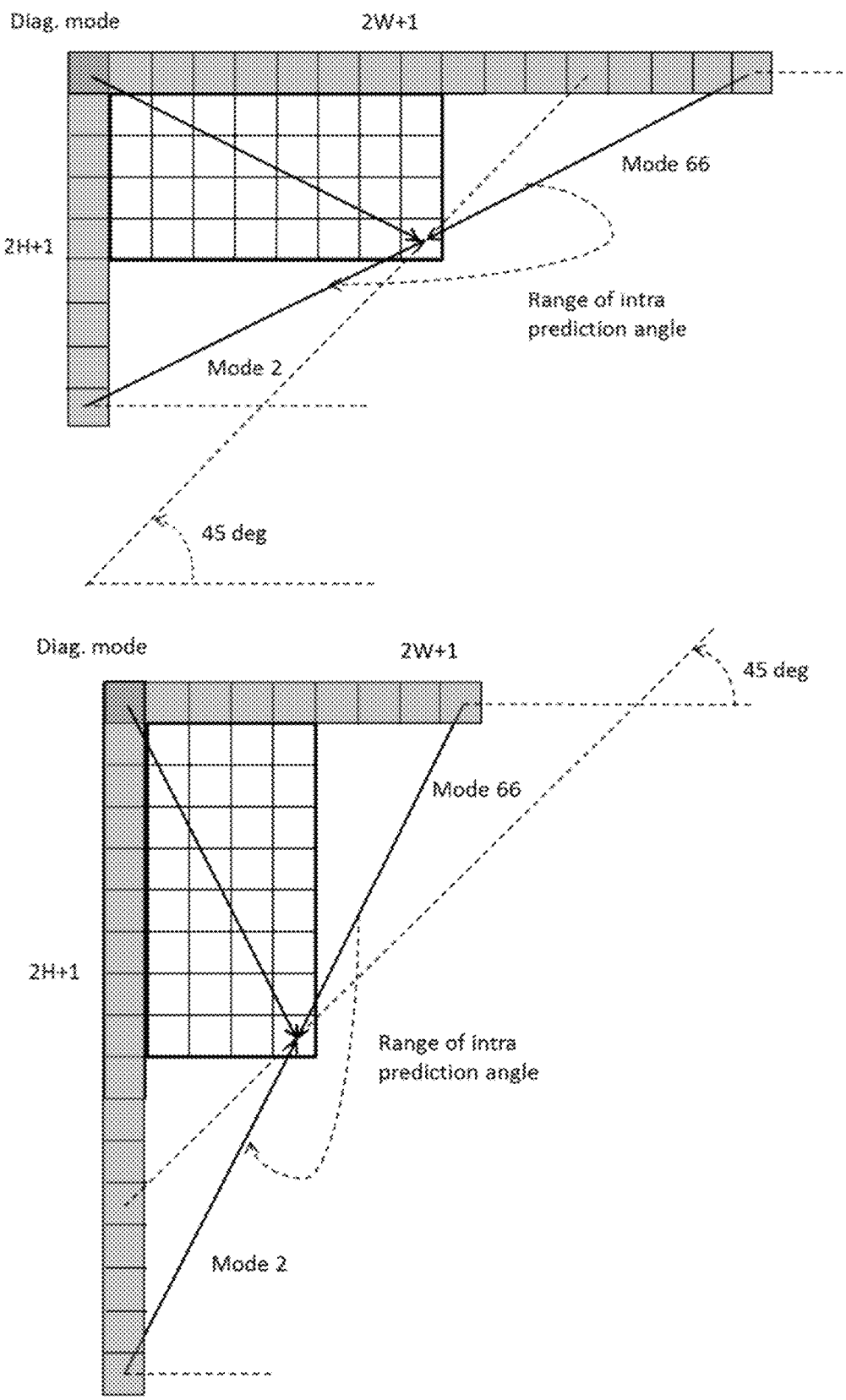
FIG. 6 illustrates a schematic diagram of reference samples for wide-angular intra prediction.

To support these prediction directions, the top reference with length 2W+1, and the left reference with length 2H+1, are defined as shown in FIG. 6.

The number of replaced modes in wide-angular direction mode depends on the aspect ratio of a block. The replaced intra prediction modes are illustrated in Table 1.

TABLE 1

Intra prediction modes replaced by wide-angular modes

| Aspect ratio | Replaced intra prediction modes |
| --- | --- |
| W/H == 16 | Modes 2, 3, 4, 5, 6, 7, 8, 9, 10, 11, 12, 13, 14, 15 |
| W/H == 8 | Modes 2, 3, 4, 5, 6, 7, 8, 9, 10, 11, 12, 13 |
| W/H == 4 | Modes 2, 3, 4, 5, 6, 7, 8, 9, 10, 11 |
| W/H == 2 | Modes 2, 3, 4, 5, 6, 7, 8, 9 |
| W/H == 1 | None |
| W/H == ½ | Modes 59, 60, 61, 62, 63, 64, 65, 66 |
| W/H == ¼ | Mode 57, 58, 59, 60, 61, 62, 63, 64, 65, 66 |
| W/H == ⅛ | Modes 55, 56, 57, 58, 59, 60, 61, 62, 63, 64, 65, 66 |
| W/H == 1/16 | Modes 53, 54, 55, 56, 57, 58, 59, 60, 61, 62, 63, 64, 65, 66 |

Figure 7:
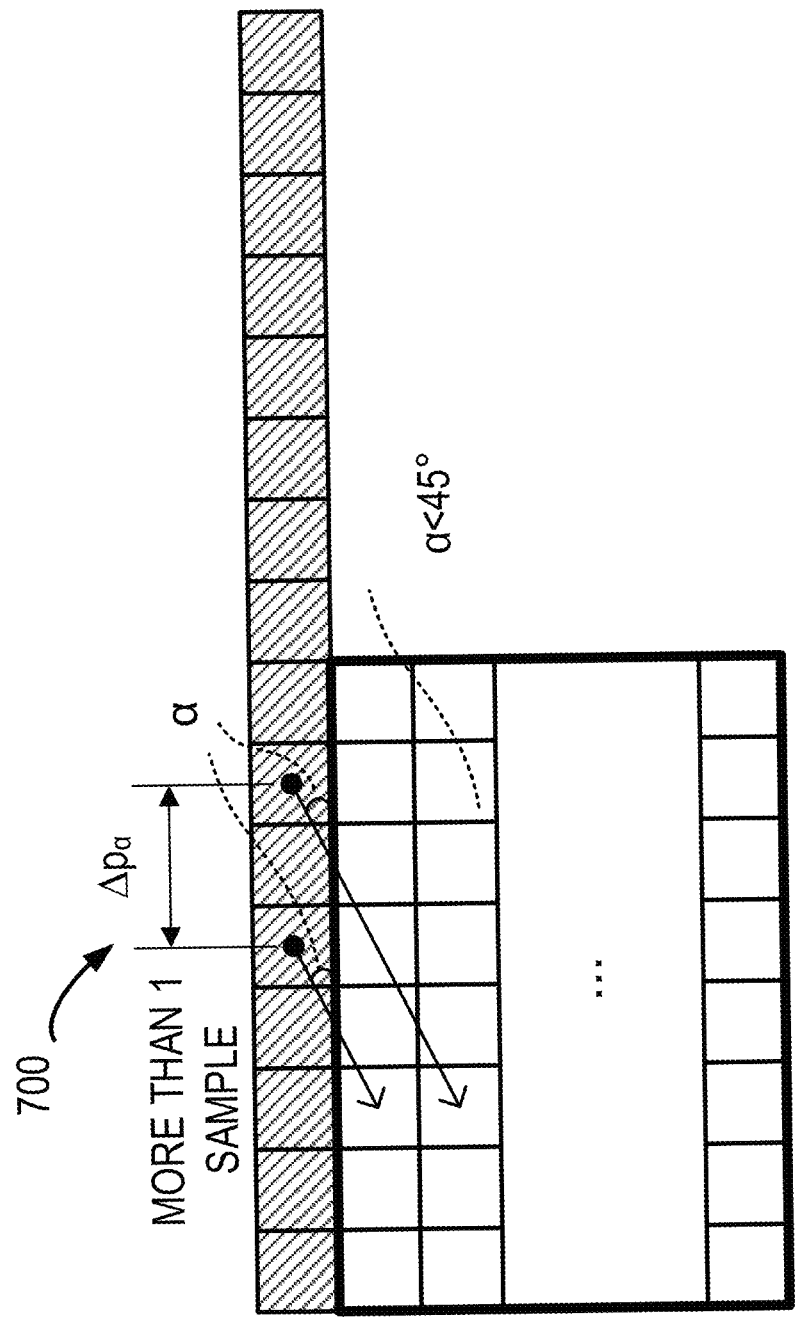
FIG. 7 illustrates a schematic diagram of problem of discontinuity in case of directions beyond 45°.

FIG. 7 illustrates a block diagram of discontinuity in case of directions beyond 45 degree. As shown in the diagram 700 of FIG. 7, two vertically adjacent predicted samples may use two non-adjacent reference samples in the case of wide-angle intra prediction. Hence, low-pass reference samples filter and side smoothing are applied to the wide-angle prediction to reduce the negative effect of the increased gap $\Delta p_\alpha$. If a wide-angle mode represents a non-fractional offset. There are 8 modes in the wide-angle modes satisfy this condition, which are [−14, −12, −10, −6, 72, 76, 78, 80]. When a block is predicted by these modes, the samples in the reference buffer are directly copied without applying any interpolation. With this modification, the number of samples needed to be smoothing is reduced. Besides, it aligns the design of non-fractional modes in the conventional prediction modes and wide-angle modes.

In VVC, 4:2:2 and 4:4:4 chroma formats are supported as well as 4:2:0. Chroma derived mode (DM) derivation table for 4:2:2 chroma format was initially ported from HEVC extending the number of entries from 35 to 67 to align with the extension of intra prediction modes. Since HEVC specification does not support prediction angle below-135 degree and above 45 degree, luma intra prediction modes ranging from 2 to 5 are mapped to 2. Therefore, chroma DM derivation table for 4:2:2: chroma format is updated by replacing some values of the entries of the mapping table to convert prediction angle more precisely for chroma blocks.

2.3. Inter Prediction

For each inter-predicted CU, motion parameters consisting of motion vectors, reference picture indices and reference picture list usage index, and additional information needed for the new coding feature of VVC to be used for inter-predicted sample generation. The motion parameter can be signalled in an explicit or implicit manner. When a CU is coded with skip mode, the CU is associated with one PU and has no significant residual coefficients, no coded motion vector delta or reference picture index. A merge mode is specified whereby the motion parameters for the current CU are obtained from neighbouring CUs, including spatial and temporal candidates, and additional schedules introduced in VVC. The merge mode can be applied to any inter-predicted CU, not only for skip mode. The alternative to merge mode is the explicit transmission of motion parameters, where motion vector, corresponding reference picture index for each reference picture list and reference picture list usage flag and other needed information are signalled explicitly per each CU.

2.4. Intra Block Copy (IBC)

Intra block copy (IBC) is a tool adopted in HEVC extensions on SCC. It is well known that it significantly improves the coding efficiency of screen content materials. Since IBC mode is implemented as a block level coding mode, block matching (BM) is performed at the encoder to find the optimal block vector (or motion vector) for each CU. Here, a block vector is used to indicate the displacement from the current block to a reference block, which is already reconstructed inside the current picture. The luma block vector of an IBC-coded CU is in integer precision. The chroma block vector rounds to integer precision as well. When combined with AMVR, the IBC mode can switch between 1-pel and 4-pel motion vector precisions. An IBC-coded CU is treated as the third prediction mode other than intra or inter prediction modes. The IBC mode is applicable to the CUs with both width and height smaller than or equal to 64 luma samples.

At the encoder side, hash-based motion estimation is performed for IBC. The encoder performs RD check for blocks with either width or height no larger than 16 luma samples. For non-merge mode, the block vector search is performed using hash-based search first. If hash search does not return valid candidate, block matching based local search will be performed.

In the hash-based search, hash key matching (32-bit CRC) between the current block and a reference block is extended to all allowed block sizes. The hash key calculation for every position in the current picture is based on 4×4 sub-blocks. For the current block of a larger size, a hash key is determined to match that of the reference block when all the hash keys of all 4×4 sub-blocks match the hash keys in the corresponding reference locations. If hash keys of multiple reference blocks are found to match that of the current block, the block vector costs of each matched reference are calculated and the one with the minimum cost is selected.

In block matching search, the search range is set to cover both the previous and current CTUs. At CU level, IBC mode is signalled with a flag and it can be signalled as IBC AMVP mode or IBC skip/merge mode as follows:

IBC skip/merge mode: a merge candidate index is used to indicate which of the block vectors in the list from neighbouring candidate IBC coded blocks is used to predict the current block. The merge list consists of spatial, HMVP, and pairwise candidates.

IBC AMVP mode: block vector difference is coded in the same way as a motion vector difference. The block vector prediction method uses two candidates as predictors, one from left neighbour and one from above neighbour (if IBC coded). When either neighbour is not available, a default block vector will be used as a predictor. A flag is signalled to indicate the block vector predictor index.

2.5. Merge Mode with MVD (MMVD)

In addition to merge mode, where the implicitly derived motion information is directly used for prediction samples generation of the current CU, the merge mode with motion vector differences (MMVD) is introduced in VVC. A MMVD flag is signalled right after sending a regular merge flag to specify whether MMVD mode is used for a CU.

In MMVD, after a merge candidate is selected, it is further refined by the signalled MVDs information. The further information includes a merge candidate flag, an index to specify motion magnitude, and an index for indication of motion direction. In MMVD mode, one for the first two candidates in the merge list is selected to be used as MV basis. The MMVD candidate flag is signalled to specify which one is used between the first and second merge candidates.

Figure 8:
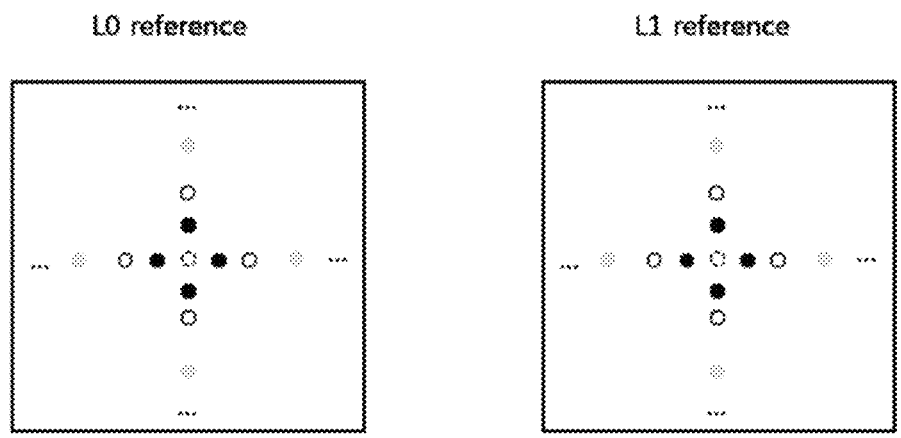
FIG. 8 illustrates a schematic diagram of MMVD Search Point.

Distance index specifies motion magnitude information and indicate the pre-defined offset from the starting point. FIG. 8 shows MMVD search point. As shown in FIG. 8, an offset is added to either horizontal component or vertical component of starting MV. The relation of distance index and pre-defined offset is specified in Table 2-2.

TABLE 2-2

The relation of distance index and pre-defined offset

| Distance IDX | 0 | 1 | 2 | 3 | 4 | 5 | 6 | 7 |
|---|---|---|---|---|---|---|---|---|
| Offset (in unit of luma sample) | ¼ | ½ | 1 | 2 | 4 | 8 | 16 | 32 |

Direction index represents the direction of the MVD relative to the starting point. The direction index can represent of the four directions as shown in Table 2-3. It's noted that the meaning of MVD sign could be variant according to the information of starting MVs. When the starting MVs is an un-prediction MV or bi-prediction MVs with both lists point to the same side of the current picture (i.e. POCs of two references are both larger than the POC of the current picture, or are both smaller than the POC of the current picture), the sign in Table 2-3 specifies the sign of MV offset added to the starting MV. When the starting MVs is bi-prediction MVs with the two MVs point to the different sides of the current picture (i.e. the POC of one reference is larger than the POC of the current picture, and the POC of the other reference is smaller than the POC of the current picture), and the difference of POC in list 0 is greater than the one in list 1, the sign in Table 2-3 specifies the sign of MV offset added to the list0 MV component of starting MV and the sign for the list1 MV has opposite value. Otherwise, if the difference of POC in list 1 is greater than list 0, the sign in Table 2-3 specifies the sign of MV offset added to the list1 MV component of starting MV and the sign for the list0 MV has opposite value.

The MVD is scaled according to the difference of POCs in each direction. If the differences of POCs in both lists are the same, no scaling is needed. Otherwise, if the difference of POC in list 0 is larger than the one of list 1, the MVD for list 1 is scaled, by defining the POC difference of L0 as td and POC difference of L1 as tb, described in FIG. 9. If the POC difference of L1 is greater than L0, the MVD for list 0 is scaled in the same way. If the starting MV is uni-predicted, the MVD is added to the available MV.

TABLE 2-3

Sign of MV offset specified by direction index

| Direction IDX | 00 | 01 | 10 | 11 |
|---|---|---|---|---|
| x-axis | + | − | N/A | N/A |
| y-axis | N/A | N/A | + | − |

2.6. Symmetric MVD Coding

In VVC, besides the normal unidirectional prediction and bi-directional prediction mode MVD signalling, symmetric MVD mode for bi-predictional MVD signalling is applied. In the symmetric MVD mode, motion information including reference picture indices of both list-0 and list-1 and MVD of list-1 are not signaled but derived.

The decoding process of the symmetric MVD mode is as follows:

1. At slice level, variables BiDirPredFlag, RefIdxSymL0 and RefIdxSymL1 are derived as follows:

If mvd_l1_zero_flag is 1, BiDirPredFlag is set equal to 0.

Otherwise, if the nearest reference picture in list-0 and the nearest reference picture in list-1 form a forward and backward pair of reference pictures or a backward and forward pair of reference pictures, BiDirPredFlag is set to 1, and both list-0 and list-1 reference pictures are short-term reference pictures. Otherwise BiDirPredFlag is set to 0.

2. At CU level, a symmetrical mode flag indicating whether symmetrical mode is used or not is explicitly signaled if the CU is bi-prediction coded and BiDirPredFlag is equal to 1.

When the symmetrical mode flag is true, only mvp_l0_flag, mvp_l1_flag and MVD0 are explicitly signaled. The reference indices for list-0 and list-1 are set equal to the pair of reference pictures, respectively. MVD1 is set equal to (−MVD0). The final motion vectors are shown in below formula.

$$\begin{cases} (mvx_0, mvy_0) = (mvpx_0 + mvdx_0, mvpy_0 + mvdy_0) \\ (mvx_1, mvy_1) = (mvpx_1 - mvdx_0, mvpy_1 - mvdy_0) \end{cases} \quad (2\text{-}1)$$

Figure 9:
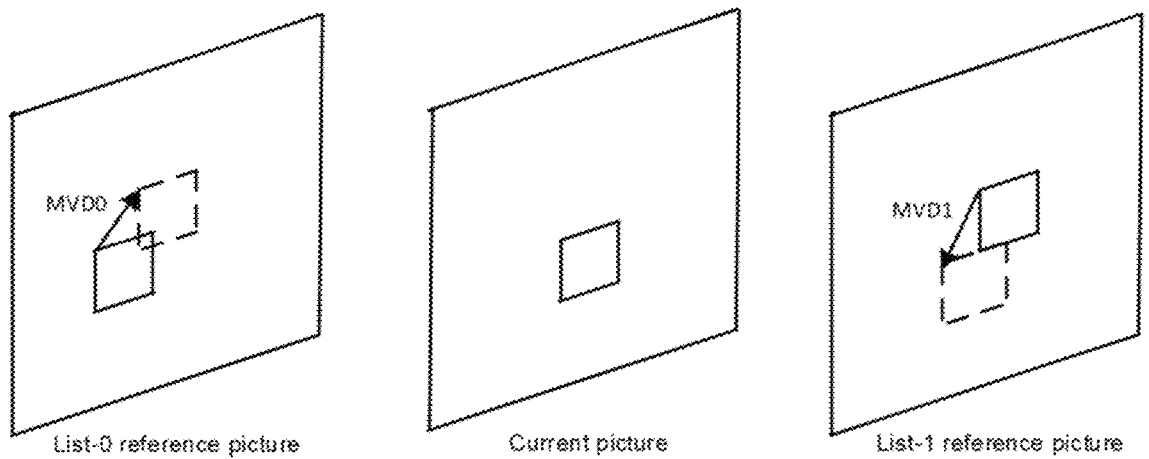
FIG. 9 illustrates a schematic diagram of illustration for symmetrical MVD mode.

FIG. 9 is an illustration for symmetrical MVD mode. In the encoder, symmetric MVD motion estimation starts with initial MV evaluation. A set of initial MV candidates comprising of the MV obtained from uni-prediction search, the MV obtained from bi-prediction search and the MVs from the AMVP list. The one with the lowest rate-distortion cost is chosen to be the initial MV for the symmetric MVD motion search.

2.7. Bi-Directional Optical Flow (BDOF)

The bi-directional optical flow (BDOF) tool is included in VVC. BDOF, previously referred to as BIO, was included in the JEM. Compared to the JEM version, the BDOF in VVC is a simpler version that requires much less computation, especially in terms of number of multiplications and the size of the multiplier.

BDOF is used to refine the bi-prediction signal of a CU at the 4×4 subblock level. BDOF is applied to a CU if it satisfies all the following conditions:

The CU is coded using "true" bi-prediction mode, i.e., one of the two reference pictures is prior to the current picture in display order and the other is after the current picture in display order.

The distances (i.e. POC difference) from two reference pictures to the current picture are same.
Both reference pictures are short-term reference pictures.
The CU is not coded using affine mode or the SbTMVP merge mode.
CU has more than 64 luma samples.
Both CU height and CU width are larger than or equal to 8 luma samples.
BCW weight index indicates equal weight.
WP is not enabled for the current CU.
CIIP mode is not used for the current CU.

BDOF is only applied to the luma component. As its name indicates, the BDOF mode is based on the optical flow concept, which assumes that the motion of an object is smooth. For each 4×4 subblock, a motion refinement $(v_x, v_y)$ is calculated by minimizing the difference between the L0 and L1 prediction samples. The motion refinement is then used to adjust the bi-predicted sample values in the 4×4 subblock. The following steps are applied in the BDOF process.

First, the horizontal and vertical gradients, $$\frac{\partial I^{(k)}}{\partial x}(i, j) \text{ and } \frac{\partial I^{(k)}}{\partial y}(i, j), k = 0, 1,$$

of the two prediction signals are computed by directly calculating the difference between two neighboring samples, i.e., $$\frac{\partial I^{(k)}}{\partial x}(i, j) = ((I^{(k)}(i+1, j) \gg \text{shift1}) - (I^{(k)}(i-1, j) \gg \text{shift1})) \quad (2\text{-}2)$$

$$\frac{\partial I^{(k)}}{\partial y}(i, j) = ((I^{(k)}(i, j+1) \gg \text{shift1}) - (I^{(k)}(i, j-1) \gg \text{shift1}))$$

where $I^{(k)}(i, j)$ are the sample value at coordinate $(i, j)$ of the prediction signal in list k, k=0,1, and shift1 is calculated based on the luma bit depth, bitDepth, as shift1=max(6, bitDepth−6).

Then, the auto- and cross-correlation of the gradients, $S_1$, $S_2$, $S_3$, $S_5$ and $S_6$, are calculated as $$S_1 = \sum_{(i,j)\in\Omega} \text{Abs}(\psi_x(i, j)), \; S_3 = \sum_{(i,j)\in\Omega} \theta(i, j) \cdot \text{Sign}(\psi_x(i, j)) \quad (2\text{-}3)$$

$$S_2 = \sum_{(i,j)\in\Omega} \psi_x(i, j) \cdot \text{Sign}(\psi_y(i, j))$$

$$S_5 = \sum_{(i,j)\in\Omega} \text{Abs}(\psi_y(i, j)), \; S_6 = \sum_{(i,j)\in\Omega} \theta(i, j) \cdot \text{Sign}(\psi_y(i, j))$$

where $$\psi_x(i, j) = \left(\frac{\partial I^{(1)}}{\partial x}(i, j) + \frac{\partial I^{(0)}}{\partial x}(i, j)\right) \gg n_a \quad (2\text{-}4)$$

$$\psi_y(i, j) = \left(\frac{\partial I^{(1)}}{\partial y}(i, j) + \frac{\partial I^{(0)}}{\partial y}(i, j)\right) \gg n_a$$

$$\theta(i, j) = (I^{(1)}(i, j) \gg n_b) - (I^{(0)}(i, j) \gg n_b)$$

where $\Omega$ is a 6×6 window around the 4×4 subblock, and the values of $n_a$ and $n_b$ are set equal to min(1, bitDepth−11) and min(4, bitDepth−8), respectively.

The motion refinement $(v_x, v_y)$ is then derived using the cross- and auto-correlation terms using the following:

$$v_x = S_1 > 0 ? \text{clip3}\left(-th'_{BIO}, th'_{BIO}, -((S_3 \cdot 2^{n_b-n_a}) \gg \lfloor \log_2 S_1 \rfloor)\right) : 0 \quad (2\text{-}5)$$

$$v_y = S_5 > 0 ? \text{clip3}\left(-th'_{BIO}, th'_{BIO}, -((S_6 \cdot 2^{n_b-n_a}) - ((v_x S_{2,m}) \ll n_{S_2} + v_x S_{2,s})/2) \gg \lfloor \log_2 S_5 \rfloor\right) : 0$$

where $S_{2,m}=S_2 \gg n_{S_2}$, $S_{2,s}=S_2 \& (2^{n_{S_2}}-1)$, $th'_{BIO}=2^{max(5,BD-7)}$. $\lfloor \cdot \rfloor$ is the floor function, and $n_{S_2}=12$.

Based on the motion refinement and the gradients, the following adjustment is calculated for each sample in the 4×4 subblock:

$$b(x, y) = \text{rnd}\left(\left(v_x\left(\frac{\partial I^{(1)}(x, y)}{\partial x} - \frac{\partial I^{(0)}(x, y)}{\partial x}\right) + v_y\left(\frac{\partial I^{(1)}(x, y)}{\partial y} - \frac{\partial I^{(0)}(x, y)}{\partial y}\right) + 1\right)/2\right). \quad (2\text{-}6)$$

Finally, the BDOF samples of the CU are calculated by adjusting the bi-prediction samples as follows:

$$pred_{BDOF}(x, y) = (I^{(0)}(x, y) + I^{(1)}(x, y) + b(x, y) + o_{offset}) \gg shift. \quad (2\text{-}7)$$

These values are selected such that the multipliers in the BDOF process do not exceed 15-bit, and the maximum bit-width of the intermediate parameters in the BDOF process is kept within 32-bit.

Figure 10:
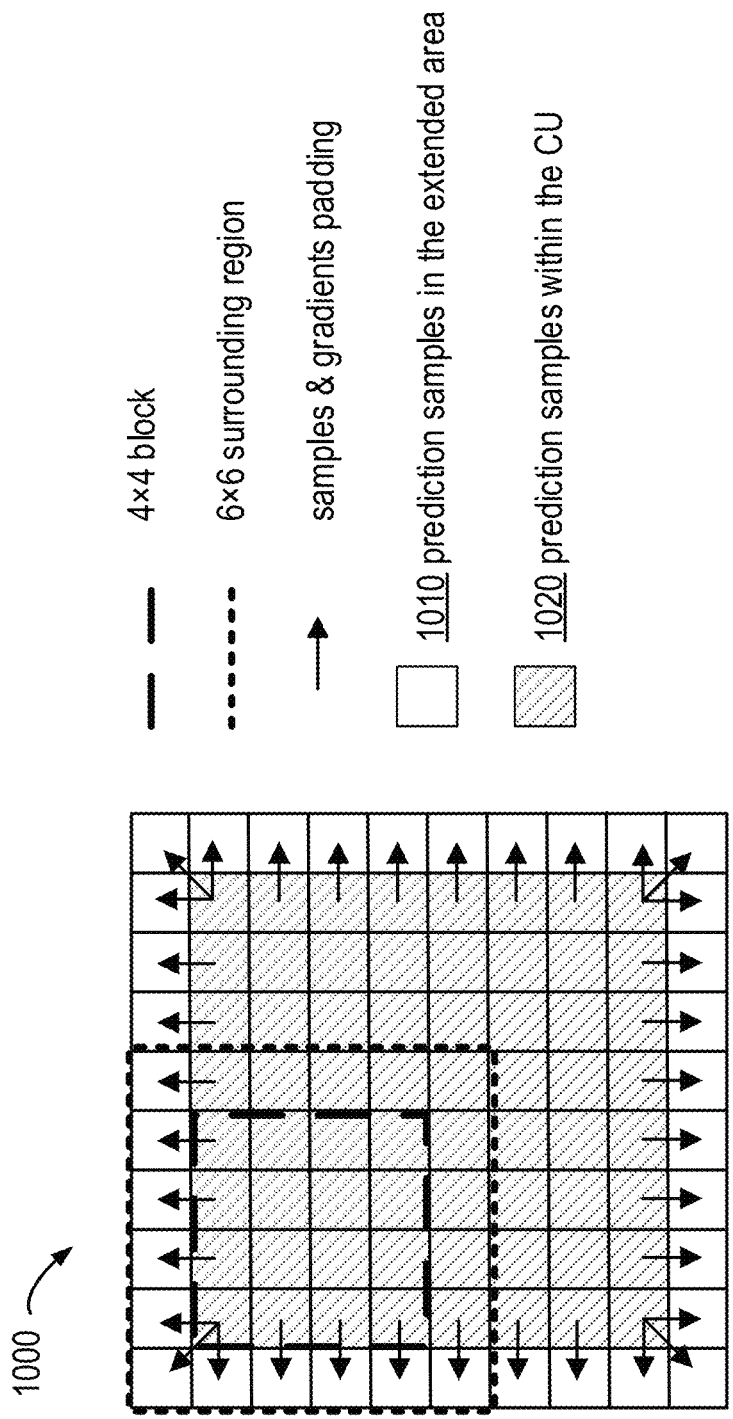
FIG. 10 illustrates extended CU region used in BDOF.

In order to derive the gradient values, some prediction samples $I^{(k)}(i, j)$ in list k (k=0,1) outside of the current CU boundaries need to be generated. FIG. 10 illustrates a schematic diagram of extended CU region used in BDOF. As depicted in the diagram 1000 of FIG. 10, the BDOF in VVC uses one extended row/column around the CU's boundaries. In order to control the computational complexity of generating the out-of-boundary prediction samples, prediction samples in the extended area (denoted as 1010 in FIG. 10) are generated by taking the reference samples at the nearby integer positions (using floor( ) operation on the coordinates) directly without interpolation, and the normal 8-tap motion compensation interpolation filter is used to generate prediction samples within the CU (denoted as 1020 in FIG. 10). These extended sample values are used in gradient calculation only. For the remaining steps in the BDOF process, if any sample and gradient values outside of the CU boundaries are needed, they are padded (i.e. repeated) from their nearest neighbors.

When the width and/or height of a CU are larger than 16 luma samples, it will be split into subblocks with width and/or height equal to 16 luma samples, and the subblock boundaries are treated as the CU boundaries in the BDOF process. The maximum unit size for BDOF process is limited to 16×16. For each subblock, the BDOF process could skipped. When the SAD of between the initial L0 and L1 prediction samples is smaller than a threshold, the BDOF process is not applied to the subblock. The threshold is set equal to (8*W*(H>>1), where W indicates the subblock width, and H indicates subblock height. To avoid the additional complexity of SAD calculation, the SAD between the initial L0 and L1 prediction samples calculated in DVMR process is re-used here.

If BCW is enabled for the current block, i.e., the BCW weight index indicates unequal weight, then bi-directional optical flow is disabled. Similarly, if WP is enabled for the current block, i.e., the luma_weight_lx_flag is 1 for either of the two reference pictures, then BDOF is also disabled. When a CU is coded with symmetric MVD mode or CIIP mode, BDOF is also disabled.

2.8. Combined Inter and Intra Prediction (CIIP)
2.9. Affine Motion Compensated Prediction In HEVC, only translation motion model is applied for motion compensation prediction (MCP). While in the real world, there are many kinds of motion, e.g. zoom in/out, rotation, perspective motions and the other irregular motions. In VVC, a block-based affine transform motion compensation prediction is applied. As shown FIG. 11, the affine motion field of the block is described by motion information of two control point (4-parameter) or three control point motion vectors (6-parameter).

Figure 11:
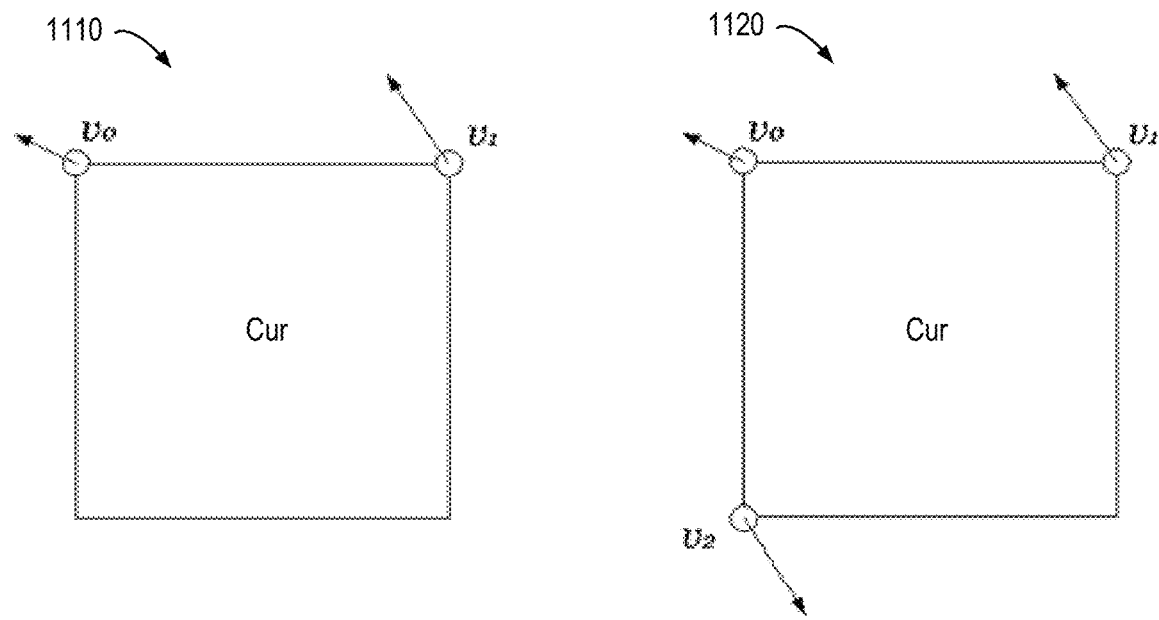
FIG. 11 illustrates control point based affine motion model.

For 4-parameter affine motion model 1110 in FIG. 11, motion vector at sample location (x, y) in a block is derived as:

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1y} - mv_{0x}}{W}y + mv_{0y} \end{cases} \quad (2\text{-}8)$$

For 6-parameter affine motion model 1120 in FIG. 11, motion vector at sample location (x, y) in a block is derived as:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad (2\text{-}9)$$

Where $(mv_{0x}, mv_{0y})$ is motion vector of the top-left corner control point, $(mv_{1x}, mv_{1y})$ is motion vector of the top-right corner control point, and $(mv_{2x}, mv_{2y})$ is motion vector of the bottom-left corner control point.

Figure 12:
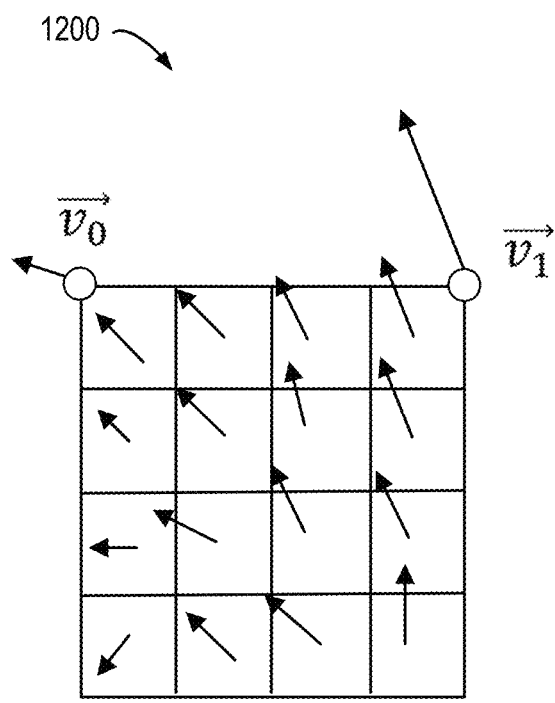
FIG. 12 illustrates affine MVF per subblock.

In order to simplify the motion compensation prediction, block based affine transform prediction is applied. FIG. 12 illustrates a schematic diagram 1200 of affine MVF per subblock. To derive motion vector of each 4×4 luma subblock, the motion vector of the center sample of each subblock, as shown in FIG. 12, is calculated according to above equations, and rounded to 1/16 fraction accuracy. Then the motion compensation interpolation filters are applied to generate the prediction of each subblock with derived motion vector. The subblock size of chroma-components is also set to be 4×4. The MV of a 4×4 chroma subblock is calculated as the average of the MVs of the four corresponding 4×4 luma subblocks.

As done for translational motion inter prediction, there are also two affine motion inter prediction modes: affine merge mode and affine AMVP mode.

2.9.1. Affine Merge Prediction

AF_MERGE mode can be applied for CUs with both width and height larger than or equal to 8. In this mode the CPMVs of the current CU is generated based on the motion information of the spatial neighbouring CUs. There can be up to five CPMVP candidates and an index is signalled to indicate the one to be used for the current CU. The following three types of CPVM candidate are used to form the affine merge candidate list:

Inherited affine merge candidates that extrapolated from the CPMVs of the neighbour CUs.
  Constructed affine merge candidates CPMVPs that are derived using the translational MVs of the neighbour CUs
  Zero MVs.

Figure 13:
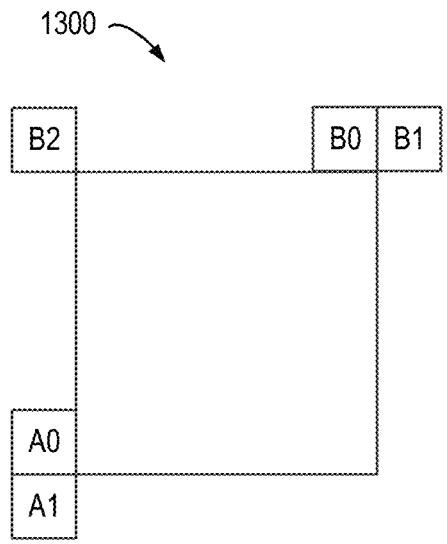
FIG. 13 illustrates locations of inherited affine motion predictors.
Figure 14:
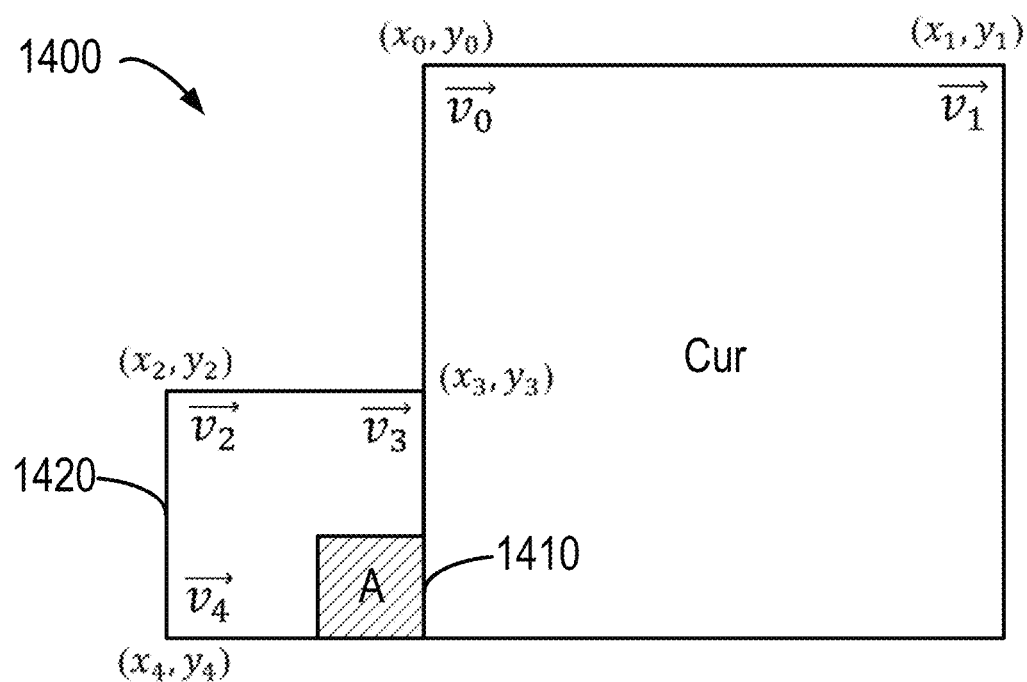
FIG. 14 illustrates control point motion vector inheritance.

In VVC, there are maximum two inherited affine candidates, which are derived from affine motion model of the neighbouring blocks, one from left neighbouring CUs and one from above neighbouring CUs. FIG. 13 illustrates a schematic diagram 1300 of locations of inherited affine motion predictors. The candidate blocks are shown in FIG. 13. For the left predictor, the scan order is A0->A1, and for the above predictor, the scan order is B0->B1->B2. Only the first inherited candidate from each side is selected. No pruning check is performed between two inherited candidates. When a neighbouring affine CU is identified, its control point motion vectors are used to derive the CPMVP candidate in the affine merge list of the current CU. FIG. 14 illustrates a schematic diagram 1400 of control point motion vector inheritance. As shown in FIG. 14, if the neighbour left bottom block A 1410 is coded in affine mode, the motion vectors $v_2$, $v_3$ and $v_4$ of the top left corner, above right corner and left bottom corner of the CU 1420 which contains the block A 1410 are attained. When block A 1410 is coded with 4-parameter affine model, the two CPMVs of the current CU are calculated according to $v_2$, and $v_3$. In case that block A is coded with 6-parameter affine model, the three CPMVs of the current CU are calculated according to $v_2$, $v_3$ and $v_4$.

Figure 15:
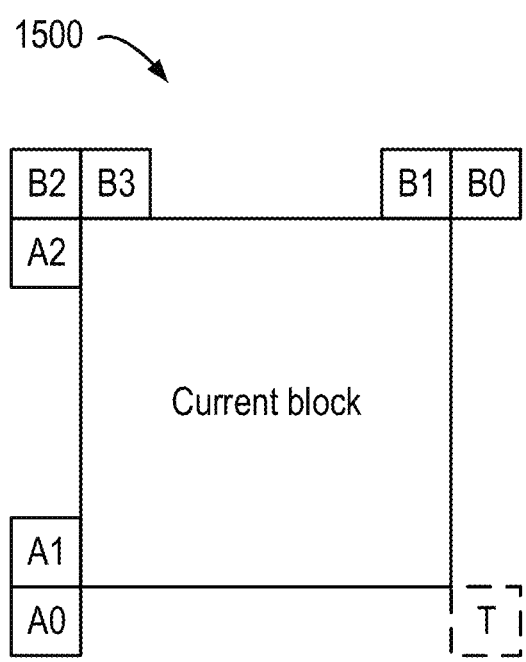
FIG. 15 illustrates locations of Candidates position for constructed affine merge mode.

Constructed affine candidate means the candidate is constructed by combining the neighbour translational motion information of each control point. The motion information for the control points is derived from the specified spatial neighbours and temporal neighbour shown in FIG. 15 which illustrates a schematic diagram 1500 of locations of candidates position for constructed affine merge mode. $CPMV_k$ (k=1, 2, 3, 4) represents the k-th control point. For $CPMV_1$, the B2->B3->A2 blocks are checked and the MV of the first available block is used. For $CPMV_2$, the B1->B0 blocks are checked and for $CPMV_3$, the A1->A0 blocks are checked. For TMVP is used as $CPMV_4$ if it's available.

After MVs of four control points are attained, affine merge candidates are constructed based on that motion information. The following combinations of control point MVs are used to construct in order: {$CPMV_1$, $CPMV_2$, $CPMV_3$}, {$CPMV_1$, $CPMV_2$, $CPMV_4$}, {$CPMV_1$, $CPMV_3$, $CPMV_4$},
{$CPMV_2$, $CPMV_3$, $CPMV_4$}, {$CPMV_1$, $CPMV_2$}, {$CPMV_1$, $CPMV_3$}.

The combination of 3 CPMVs constructs a 6-parameter affine merge candidate and the combination of 2 CPMVs constructs a 4-parameter affine merge candidate. To avoid motion scaling process, if the reference indices of control points are different, the related combination of control point MVs is discarded.

After inherited affine merge candidates and constructed affine merge candidate are checked, if the list is still not full, zero MVs are inserted to the end of the list.

2.9.2. Affine AMVP Prediction

Affine AMVP mode can be applied for CUs with both width and height larger than or equal to 16. An affine flag in CU level is signalled in the bitstream to indicate whether affine AMVP mode is used and then another flag is signalled to indicate whether 4-parameter affine or 6-parameter affine. In this mode, the difference of the CPMVs of current CU and their predictors CPMVPs is signalled in the bitstream. The affine AVMP candidate list size is 2 and it is generated by using the following four types of CPVM candidate in order:
  Inherited affine AMVP candidates that extrapolated from the CPMVs of the neighbour CUs.
  Constructed affine AMVP candidates CPMVPs that are derived using the translational MVs of the neighbour CUs.
  Translational MVs from neighbouring CUs.
  Zero MVs.

The checking order of inherited affine AMVP candidates is same to the checking order of inherited affine merge candidates. The only difference is that, for AVMP candidate, only the affine CU that has the same reference picture as in current block is considered. No pruning process is applied when inserting an inherited affine motion predictor into the candidate list.

Constructed AMVP candidate is derived from the specified spatial neighbours shown in FIG. 13. The same checking order is used as done in affine merge candidate construction. In addition, reference picture index of the neighbouring block is also checked. The first block in the checking order that is inter coded and has the same reference picture as in current CUs is used. There is only one When the current CU is coded with 4-parameter affine mode, and $mv_0$ and $mv_1$ are both available, they are added as one candidate in the affine AMVP list. When the current CU is coded with 6-parameter affine mode, and all three CPMVs are available, they are added as one candidate in the affine AMVP list. Otherwise, constructed AMVP candidate is set as unavailable.

If affine AMVP list candidates is still less than 2 after inherited affine AMVP candidates and Constructed AMVP candidate are checked, $mv_0$, $mv_1$, and $mv_2$ will be added, in order, as the translational MVs to predict all control point MVs of the current CU, when available. Finally, zero MVs are used to fill the affine AMVP list if it is still not full.

2.9.3. Affine Motion Information Storage

In VVC, the CPMVs of affine CUs are stored in a separate buffer. The stored CPMVs are only used to generate the inherited CPMVPs in affine merge mode and affine AMVP mode for the lately coded CUs. The subblock MVs derived from CPMVs are used for motion compensation, MV derivation of merge/AMVP list of translational MVs and de-blocking.

Figure 16:
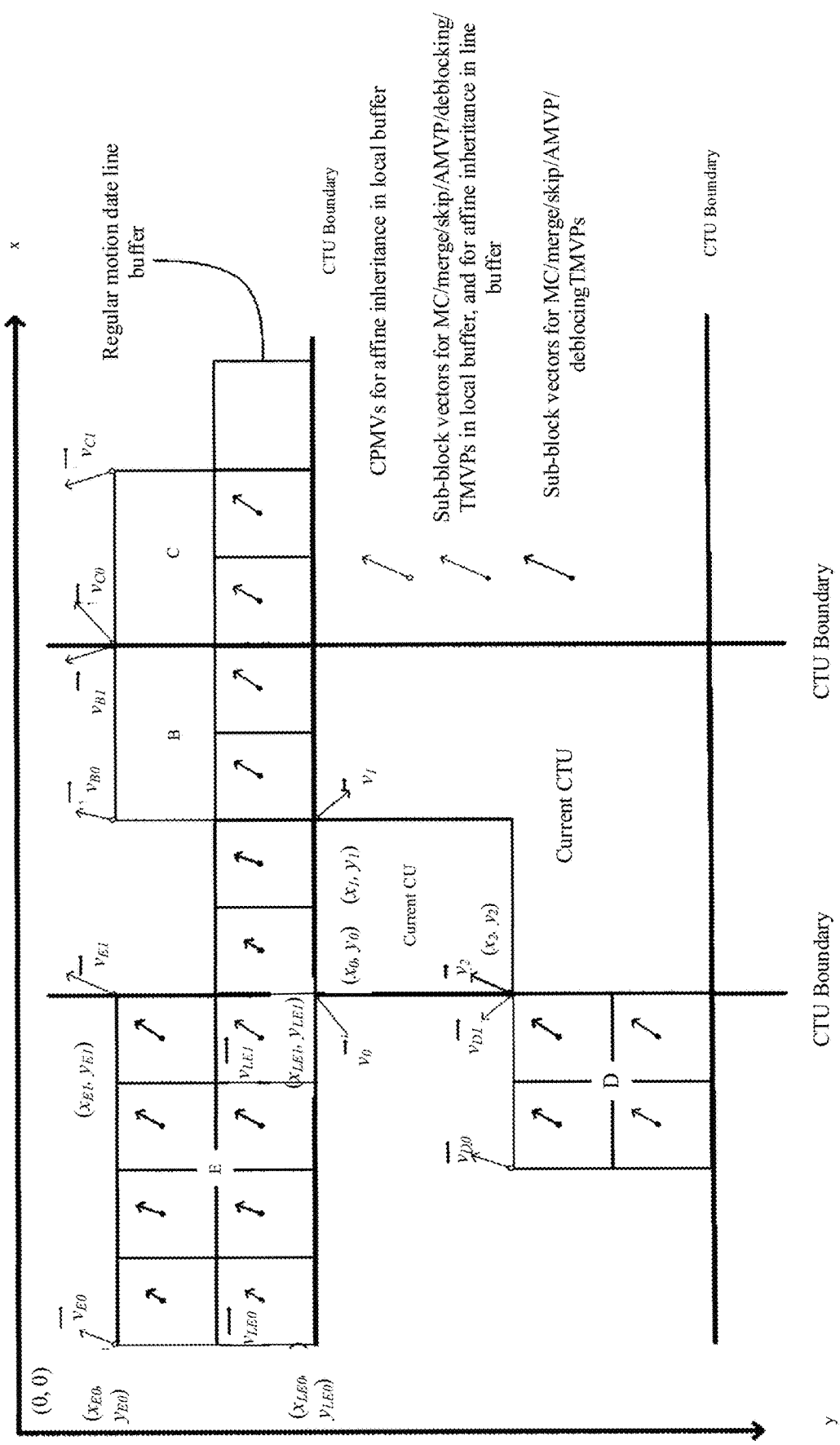
FIG. 16 illustrates illustration of motion vector usage for proposed combined method.

To avoid the picture line buffer for the additional CPMVs, affine motion data inheritance from the CUs from above CTU is treated differently to the inheritance from the normal neighbouring CUs. If the candidate CU for affine motion data inheritance is in the above CTU line, the bottom-left and bottom-right subblock MVs in the line buffer instead of the CPMVs are used for the affine MVP derivation. In this way, the CPMVs are only stored in local buffer. If the candidate CU is 6-parameter affine coded, the affine model is degraded to 4-parameter model. As shown in FIG. 16, along the top CTU boundary, the bottom-left and bottom right subblock motion vectors of a CU are used for affine inheritance of the CUs in bottom CTUs.

2.9.4. Prediction Refinement with Optical Flow for Affine Mode

Subblock based affine motion compensation can save memory access bandwidth and reduce computation complexity compared to pixel-based motion compensation, at the cost of prediction accuracy penalty. To achieve a finer granularity of motion compensation, prediction refinement with optical flow (PROF) is used to refine the subblock based affine motion compensated prediction without increasing the memory access bandwidth for motion compensation. In VVC, after the subblock based affine motion compensation is performed, luma prediction sample is refined by adding a difference derived by the optical flow equation. The PROF is described as following four steps:

Step 1) The subblock-based affine motion compensation is performed to generate subblock prediction I(i,j).

Step 2) The spatial gradients $g_x(i,j)$ and $g_y(i, j)$ of the subblock prediction are calculated at each sample location using a 3-tap filter [−1, 0, 1]. The gradient calculation is exactly the same as gradient calculation in BDOF.

$$g_x(i, j) = (I(i+1, j) \gg \text{shift1}) - (I(i-1, j) \gg \text{shift1}) \quad (2\text{-}10)$$

$$g_y(i, j) = (I(i, j+1) \gg \text{shift1}) - (I(i, j-1) \gg \text{shift1}) \quad (2\text{-}11)$$

shift1 is used to control the gradient's precision. The subblock (i.e. 4×4) prediction is extended by one sample on each side for the gradient calculation. To avoid additional memory bandwidth and additional interpolation computation, those extended samples on the extended borders are copied from the nearest integer pixel position in the reference picture.

Figure 17:
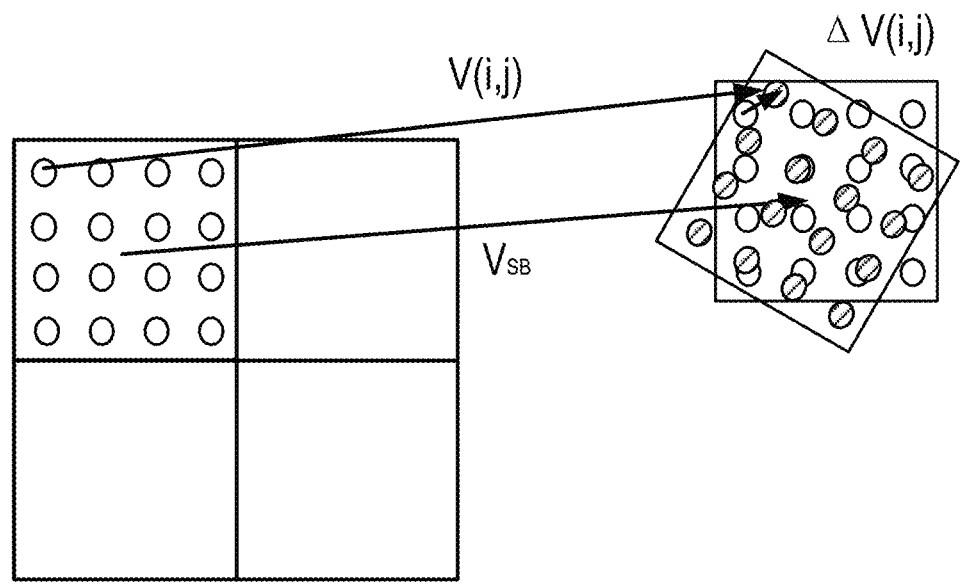
FIG. 17 illustrates subblock MV VSB and pixel Δv(i,j)

Step 3) The luma prediction refinement is calculated by the following optical flow equation.

$$\Delta I(i, j) = g_x(i, j) * \Delta v_x(i, j) + g_y(i, j) * \Delta v_y(i, j) \quad (2\text{-}12)$$

where the $\Delta v(i, j)$ is the difference between sample MV computed for sample location (i, j), denoted by v(i, j), and the subblock MV of the subblock to which sample (i, j) belongs, as shown in FIG. 17. The $\Delta v(i, j)$ is quantized in the unit of 1/32 luam sample precision.

Since the affine model parameters and the sample location relative to the subblock center are not changed from subblock to subblock, $\Delta v(i, j)$ can be calculated for the first subblock, and reused for other subblocks in the same CU. Let dx(i, j) and dy(i, j) be the horizontal and vertical offset from the sample location (i, j) to the center of the subblock $(x_{SB}, y_{SB})$, $\Delta v(x, y)$ can be derived by the following equation, $$\begin{cases} dx(i, j) = i - x_{SB} \\ dy(i, j) = j - y_{SB} \end{cases} \quad (2\text{-}13)$$

$$\begin{cases} \Delta v_x(i, j) = C * dx(i, j) + D * dy(i, j) \\ \Delta v_y(i, j) = E * dx(i, j) + F * dy(i, j) \end{cases} \quad (2\text{-}14)$$

In order to keep accuracy, the enter of the subblock $(x_{SB}, y_{SB})$ is calculated as $((W_{SB}-1)/2, (H_{SB}-1)/2)$, where $W_{SB}$ and $H_{SB}$ are the subblock width and height, respectively. For 4-parameter affine model, $$\begin{cases} C = F = \dfrac{v_{1x} - v_{0x}}{w} \\ E = -D = \dfrac{v_{1y} - v_{0y}}{w} \end{cases} \quad (2\text{-}15)$$

For 6-parameter affine model, $$\begin{cases} C = \dfrac{v_{1x} - v_{0x}}{w} \\ D = \dfrac{v_{2x} - v_{0x}}{h} \\ E = \dfrac{v_{1y} - v_{0y}}{w} \\ F = \dfrac{v_{2y} - v_{0y}}{h} \end{cases} \quad (2\text{-}16)$$

where $(v_{0x}, v_{0y})$, $(v_{1x}, v_{1y})$, $(v_{2x}, v_{2y})$ are the top-left, top-right and bottom-left control point motion vectors, w and h are the width and height of the CU.

Step 4) Finally, the luma prediction refinement $\Delta I(i, j)$ is added to the subblock prediction I(i, j). The final prediction I' is generated as the following equation.

$$I'(i, j) = I(i, j) + \Delta I(i, j) \quad (2\text{-}17)$$

PROF is not be applied in two cases for an affine coded CU: 1) all control point MVs are the same, which indicates the CU only has translational motion; 2) the affine motion parameters are greater than a specified limit because the subblock based affine MC is degraded to CU based MC to avoid large memory access bandwidth requirement.

A fast encoding method is applied to reduce the encoding complexity of affine motion estimation with PROF. PROF is not applied at affine motion estimation stage in following two situations: a) if this CU is not the root block and its parent block does not select the affine mode as its best mode, PROF is not applied since the possibility for current CU to select the affine mode as best mode is low; b) if the magnitude of four affine parameters (C, D, E, F) are all smaller than a predefined threshold and the current picture is not a low delay picture, PROF is not applied because the improvement introduced by PROF is small for this case. In this way, the affine motion estimation with PROF can be accelerated.

2.10. Subblock-Based Temporal Motion Vector Prediction (SbTMVP)

VVC supports the subblock-based temporal motion vector prediction (SbTMVP) method. Similar to the temporal motion vector prediction (TMVP) in HEVC, SbTMVP uses the motion field in the collocated picture to improve motion vector prediction and merge mode for CUs in the current picture. The same collocated picture used by TMVP is used for SbTMVP. SbTMVP differs from TMVP in the following two main aspects:

TMVP predicts motion at CU level but SbTMVP predicts motion at sub-CU level;

Whereas TMVP fetches the temporal motion vectors from the collocated block in the collocated picture (the collocated block is the bottom-right or center block relative to the current CU), SbTMVP applies a motion shift before fetching the temporal motion information from the collocated picture, where the motion shift is obtained from the motion vector from one of the spatial neighboring blocks of the current CU.

Figure 18A:
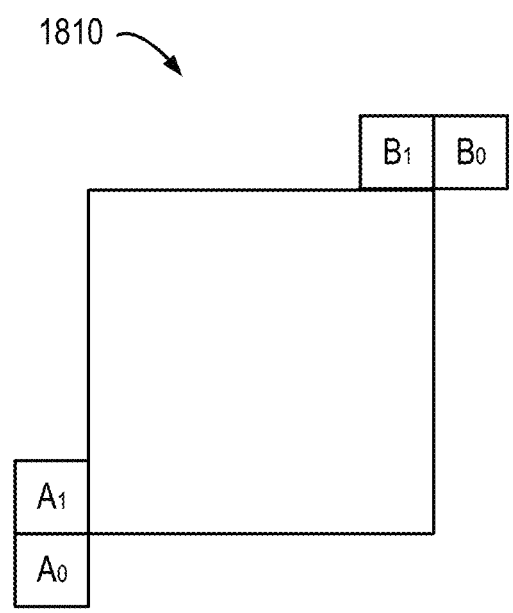
Figure 18B:
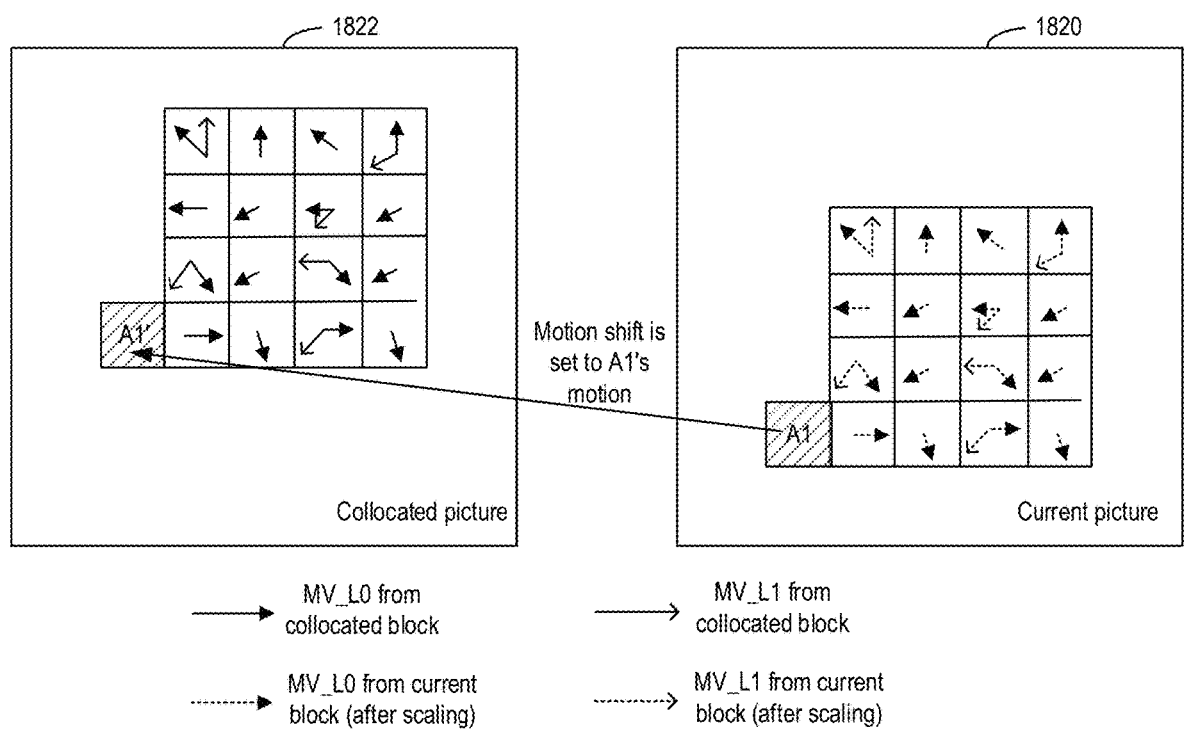

The SbTMVP process is illustrated in FIG. 18*a* and FIG. 18*b*. FIG. 18*a* illustrates a schematic diagram 1810 of spatial neighboring blocks used by SbTMVP. SbTMVP predicts the motion vectors of the sub-CUs within the current CU in two steps. In the first step, the spatial neighbor A1 in FIG. 18*a* is examined. If A1 has a motion vector that uses the collocated picture as its reference picture, this motion vector is selected to be the motion shift to be ap-plied. If no such motion is identified, then the motion shift is set to (0, 0).

FIG. 18*b* illustrates a schematic diagram of driving sub-CU motion field by applying a motion shift from spatial neighbor and scaling the motion information from the corresponding collocated sub-CUs. In the second step, the motion shift identified in Step 1 is applied (i.e. added to the coordinates of the current block in the current picture 1820) to obtain sub-CU-level motion information (motion vectors and reference indices) from the collocated picture 1822 as shown in FIG. 18*b*. The example in FIG. 18*b* assumes the motion shift is set to block A1's motion. Then, for each sub-CU, the motion information of its corresponding block (the smallest motion grid that covers the center sample) in the collocated picture 1822 is used to derive the motion information for the sub-CU. After the motion information of the collocated sub-CU is identified, it is converted to the motion vectors and reference indices of the current sub-CU in a similar way as the TMVP process of HEVC, where temporal motion scaling is applied to align the reference pictures of the temporal motion vectors to those of the current CU.

In VVC, a combined subblock based merge list which contains both SbTMVP candidate and affine merge candidates is used for the signalling of subblock based merge mode. The SbTMVP mode is enabled/disabled by a sequence parameter set (SPS) flag. If the SbTMVP mode is enabled, the SbTMVP predictor is added as the first entry of the list of subblock based merge candidates, and followed by the affine merge candidates. The size of subblock based merge list is signalled in SPS and the maximum allowed size of the subblock based merge list is 5 in VVC.

The sub-CU size used in SbTMVP is fixed to be 8×8, and as done for affine merge mode, SbTMVP mode is only applicable to the CU with both width and height are larger than or equal to 8.

The encoding logic of the additional SbTMVP merge candidate is the same as for the other merge candidates, that is, for each CU in P or B slice, an additional RD check is performed to decide whether to use the SbTMVP candidate.

2.11. Adaptive Motion Vector Resolution (AMVR)

In HEVC, motion vector differences (MVDs) (between the motion vector and predicted motion vector of a CU) are signalled in units of quarter-luma-sample when use_integer_mv_flag is equal to 0 in the slice header. In VVC, a CU-level adaptive motion vector resolution (AMVR) scheme is introduced. AMVR allows MVD of the CU to be coded in different precision. Dependent on the mode (normal AMVP mode or affine AVMP mode) for the current CU, the MVDs of the current CU can be adaptively selected as follows:

Normal AMVP mode: quarter-luma-sample, half-luma-sample, integer-luma-sample or four-luma-sample.

Affine AMVP mode: quarter-luma-sample, integer-luma-sample or 1/16 luma-sample.

The CU-level MVD resolution indication is conditionally signalled if the current CU has at least one non-zero MVD component. If all MVD components (that is, both horizontal and vertical MVDs for reference list L0 and reference list L1) are zero, quarter-luma-sample MVD resolution is inferred.

For a CU that has at least one non-zero MVD component, a first flag is signalled to indicate whether quarter-luma-sample MVD precision is used for the CU. If the first flag is 0, no further signaling is needed and quarter-luma-sample MVD precision is used for the current CU. Otherwise, a second flag is signalled to indicate half-luma-sample or other MVD precisions (integer or four-luma sample) is used for normal AMVP CU. In the case of half-luma-sample, a 6-tap interpolation filter instead of the default 8-tap interpolation filter is used for the half-luma sample position. Otherwise, a third flag is signalled to indicate whether integer-luma-sample or four-luma-sample MVD precision is used for normal AMVP CU. In the case of affine AMVP CU, the second flag is used to indicate whether integer-luma-sample or 1/16 luma-sample MVD precision is used. In order to ensure the reconstructed MV has the intended precision (quarter-luma-sample, half-luma-sample, integer-luma-sample or four-luma-sample), the motion vector predictors for the CU will be rounded to the same precision as that of the MVD before being added together with the MVD. The motion vector predictors are rounded toward zero (that is, a negative motion vector predictor is rounded toward positive infinity and a positive motion vector predictor is rounded toward negative infinity).

The encoder determines the motion vector resolution for the current CU using RD check. To avoid always performing CU-level RD check four times for each MVD resolution, in VTM11, the RD check of MVD precisions other than quarter-luma-sample is only invoked conditionally. For normal AVMP mode, the RD cost of quarter-luma-sample MVD precision and integer-luma sample MV precision is computed first. Then, the RD cost of integer-luma-sample MVD precision is compared to that of quarter-luma-sample MVD precision to decide whether it is necessary to further check the RD cost of four-luma-sample MVD precision. When the RD cost for quarter-luma-sample MVD precision is much smaller than that of the integer-luma-sample MVD precision, the RD check of four-luma-sample MVD precision is skipped. Then, the check of half-luma-sample MVD precision is skipped if the RD cost of integer-luma-sample MVD precision is significantly larger than the best RD cost of previously tested MVD precisions. For affine AMVP mode, if affine inter mode is not selected after checking rate-distortion costs of affine merge/skip mode, merge/skip mode, quarter-luma-sample MVD precision normal AMVP mode and quarter-luma-sample MVD precision affine AMVP mode, then 1/16 luma-sample MV precision and 1-pel MV precision affine inter modes are not checked. Furthermore, affine parameters obtained in quarter-luma-sample MV precision affine inter mode is used as starting search point in 1/16 luma-sample and quarter-luma-sample MV precision affine inter modes.

2.12. Bi-Prediction with CU-Level Weight (BCW)

In HEVC, the bi-prediction signal is generated by averaging two prediction signals obtained from two different reference pictures and/or using two different motion vectors. In VVC, the bi-prediction mode is extended beyond simple averaging to allow weighted averaging of the two prediction signals.

$$P_{bi-pred} = ((8 - w) * P_0 + w * P_1 + 4) \gg 3 \qquad (2\text{-}18)$$

Five weights are allowed in the weighted averaging bi-prediction, w∈ {−2, 3, 4, 5, 10}. For each bi-predicted CU, the weight w is determined in one of two ways: 1) for a non-merge CU, the weight index is signalled after the motion vector difference; 2) for a merge CU, the weight index is inferred from neighbouring blocks based on the merge candidate index. BCW is only applied to CUs with 256 or more luma samples (i.e., CU width times CU height is greater than or equal to 256). For low-delay pictures, all 5 weights are used. For non-low-delay pictures, only 3 weights (w={3, 4, 5}) are used.

At the encoder, fast search algorithms are applied to find the weight index without significantly increasing the encoder complexity. These algorithms are summarized as follows. For further details readers are referred to the VTM software and document JVET-L0646. When combined with AMVR, unequal weights are only conditionally checked for 1-pel and 4-pel motion vector precisions if the current picture is a low-delay picture.

When combined with affine, affine ME will be performed for unequal weights if and only if the affine mode is selected as the current best mode.

When the two reference pictures in bi-prediction are the same, unequal weights are only conditionally checked.

Unequal weights are not searched when certain conditions are met, depending on the POC distance between current picture and its reference pictures, the coding QP, and the temporal level.

The BCW weight index is coded using one context coded bin followed by bypass coded bins. The first context coded bin indicates if equal weight is used; and if unequal weight is used, additional bins are signalled using bypass coding to indicate which unequal weight is used.

Weighted prediction (WP) is a coding tool supported by the H.264/AVC and HEVC standards to efficiently code video content with fading. Support for WP was also added into the VVC standard. WP allows weighting parameters (weight and offset) to be signalled for each reference picture in each of the reference picture lists L0 and L1. Then, during motion compensation, the weight(s) and offset(s) of the corresponding reference picture(s) are applied. WP and BCW are designed for different types of video content. In order to avoid interactions between WP and BCW, which will complicate VVC decoder design, if a CU uses WP, then the BCW weight index is not signalled, and w is inferred to be 4 (i.e. equal weight is applied). For a merge CU, the weight index is inferred from neighbouring blocks based on the merge candidate index. This can be applied to both normal merge mode and inherited affine merge mode. For constructed affine merge mode, the affine motion information is constructed based on the motion information of up to 3 blocks. The BCW index for a CU using the constructed affine merge mode is simply set equal to the BCW index of the first control point MV.

In VVC, CIIP and BCW cannot be jointly applied for a CU. When a CU is coded with CIIP mode, the BCW index of the current CU is set to 2, e.g., equal weight.

2.13. Local Illumination Compensation (LIC)

Figure 19:
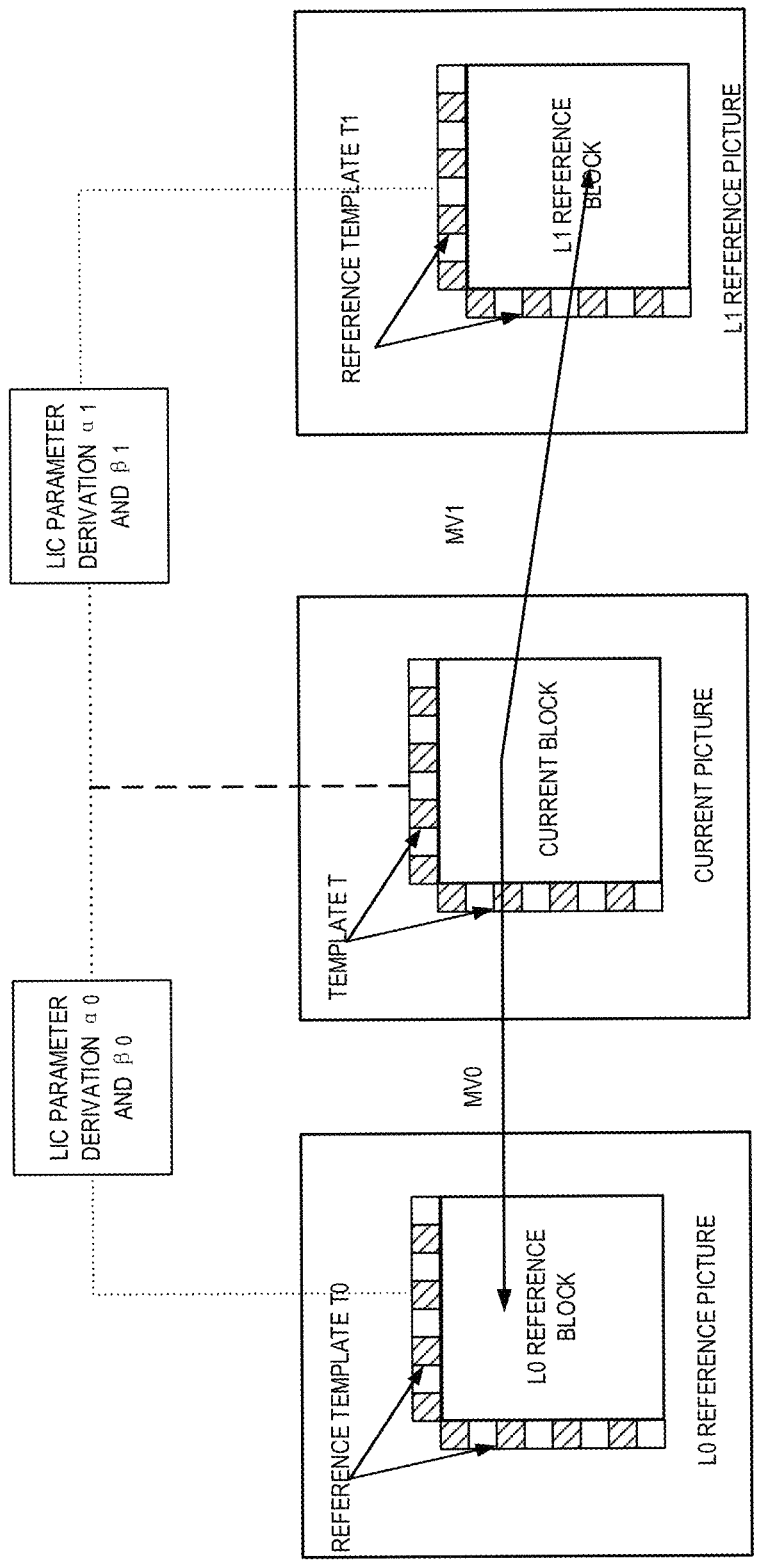
FIG. 19 illustrates local illumination compensation.

Local illumination compensation (LIC) is a coding tool to address the issue of local illumination changes between current picture and its temporal reference pictures. The LIC is based on a linear model where a scaling factor and an offset are applied to the reference samples to obtain the prediction samples of a current block. Specifically, the LIC can be mathematically modeled by the following equation:

$$P(x, y) = \alpha \cdot P_r(x+v_x, y+v_y) + \beta$$

where P(x, y) is the prediction signal of the current block at the coordinate (x, y); $P_r(x+v_x, y+v_y)$ is the reference block pointed by the motion vector $(v_x, v_y)$; α and β are the corresponding scaling factor and offset that are applied to the reference block. FIG. 19 illustrates the LIC process. In FIG. 19, when the LIC is applied for a block, a least mean square error (LMSE) method is employed to derive the values of the LIC parameters (i.e., α and β) by minimizing the difference between the neighboring samples of the current block (i.e., the template T in FIG. 19) and their corresponding reference samples in the temporal reference pictures (i.e., either T0 or T1 in FIG. 19). Additionally, to reduce the computational complexity, both the template samples and the reference template samples are subsampled (adaptive subsampling) to derive the LIC parameters, i.e., only the shaded samples in FIG. 19 are used to derive α and β.

Figure 20:
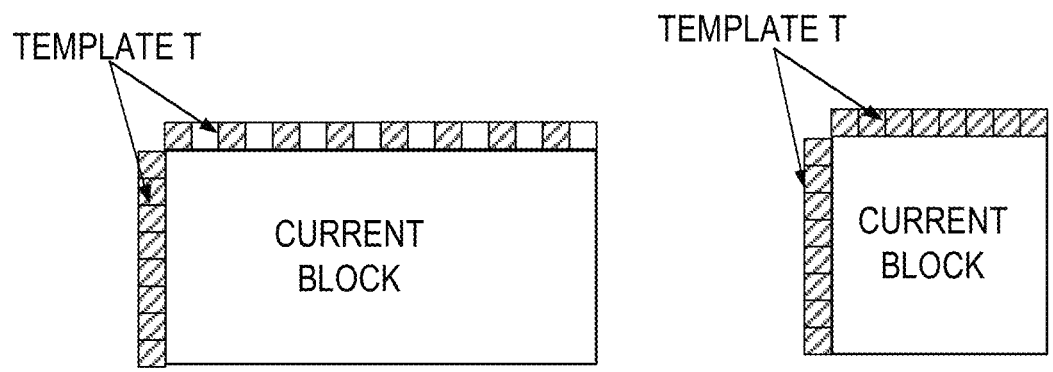
FIG. 20 illustrates no subsampling for the short side.

To improve the coding performance, no subsampling for the short side is performed as shown in FIG. 20.

2.14. Decoder Side Motion Vector Refinement (DMVR)

Figure 21:
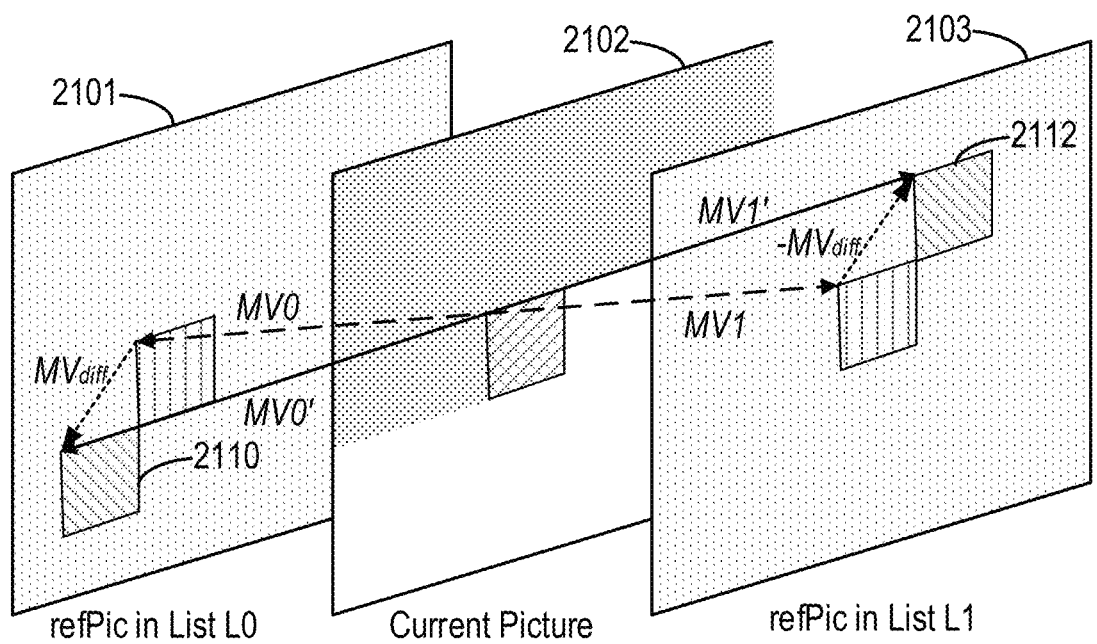
FIG. 21 illustrates decoding side motion vector refinement.

In order to increase the accuracy of the MVs of the merge mode, a bilateral-matching (BM) based decoder side motion vector refinement is applied in VVC. In bi-prediction operation, a refined MV is searched around the initial MVs in the reference picture list L0 and reference picture list L1. The BM method calculates the distortion between the two candidate blocks in the reference picture list L0 and list L1. FIG. 21 is a schematic diagram illustrating the decoding side motion vector refinement. As illustrated in FIG. 21, the SAD between the blocks 2110 and 2112 based on each MV candidate around the initial MV is calculated, where the block 2110 is in a reference picture 2101 in the list L0 and the block 2112 is in a reference picture 2103 in the List L1 for the current picture 2102. The MV candidate with the lowest SAD becomes the refined MV and used to generate the bi-predicted signal.

In VVC, the application of DMVR is restricted and is only applied for the CUs which are coded with following modes and features:
- CU level merge mode with bi-prediction MV.
- One reference picture is in the past and another reference picture is in the future with respect to the current picture.
- The distances (i.e. POC difference) from two reference pictures to the current picture are same.
- Both reference pictures are short-term reference pictures.
- CU has more than 64 luma samples.
- Both CU height and CU width are larger than or equal to 8 luma samples.
- BCW weight index indicates equal weight.
- WP is not enabled for the current block.
- CIIP mode is not used for the current block.

The refined MV derived by DMVR process is used to generate the inter prediction samples and also used in temporal motion vector prediction for future pictures coding. While the original MV is used in deblocking process and also used in spatial motion vector prediction for future CU coding.

The additional features of DMVR are mentioned in the following sub-clauses.

2.14.1. Searching Scheme

In DVMR, the search points are surrounding the initial MV and the MV offset obey the MV difference mirroring rule. In other words, any points that are checked by DMVR, denoted by candidate MV pair (MV0, MV1) obey the following two equations:

$$MV0' = MV0 + MV\_\text{offset} \quad (2\text{-}19)$$

$$MV1' = MV1 - MV\_\text{offset} \quad (2\text{-}20)$$

where MV_offset represents the refinement offset between the initial MV and the refined MV in one of the reference pictures. The refinement search range is two integer luma samples from the initial MV. The searching includes the integer sample offset search stage and fractional sample refinement stage.

25 points full search is applied for integer sample offset searching. The SAD of the initial MV pair is first calculated. If the SAD of the initial MV pair is smaller than a threshold, the integer sample stage of DMVR is terminated. Otherwise SADs of the remaining 24 points are calculated and checked in raster scanning order. The point with the smallest SAD is selected as the output of integer sample offset searching stage. To reduce the penalty of the uncertainty of DMVR refinement, it is proposed to favor the original MV during the DMVR process. The SAD between the reference blocks referred by the initial MV candidates is decreased by ¼ of the SAD value.

The integer sample search is followed by fractional sample refinement. To save the calculational complexity, the fractional sample refinement is derived by using parametric error surface equation, instead of additional search with SAD comparison. The fractional sample refinement is conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form $$E(x, y) = A(x - x_{min})^2 + B(y - y_{min})^2 + C \quad (2-21)$$

where ($x_{min}$, $y_{min}$) corresponds to the fractional position with the least cost and C corresponds to the minimum cost value. By solving the above equations by using the cost value of the five search points, the ($x_{min}$, $y_{min}$) is computed as:

$$x_{min} = (E(-1, 0) - E(1, 0))/(2(E(-1, 0) + E(1, 0) - 2E(0, 0))) \quad (2-22)$$

$$y_{min} = (E(0, -1) - E(0, 1))/(2((E(0, -1) + E(0, 1) - 2E(0, 0))). \quad (2-23)$$

The value of $x_{min}$ and $y_{min}$ are automatically constrained to be between −8 and 8 since all cost values are positive and the smallest value is E(0,0). This corresponds to half peal offset with 1/16th-pel MV accuracy in VVC. The computed fractional ($x_{min}$, $y_{min}$) are added to the integer distance refinement MV to get the sub-pixel accurate refinement delta MV.

2.14.2. Bilinear-Interpolation and Sample Padding

In VVC, the resolution of the MVs is 1/16 luma samples. The samples at the fractional position are interpolated using an 8-tap interpolation filter. In DMVR, the search points are surrounding the initial fractional-pel MV with integer sample offset, therefore the samples of those fractional position need to be interpolated for DMVR search process. To reduce the calculation complexity, the bi-linear interpolation filter is used to generate the fractional samples for the searching process in DMVR. Another important effect is that by using bi-linear filter is that with 2-sample search range, the DVMR does not access more reference samples compared to the normal motion compensation process. After the refined MV is attained with DMVR search process, the normal 8-tap interpolation filter is applied to generate the final prediction. In order to not access more reference samples to normal MC process, the samples, which is not needed for the interpolation process based on the original MV but is needed for the interpolation process based on the refined MV, will be padded from those available samples.

2.14.3. Maximum DMVR Processing Unit

When the width and/or height of a CU are larger than 16 luma samples, it will be further split into subblocks with width and/or height equal to 16 luma samples. The maximum unit size for DMVR searching process is limit to 16×16.

2.15. Multi-Pass Decoder-Side Motion Vector Refinement

In this contribution, a multi-pass decoder-side motion vector refinement is applied instead of DMVR. In the first pass, bilateral matching (BM) is applied to a coding block. In the second pass, BM is applied to each 16×16 subblock within the coding block. In the third pass, MV in each 8×8 subblock is refined by applying bi-directional optical flow (BDOF). The refined MVs are stored for both spatial and temporal motion vector prediction.

2.15.1. First Pass-Block Based Bilateral Matching MV Refinement

In the first pass, a refined MV is derived by applying BM to a coding block. Similar to decoder-side motion vector refinement (DMVR), the refined MV is searched around the two initial MVs (MV0 and MV1) in the reference picture lists L0 and L1. The refined MVs (MV0_pass1 and MV1_pass1) are derived around the initiate MVs based on the minimum bilateral matching cost between the two reference blocks in L0 and L1.

BM performs local search to derive integer sample precision intDeltaMV and half-pel sample precision halfDeltaMv. The local search applies a 3×3 square search pattern to loop through the search range [−sHor, sHor] in a horizontal direction and [−sVer, sVer] in a vertical direction, wherein, the values of sHor and sVer are determined by the block dimension, and the maximum value of sHor and sVer is 8.

The bilateral matching cost is calculated as: bilCost=mvDistanceCost+sadCost. When the block size cbW*cbH is greater than 64, MRSAD cost function is applied to remove the DC effect of the distortion between the reference blocks. When the bilCost at the center point of the 3×3 search pattern has the minimum cost, the intDeltaMV or halfDeltaMV local search is terminated. Otherwise, the current minimum cost search point becomes the new center point of the 3×3 search pattern and the search for the minimum cost continues, until it reaches the end of the search range.

The existing fractional sample refinement is further applied to derive the final deltaMV. The refined MVs after the first pass are then derived as:

$$MV0\_pass1 = MV0 + \text{delta}MV,$$

$$MV1\_pass1 = MV1 - \text{delta}MV.$$

2.15.2. Second Pass-Subblock Based Bilateral Matching MV Refinement

In the second pass, a refined MV is derived by applying BM to a 16×16 grid subblock. For each subblock, the refined MV is searched around the two MVs (MV0_pass1 and MV1_pass1), obtained on the first pass for the reference picture list L0 and L1. The refined MVs (MV0_pass2 (sbIdx2) and MV1_pass2(sbIdx2)) are derived based on the minimum bilateral matching cost between the two reference subblocks in L0 and L1.

For each subblock, BM performs full search to derive integer sample precision intDeltaMV. The full search has a search range [−sHor, sHor] in a horizontal direction and [−sVer, sVer] in a vertical direction, wherein, the values of sHor and sVer are determined by the block dimension, and the maximum value of sHor and sVer is 8.

Figure 22:
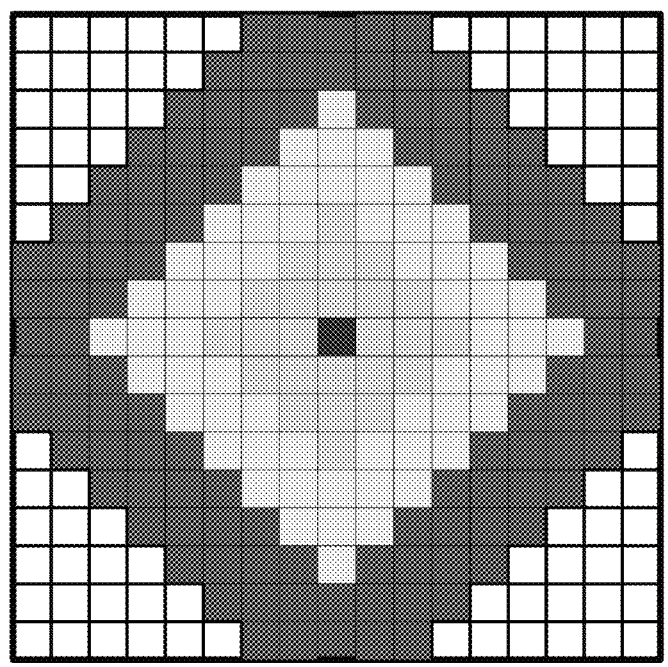
FIG. 22 illustrates diamond regions in the search area.

The bilateral matching cost is calculated by applying a cost factor to the SATD cost between the two reference subblocks, as: bilCost=satdCost*costFactor. The search area (2*sHor+1)*(2*sVer+1) is divided up to 5 diamond shape search regions shown in in the diagram 2200 of FIG. 22. Each search region is assigned a costFactor, which is determined by the distance (intDeltaMV) between each search point and the starting MV, and each diamond region is processed in the order starting from the center of the search area. In each region, the search points are processed in the raster scan order starting from the top left going to the bottom right corner of the region. When the minimum bilCost within the current search region is less than a threshold equal to sbW*sbH, the int-pel full search is terminated, otherwise, the int-pel full search continues to the next search region until all search points are examined.

BM performs local search to derive half sample precision halfDeltaMv. The search pattern and cost function are the same as defined in 2.9.1.

The existing VVC DMVR fractional sample refinement is further applied to derive the final deltaMV(sbIdx2). The refined MVs at second pass is then derived as:

$$MV0\_pass2(sbIdx2) = MV0\_pass1 + deltaMV(sbIdx2),$$

$$MV1\_pass2(sbIdx2) = MV1\_pass1 - deltaMV(sbIdx2).$$

2.15.3. Third Pass-Subblock Based Bi-Directional Optical Flow MV Refinement

In the third pass, a refined MV is derived by applying BDOF to an 8×8 grid subblock. For each 8×8 subblock, BDOF refinement is applied to derive scaled $v_x$ and $v_y$ without clipping starting from the refined MV of the parent subblock of the second pass. The derived bioMv($v_x$, $v_y$) is rounded to 1/16 sample precision and clipped between −32 and 32.

The refined MVs (MV0_pass3(sbIdx3) and MV1_pass3 (sbIdx3)) at third pass are derived as:

$$MV0\_pass3(sbIdx3) = MV0\_pass2(sbIdx2) + bioMv,$$

$$MV1\_pass3(sbIdx3) = MV0\_pass2(sbIdx2) - bioMv.$$

2.16. Sample-Based BDOF

In the sample-based BDOF, instead of deriving motion refinement ($v_x$, $v_y$) on a block basis, it is performed per sample.

The coding block is divided into 8×8 subblocks. For each subblock, whether to apply BDOF or not is determined by checking the SAD between the two reference subblocks against a threshold. If decided to apply BDOF to a subblock, for every sample in the subblock, a sliding 5×5 window is used and the existing BDOF process is applied for every sliding window to derive $v_x$ and $v_y$. The derived motion refinement ($v_x$, $v_y$) is applied to adjust the bi-predicted sample value for the center sample of the window.

2.17. Extended Merge Prediction

In VVC, the merge candidate list is constructed by including the following five types of candidates in order:
(1) Spatial MVP from spatial neighbour CUs.
(2) Temporal MVP from collocated CUs.
(3) History-based MVP from a FIFO table.
(4) Pairwise average MVP.
(5) Zero MVs.

The size of merge list is signalled in sequence parameter set header and the maximum allowed size of merge list is 6. For each CU code in merge mode, an index of best merge candidate is encoded using truncated unary binarization (TU). The first bin of the merge index is coded with context and bypass coding is used for other bins.

The derivation process of each category of merge candidates is provided in this session. As done in HEVC, VVC also supports parallel derivation of the merging candidate lists for all CUs within a certain size of area.

2.17.1. Spatial Candidates Derivation

Figure 23:
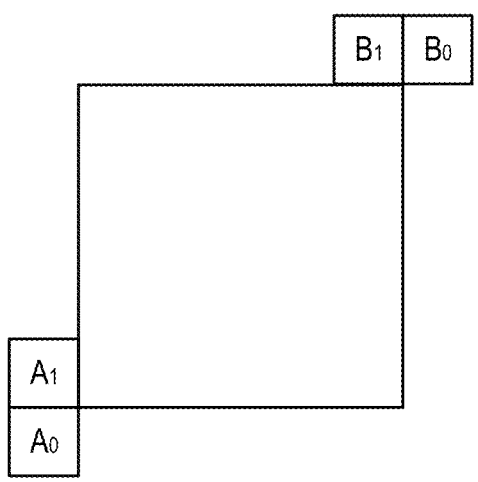
FIG. 23 illustrates positions of spatial merge candidate.
Figure 24:
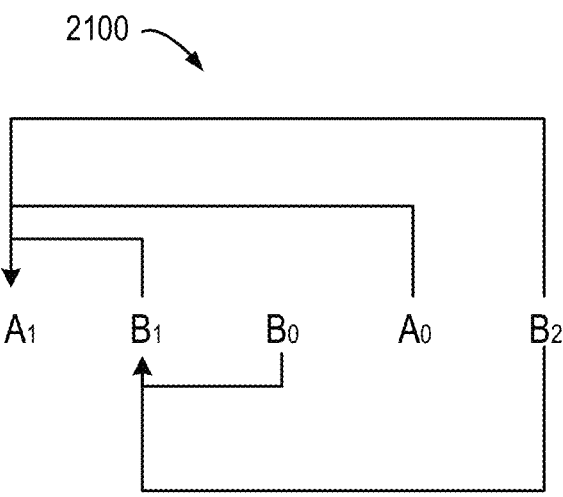
FIG. 24 illustrates candidate pairs considered for redundancy check of spatial merge candidates.

The derivation of spatial merge candidates in VVC is same to that in HEVC except the positions of first two merge candidates are swapped. FIG. 23 is a schematic diagram 2300 illustrating positions of a spatial merge candidate. A maximum of four merge candidates are selected among candidates located in the positions depicted in FIG. 23. The order of derivation is $B_0$, $A_0$, $B_1$, $A_1$ and $B_2$. Position $B_2$ is considered only when one or more than one CUs of position $B_0$, $A_0$, $B_1$, $A_1$ are not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. FIG. 24 is a schematic diagram 2400 illustrating candidate pairs considered for redundancy check of spatial merge candidates. Instead only the pairs linked with an arrow in FIG. 24 are considered and a candidate is only added to the list if the corresponding candidate used for redundancy check has not the same motion information.

2.17.2. Temporal Candidates Derivation

Figure 25:
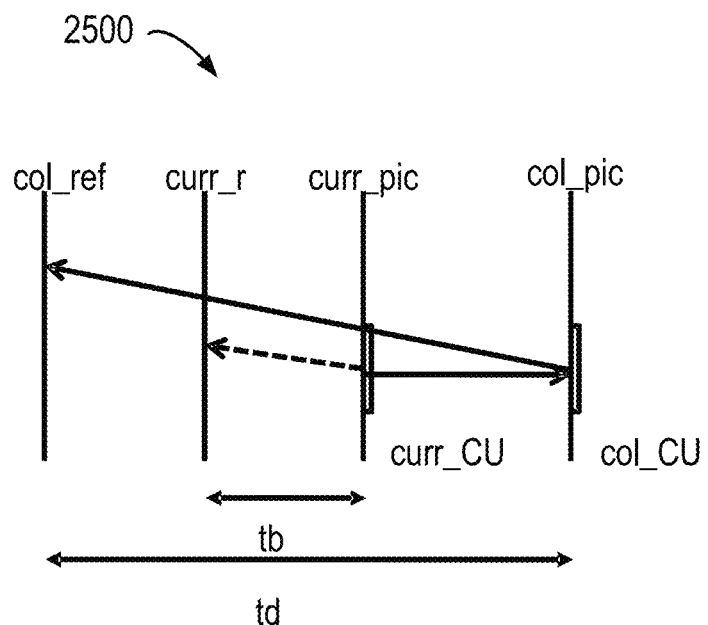
FIG. 25 illustrates illustration of motion vector scaling for temporal merge candidate.

In this step, only one candidate is added to the list. Particularly, in the derivation of this temporal merge candidate, a scaled motion vector is derived based on co-located CU belonging to the collocated reference picture. The reference picture list to be used for derivation of the co-located CU is explicitly signalled in the slice header. The scaled motion vector for temporal merge candidate is obtained as illustrated by the dotted line in the diagram 2500 of FIG. 25, which is scaled from the motion vector of the co-located CU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

Figure 26:
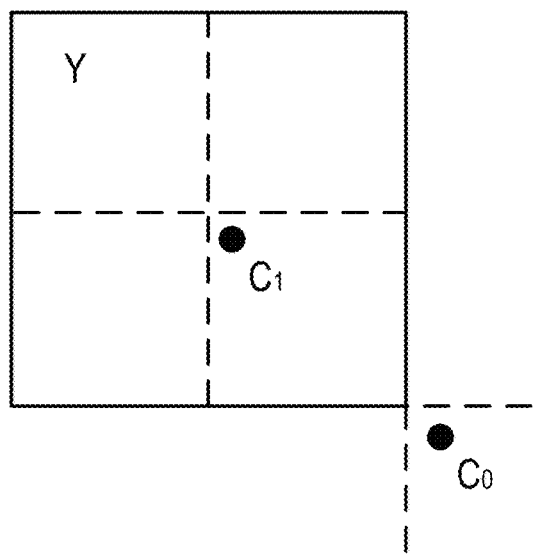
FIG. 26 illustrates candidate positions for temporal merge candidate, C0 and C1.

FIG. 26 is a schematic diagram 2600 illustrating candidate positions for temporal merge candidate, $C_0$ and $C_1$. The position for the temporal candidate is selected between candidates $C_0$ and $C_1$, as depicted in FIG. 26. If CU at position $C_0$ is not available, is intra coded, or is outside of the current row of CTUS, position $C_1$ is used. Otherwise, position $C_0$ is used in the derivation of the temporal merge candidate.

2.17.3. History-Based Merge Candidates Derivation

The history-based MVP (HMVP) merge candidates are added to merge list after the spatial MVP and TMVP. In this method, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

The HMVP table size S is set to be 6, which indicates up to 6 History-based MVP (HMVP) candidates may be added to the table. When inserting a new motion candidate to the table, a constrained first-in-first-out (FIFO) rule is utilized wherein redundancy check is firstly applied to find whether there is an identical HMVP in the table. If found, the identical HMVP is removed from the table and all the HMVP candidates afterwards are moved forward, and the identical HMVP is inserted to the last entry of the table.

HMVP candidates could be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of redundancy check operations, the following simplifications are introduced: Number of HMPV candidates is used for merge list generation is set as (N<=4) ? M: (8−N), wherein N indicates number of existing candidates in the merge list and M indicates number of available HMVP candidates in the table.

Once the total number of available merge candidates reaches the maximally allowed merge candidates minus 1, the merge candidate list construction process from HMVP is terminated.

2.17.4. Pair-Wise Average Merge Candidates Derivation

Pairwise average candidates are generated by averaging predefined pairs of candidates in the existing merge candidate list, and the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid. When the merge list is not full after pair-wise average merge candidates are added, the zero MVPs are inserted in the end until the maximum merge candidate number is encountered.

2.17.5. Merge Estimation Region

Merge estimation region (MER) allows independent derivation of merge candidate list for the CUs in the same merge estimation region (MER). A candidate block that is within the same MER to the current CU is not included for the generation of the merge candidate list of the current CU. In addition, the updating process for the history-based motion vector predictor candidate list is updated only if (xCb+cbWidth)>>Log 2ParMrgLevel is greater than xCb>>Log 2ParMrgLevel and (yCb+cbHeight)>>Log 2ParMrgLevel is great than (yCb>>Log 2ParMrgLevel) and where (xCb, yCb) is the top-left luma sample position of the current CU in the picture and (cbWidth, cbHeight) is the CU size. The MER size is selected at encoder side and signalled as log 2_parallel_merge_level_minus2 in the sequence parameter set.

2.18. New Merge Candidates 2.18.1. Non-Adjacent Merge Candidates Derivation

Figure 27:
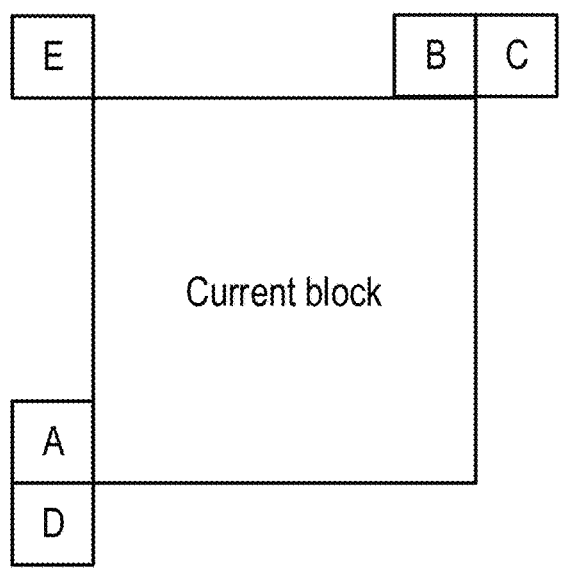
FIG. 27 illustrates VVC spatial neighboring blocks of the current block.

FIG. 27 illustrates a schematic diagram 2700 of VVC spatial neighboring blocks of the current block. In VVC, five spatially neighboring blocks shown in FIG. 27 as well as one temporal neighbor are used to derive merge candidates.

It is proposed to derive the additional merge candidates from the positions non-adjacent to the current block using the same pattern as that in VVC. To achieve this, for each search round i, a virtual block is generated based on the current block as follows:

First, the relative position of the virtual block to the current block is calculated by:

Offsetx=−i×gridX, Offsety=−i×gridY where the Offsetx and Offsety denote the offset of the top-left corner of the virtual block relative to the top-left corner of the current block, gridX and gridY are the width and height of the search grid. Second, the width and height of the virtual block are calculated by:

new Width=i×2×gridX+currWidth newHeight=i×2×gridY+currHeight.

where the currWidth and currHeight are the width and height of current block. The newWidth and newHeight are the width and height of new virtual block.

gridX and gridY are currently set to currWidth and currHeight, respectively.

Figure 28:
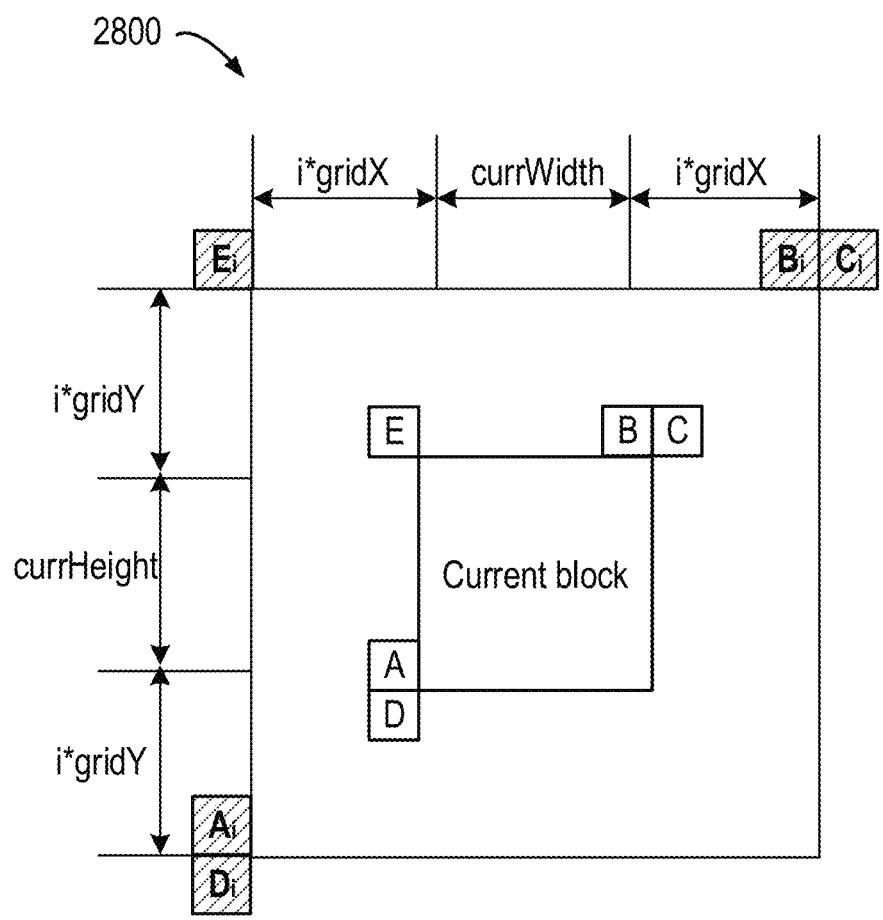
FIG. 28 illustrates illustration of virtual block in the i-th search round.

FIG. 28 illustrates a schematic diagram of a virtual block in the ith search round, which shows the relationship between the virtual block and the current block.

After generating the virtual block, the blocks $A_i$, $B_i$, $C_i$, $D_i$ and $E_i$ can be regarded as the VVC spatial neighboring blocks of the virtual block and their positions are obtained with the same pattern as that in VVC. Obviously, the virtual block is the current block if the search round i is 0. In this case, the blocks $A_i$, $B_i$, $C_i$, $D_i$ and $E_i$ are the spatially neighboring blocks that are used in VVC merge mode. When constructing the merge candidate list, the pruning is performed to guarantee each element in merge candidate list to be unique. The maximum search round is set to 1, which means that five non-adjacent spatial neighbor blocks are utilized.

Non-adjacent spatial merge candidates are inserted into the merge list after the temporal merge candidate in the order of $B_1$->$A_1$->$C_1$->$D_1$->$E_1$.

2.18.2. STMVP

It is proposed to derive an averaging candidate as STMVP candidate using three spatial merge candidates and one temporal merge candidate.

STMVP is inserted before the above-left spatial merge candidate.

The STMVP candidate is pruned with all the previous merge candidates in the merge list.

For the spatial candidates, the first three candidates in the current merge candidate list are used.

For the temporal candidate, the same position as VTM/HEVC collocated position is used.

For the spatial candidates, the first, second, and third candidates inserted in the current merge candidate list before STMVP are denoted as F, S, and, T.

The temporal candidate with the same position as VTM/HEVC collocated position used in TMVP is denoted as Col.

The motion vector of the STMVP candidate in prediction direction X (denoted as mvLX) is derived as follows:

1) If the reference indices of the four merge candidates are all valid and are all equal to zero in prediction direction X (X=0 or 1), mvLX=(mvLX_$F$+mvLX_$S$+mvLX_$T$+mvLX_Col)>>2.

2) If reference indices of three of the four merge candidates are valid and are equal to zero in prediction direction X (X=0 or 1), mvLX=(mvLX_$F$×3+mvLX_$S$×3+mvLX_Col×2)>>3
   or mvLX=(mvLX_$F$×3+mvLX_$T$×3+mvLX_Col×2)>>3
   or mvLX=(mvLX_$S$×3+mvLX_$T$×3+mvLX_Col×2)>>3.

3) If reference indices of two of the four merge candidates are valid and are equal to zero in prediction direction X (X=0 or 1), mvLX=(mvLX_$F$+mvLX_Col)>>1 or mvLX=(mvLX_$S$+mvLX_Col)>>1 or mvLX=(mvLX_$T$+mvLX_Col)>>1.

Note: If the temporal candidate is unavailable, the STMVP mode is off.

2.18.3. Merge List Size

If considering both non-adjacent and STMVP merge candidates, the size of merge list is signalled in sequence parameter set header and the maximum allowed size of merge list is 8.

2.19. Geometric Partitioning Mode (GPM)

In VVC, a geometric partitioning mode is supported for inter prediction. The geometric partitioning mode is signalled using a CU-level flag as one kind of merge mode, with other merge modes including the regular merge mode, the MMVD mode, the CIIP mode and the subblock merge mode. In total 64 partitions are supported by geometric partitioning mode for each possible CU size w×h=$2^m$×$2^n$ with m, n∈{3 . . . 6} excluding 8×64 and 64×8.

Figure 29:
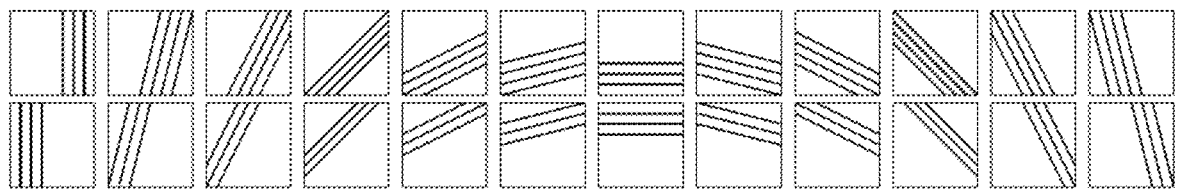
FIG. 29 illustrates examples of the GPM splits grouped by identical angles.

When this mode is used, a CU is split into two parts by a geometrically located straight line as shown in FIG. 29. The location of the splitting line is mathematically derived from the angle and offset parameters of a specific partition. Each part of a geometric partition in the CU is inter-predicted using its own motion; only uni-prediction is allowed for each partition, that is, each part has one motion vector and one reference index. The uni-prediction motion constraint is applied to ensure that same as the conventional bi-prediction, only two motion compensated prediction are needed for each CU. The uni-prediction motion for each partition is derived using the process described in 2.19.1.

If geometric partitioning mode is used for the current CU, then a geometric partition index indicating the partition mode of the geometric partition (angle and offset), and two merge indices (one for each partition) are further signalled. The number of maximum GPM candidate size is signalled explicitly in SPS and specifies syntax binarization for GPM merge indices. After predicting each of part of the geometric partition, the sample values along the geometric partition edge are adjusted using a blending processing with adaptive weights as in 2.19.2. This is the prediction signal for the whole CU, and transform and quantization process will be applied to the whole CU as in other prediction modes. Finally, the motion field of a CU predicted using the geometric partition modes is stored as in 2.19.3.

2.19.1. Uni-Prediction Candidate List Construction

Figure 30:
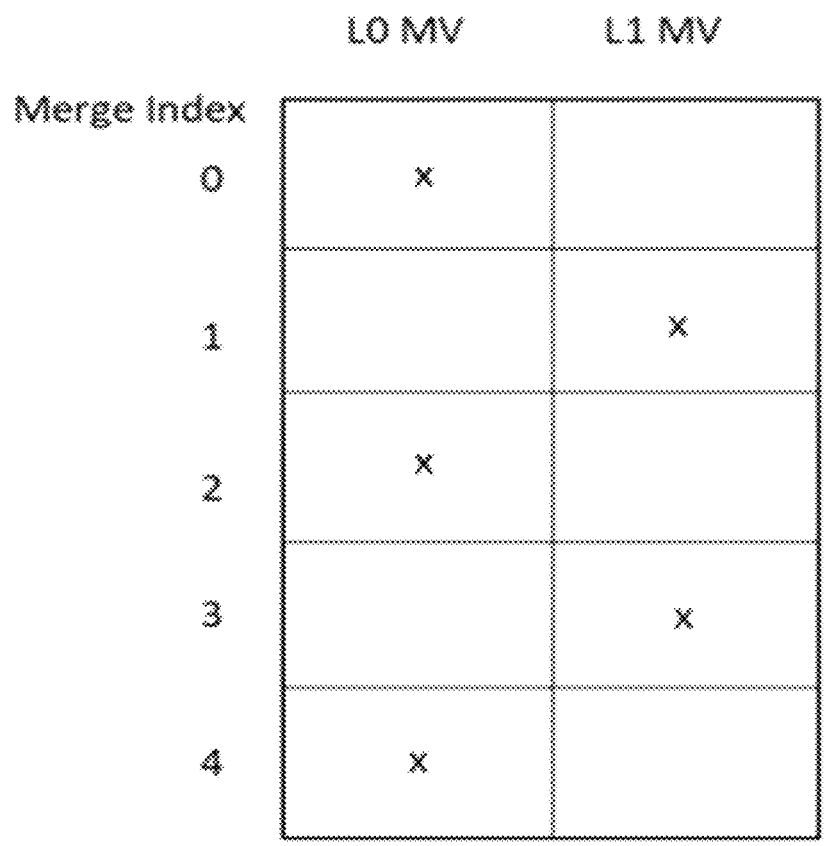
FIG. 30 illustrates uni-prediction MV selection for geometric partitioning mode.

The uni-prediction candidate list is derived directly from the merge candidate list constructed according to the extended merge prediction process in 2.17. Denote n as the index of the uni-prediction motion in the geometric uni-prediction candidate list. The LX motion vector of the n-th extended merge candidate, with X equal to the parity of n, is used as the n-th uni-prediction motion vector for geometric partitioning mode. FIG. 30 shows uni-prediction MV selection for geometric partitioning mode. These motion vectors are marked with "x" in FIG. 30. In case a corresponding LX motion vector of the n-the extended merge candidate does not exist, the L(1−X) motion vector of the same candidate is used instead as the uni-prediction motion vector for geometric partitioning mode.

2.19.2. Blending Along the Geometric Partitioning Edge

After predicting each part of a geometric partition using its own motion, blending is applied to the two prediction signals to derive samples around geometric partition edge. The blending weight for each position of the CU are derived based on the distance between individual position and the partition edge.

The distance for a position (x, y) to the partition edge are derived as:

$$d(x, y) = (2x + 1 - w)\cos(\varphi_i) + (2y + 1 - h)\sin(\varphi_i) - \rho_j \quad (2\text{-}24)$$

$$\rho_j = \rho_{x,j}\cos(\varphi_i) + \rho_{y,j}\sin(\varphi_i) \quad (2\text{-}25)$$

$$\rho_{x,j} = \begin{cases} 0 & i \% 16 = 8 \text{ or } (1 \% 16 \neq 0 \text{ and } h \geq w) \\ \pm(j \times w) \gg 2 & \text{otherwise} \end{cases} \quad (2\text{-}26)$$

$$\rho_{y,j} = \begin{cases} \pm(j \times h) \gg 2 & i \% 16 = 8 \text{ or } (1 \% 16 \neq 0 \text{ and } h \geq w) \\ 0 & \text{otherwise} \end{cases} \quad (2\text{-}27)$$

where i, j are the indices for angle and offset of a geometric partition, which depend on the signaled geometric partition index. The sign of $\rho_{x,j}$ and $\rho_{y,j}$ depend on angle index i.

The weights for each part of a geometric partition are derived as following:

$$wIdxL(x, y) = partIdx?32 + d(x, y):32 - d(x, y), \quad (2\text{-}28)$$

$$w_0(x, y) = \frac{\text{Clip3}(0, 8, (wIdxL(x, y) + 4) \gg 3)}{8}, \quad (2\text{-}29)$$

$$w_1(x, y) = 1 - w_0(x, y). \quad (2\text{-}30)$$

Figure 31:
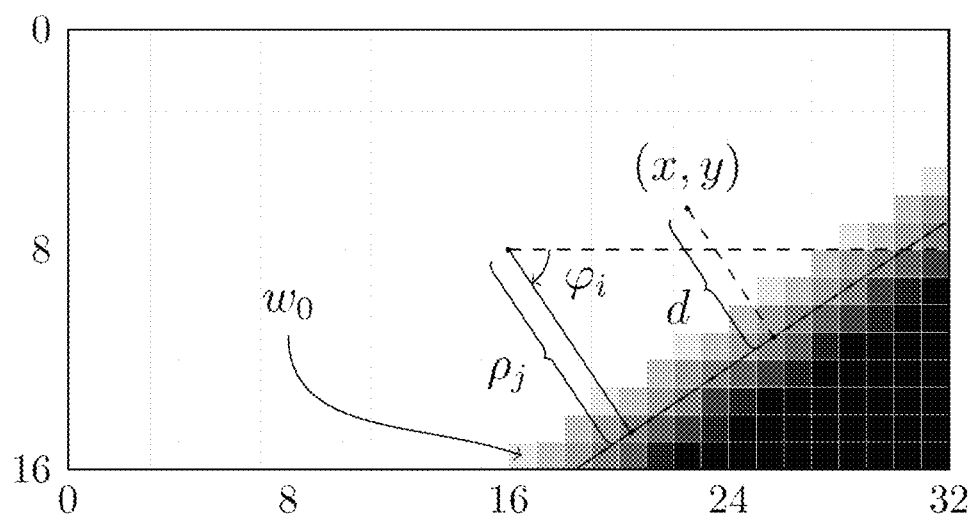
FIG. 31 illustrates exemplified generation of a bending weight w_0 using geometric partitioning mode.

The partIdx depends on the angle index i. FIG. 31 shows exemplified generation of a bending weight $w_0$ using geometric partitioning mode. One example of weigh $w_0$ is illustrated in FIG. 31.

2.19.3. Motion Field Storage for Geometric Partitioning Mode

Mv1 from the first part of the geometric partition, Mv2 from the second part of the geometric partition and a combined Mv of Mv1 and Mv2 are stored in the motion filed of a geometric partitioning mode coded CU.

The stored motion vector type for each individual position in the motion filed are determined as:

$$sType = \quad (2\text{-}31)$$
$$\text{abs}(motionIdx) < 32?2:(motionIdx \leq 0?(1 - partIdx):partIdx)$$

where motionIdx is equal to d(4x+2, 4y+2), which is recalculated from equation (2-18). The partIdx depends on the angle index i.

If sType is equal to 0 or 1, Mv0 or Mv1 are stored in the corresponding motion field, otherwise if sType is equal to 2, a combined Mv from Mv0 and Mv2 are stored. The combined Mv are generated using the following process:

1) If Mv1 and Mv2 are from different reference picture lists (one from L0 and the other from L1), then Mv1 and Mv2 are simply combined to form the bi-prediction motion vectors.

Otherwise, if Mv1 and Mv2 are from the same list, only uni-prediction motion Mv2 is stored.

2.20. Multi-Hypothesis Prediction

In multi-hypothesis prediction (MHP), up to two additional predictors are signalled on top of inter AMVP mode, regular merge mode, affine merge and MMVD mode. The resulting overall prediction signal is accumulated iteratively with each additional prediction signal.

$$P_{n+1} = (1 - \alpha_{n+1})_{P_n} + \alpha_{n+1} h_{n+1}$$

The weighting factor α is specified according to the following Table 2-4:

TABLE 2-4 weighting factor for MHP

| add_hyp_weight_idx | α |
|---|---|
| 0 | ¼ |
| 1 | −⅛ |

For inter AMVP mode, MHP is only applied if non-equal weight in BCW is selected in bi-prediction mode.

The additional hypothesis can be either merge or AMVP mode. In the case of merge mode, the motion information is indicated by a merge index, and the merge candidate list is the same as in the Geometric Partition Mode. In the case of AMVP mode, the reference index, MVP index, and MVD are signaled.

2.21. Non-Adjacent Spatial Candidate

Figure 32:
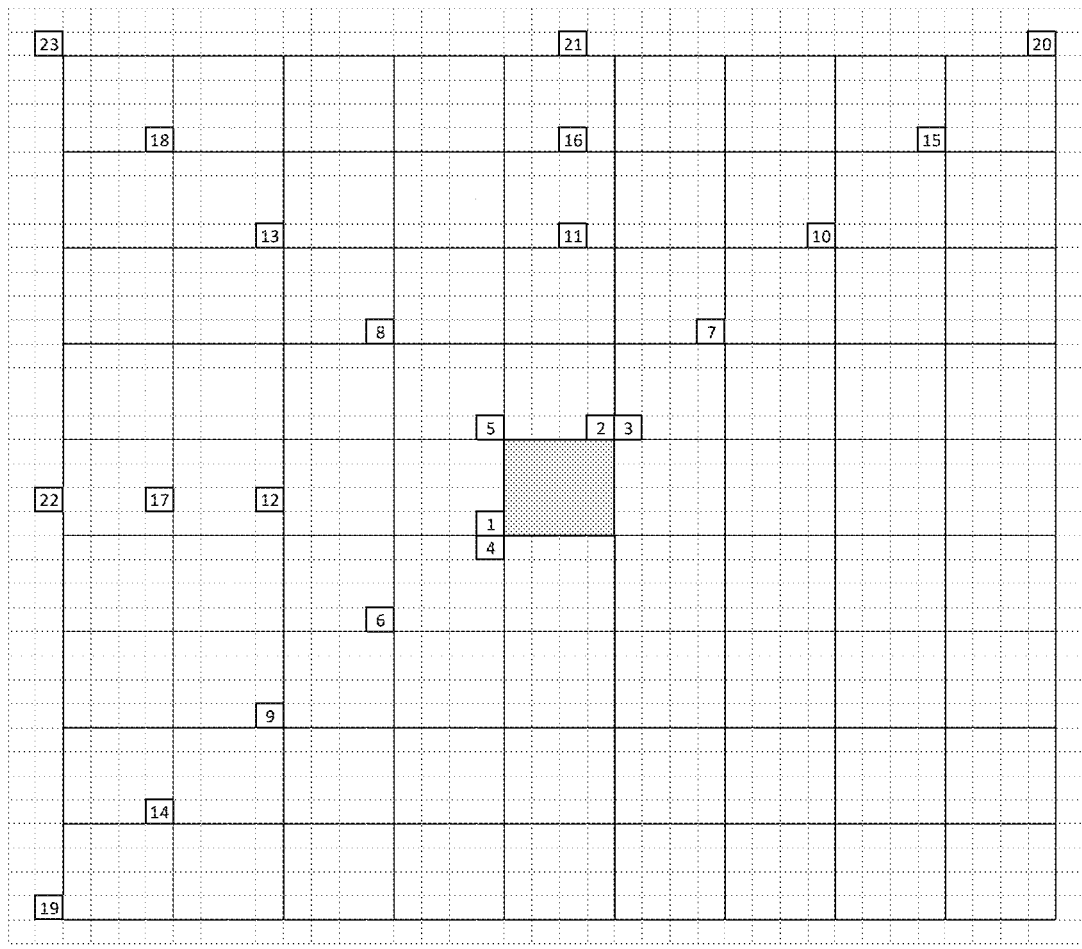
FIG. 32 illustrates spatial neighboring blocks used to derive the spatial merge candidates.

The non-adjacent spatial merge candidates are inserted after the TMVP in the regular merge candidate list. FIG. 32 shows spatial neighboring blocks used to derive the spatial merge candidates. The pattern of the spatial merge candidates is shown in FIG. 32. The distances between the non-adjacent spatial candidates and the current coding block are based on the width and height of the current coding block.

2.22. Template Matching (TM)

Figure 33:
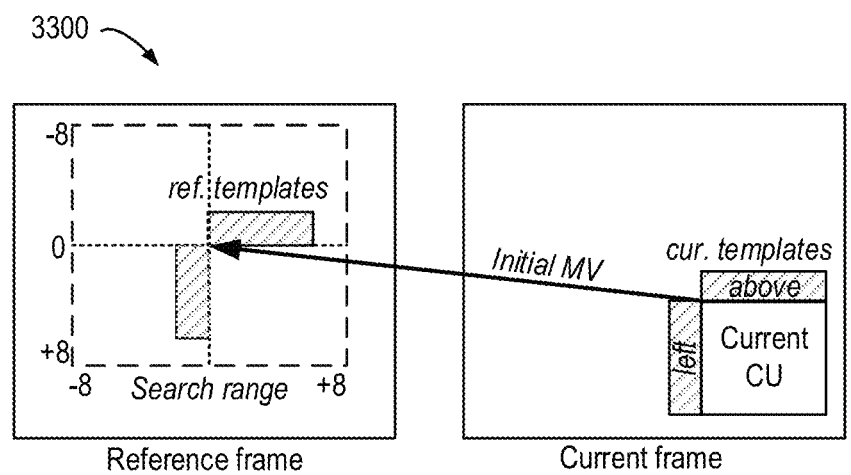
FIG. 33 illustrates template matching performs on a search area around initial MV.

Template matching (TM) is a decoder-side MV derivation method to refine the motion information of the current CU by finding the closest match between a template (i.e., top and/or left neighbouring blocks of the current CU) in the current picture and a block (i.e., same size to the template) in a reference picture. FIG. 33 shows that template matching performs on a search area around initial MV. As illustrated in FIG. 33, a better MV is to be searched around the initial motion of the current CU within a [−8, +8]-pel search range. The template matching that was previously proposed in JVET-J0021 is adopted in this contribution with two modifications: search step size is determined based on AMVR mode and TM can be cascaded with bilateral matching process in merge modes.

In AMVP mode, an MVP candidate is determined based on template matching error to pick up the one which reaches the minimum difference between current block template and reference block template, and then TM performs only for this particular MVP candidate for MV refinement. TM refines this MVP candidate, starting from full-pel MVD precision (or 4-pel for 4-pel AMVR mode) within a [−8, +8]-pel search range by using iterative diamond search. The AMVP candidate may be further refined by using cross search with full-pel MVD precision (or 4-pel for 4-pel AMVR mode), followed sequentially by half-pel and quarter-pel ones depending on AMVR mode as specified in Table 2-5. This search process ensures that the MVP candidate still keeps the same MV precision as indicated by AMVR mode after TM process.

TABLE 2-5

Search patterns of AMVR and merge mode with AMVR.

| Search pattern | AMVR mode | | | | Merge mode | |
|---|---|---|---|---|---|---|
| | 4-pel | Full-pel | Half-pel | Quarter-pel | AltIF = 0 | AltIF = 1 |
| 4-pel diamond | v | | | | | |
| 4-pel cross | v | | | | | |
| Full-pel diamond | | v | v | v | v | v |
| Full-pel cross | | v | v | v | v | v |
| Half-pel cross | | | v | v | v | v |
| Quarter-pel cross | | | | v | v | |
| 1/8-pel cross | | | | | v | |

In merge mode, similar search method is applied to the merge candidate indicated by the merge index. As Table 2-5 shows, TM may perform all the way down to ⅛-pel MVD precision or skipping those beyond half-pel MVD precision, depending on whether the alternative interpolation filter (that is used when AMVR is of half-pel mode) is used according to merged motion information. Besides, when TM mode is enabled, template matching may work as an independent process or an extra MV refinement process between block-based and subblock-based bilateral matching (BM) methods, depending on whether BM can be enabled or not according to its enabling condition check.

2.23. Overlapped Block Motion Compensation (OBMC)

Figure 34:
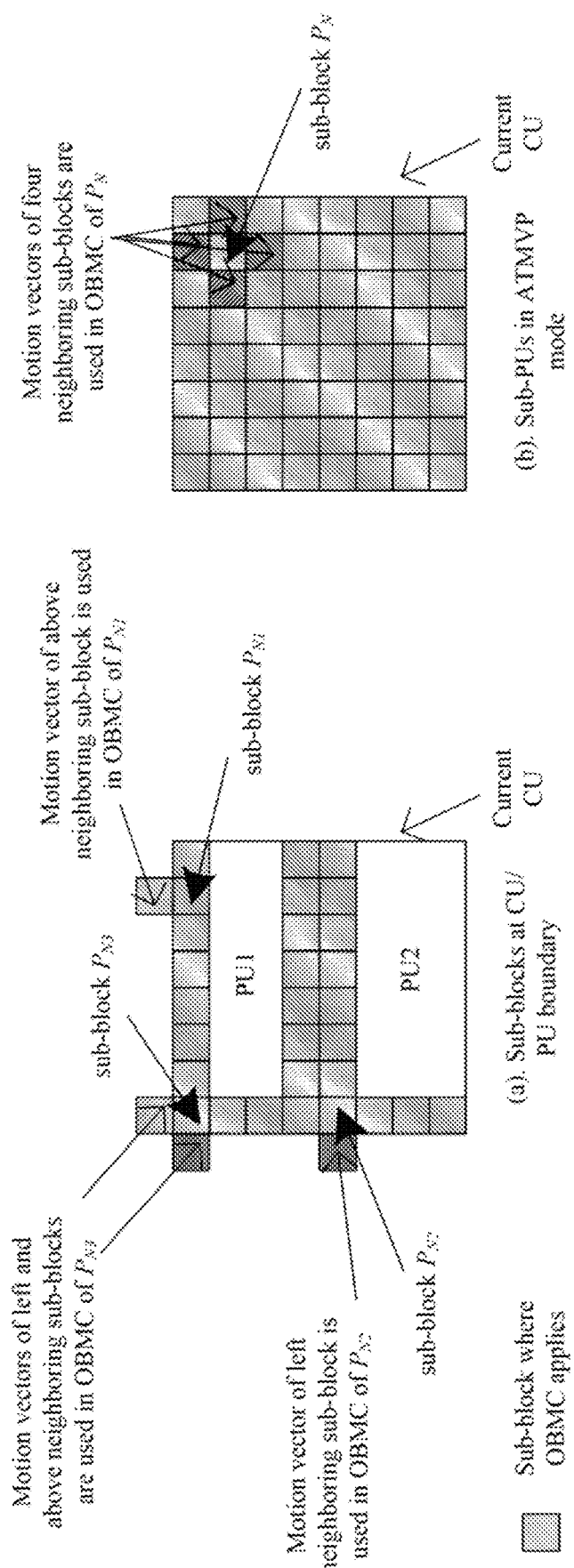
FIG. 34 illustrates illustration of sub-blocks where OBMC applies.

Overlapped Block Motion Compensation (OBMC) has previously been used in H.263. In the JEM, unlike in H.263, OBMC can be switched on and off using syntax at the CU level. When OBMC is used in the JEM, the OBMC is performed for all motion compensation (MC) block boundaries except the right and bottom boundaries of a CU. Moreover, it is applied for both the luma and chroma components. In the JEM, a MC block is corresponding to a coding block. When a CU is coded with sub-CU mode (includes sub-CU merge, affine and FRUC mode), each sub-block of the CU is a MC block. FIG. 34 is illustration of sub-blocks where OBMC applies. To process CU boundaries in a uniform fashion, OBMC is performed at sub-block level for all MC block boundaries, where sub-block size is set equal to 4×4, as illustrated in FIG. 34.

When OBMC applies to the current sub-block, besides current motion vectors, motion vectors of four connected neighbouring sub-blocks, if available and are not identical to the current motion vector, are also used to derive prediction block for the current sub-block. These multiple prediction blocks based on multiple motion vectors are combined to generate the final prediction signal of the current sub-block.

Prediction block based on motion vectors of a neighbouring sub-block is denoted as $P_N$, with N indicating an index for the neighbouring above, below, left and right sub-blocks and prediction block based on motion vectors of the current sub-block is denoted as $P_C$. When $P_N$ is based on the motion information of a neighbouring sub-block that contains the same motion information to the current sub-block, the OBMC is not performed from $P_N$. Otherwise, every sample of $P_N$ is added to the same sample in $P_C$, i.e., four rows/columns of $P_N$ are added to $P_C$. The weighting factors {¼, ⅛, 1/16, 1/32} are used for $P_N$ and the weighting factors {¾, ⅞, ¹⁵⁄₁₆, ³¹⁄₃₂} are used for $P_C$. The exception are small MC blocks, (i.e., when height or width of the coding block is equal to 4 or a CU is coded with sub-CU mode), for which only two rows/columns of $P_N$ are added to $P_C$. In this case weighting factors {¼, ⅛} are used for $P_N$ and weighting factors {¾, ⅞} are used for $P_C$. For $P_N$ generated based on motion vectors of vertically (horizontally) neighbouring sub-block, samples in the same row (column) of $P_N$ are added to $P_C$ with a same weighting factor.

In the JEM, for a CU with size less than or equal to 256 luma samples, a CU level flag is signalled to indicate whether OBMC is applied or not for the current CU. For the CUs with size larger than 256 luma samples or not coded with AMVP mode, OBMC is applied by default. At the encoder, when OBMC is applied for a CU, its impact is taken into account during the motion estimation stage. The prediction signal formed by OBMC using motion information of the top neighbouring block and the left neighbouring block is used to compensate the top and left boundaries of the original signal of the current CU, and then the normal motion estimation process is applied.

2.24. Multiple Transform Selection (MTS) for Core Transform

In addition to DCT-II which has been employed in HEVC, a Multiple Transform Selection (MTS) scheme is used for residual coding both inter and intra coded blocks. It uses multiple selected transforms from the DCT8/DST7. The newly introduced transform matrices are DST-VII and DCT-VIII. Table 2-6 shows the basis functions of the selected DST/DCT.

TABLE 2-6

Transform basis functions of DCT-II/VIII and DSTVII for N-point input

| Transform Type | Basis function $T_i(j)$, i, j = 0, 1, . . . , N − 1 |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$ <br> where, $\omega_0 = \begin{cases} \sqrt{\frac{2}{N}} & i = 0 \\ 1 & i \neq 0 \end{cases}$ |

TABLE 2-6-continued

Transform basis functions of DCT-II/VIII and DSTVII for N-point input

| Transform Type | Basis function $T_i(j)$, i, j = 0, 1, . . . , N − 1 |
|---|---|
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

In order to keep the orthogonality of the transform matrix, the transform matrices are quantized more accurately than the transform matrices in HEVC. To keep the intermediate values of the transformed coefficients within the 16-bit range, after horizontal and after vertical transform, all the coefficients are to have 10-bit.

In order to control MTS scheme, separate enabling flags are specified at SPS level for intra and inter, respectively. When MTS is enabled at SPS, a CU level flag is signalled to indicate whether MTS is applied or not. Here, MTS is applied only for luma. The MTS signaling is skipped when one of the below conditions is applied.

The position of the last significant coefficient for the luma TB is less than 1 (i.e., DC only).

The last significant coefficient of the luma TB is located inside the MTS zero-out region.

If MTS CU flag is equal to zero, then DCT2 is applied in both directions. However, if MTS CU flag is equal to one, then two other flags are additionally signalled to indicate the transform type for the horizontal and vertical directions, respectively. Transform and signalling mapping table as shown in Table 2-7. Unified the transform selection for ISP and implicit MTS is used by removing the intra-mode and block-shape dependencies. If current block is ISP mode or if the current block is intra block and both intra and inter explicit MTS is on, then only DST7 is used for both horizontal and vertical transform cores. When it comes to transform matrix precision, 8-bit primary transform cores are used. Therefore, all the transform cores used in HEVC are kept as the same, including 4-point DCT-2 and DST-7, 8-point, 16-point and 32-point DCT-2. Also, other transform cores including 64-point DCT-2, 4-point DCT-8, 8-point, 16-point, 32-point DST-7 and DCT-8, use 8-bit primary transform cores.

TABLE 2-7

Transform and signalling mapping table

| | | | Intra/inter | |
|---|---|---|---|---|
| MTS_CU_flag | MTS_Hor_flag | MTS_Ver_flag | Horizontal | Vertical |
| 0 | | | | DCT2 |
| 1 | 0 | 0 | DST7 | DST7 |
| | 0 | 1 | DCT8 | DST7 |
| | 1 | 0 | DST7 | DCT8 |
| | 1 | 1 | DCT8 | DCT8 |

To reduce the complexity of large size DST-7 and DCT-8, High frequency transform coefficients are zeroed out for the DST-7 and DCT-8 blocks with size (width or height, or both width and height) equal to 32. Only the coefficients within the 16×16 lower-frequency region are retained.

As in HEVC, the residual of a block can be coded with transform skip mode. To avoid the redundancy of syntax coding, the transform skip flag is not signalled when the CU level MTS_CU_flag is not equal to zero. Note that implicit MTS transform is set to DCT2 when LFNST or MIP is activated for the current CU. Also the implicit MTS can be still enabled when MTS is enabled for inter coded blocks.

2.25. Subblock Transform (SBT)

In VTM, subblock transform is introduced for an inter-predicted CU. In this transform mode, only a sub-part of the residual block is coded for the CU. When inter-predicted CU with cu_cbf equal to 1, cu_sbt_flag may be signaled to indicate whether the whole residual block or a sub-part of the residual block is coded. In the former case, inter MTS information is further parsed to determine the transform type of the CU. In the latter case, a part of the residual block is coded with inferred adaptive transform and the other part of the residual block is zeroed out.

Figure 35:
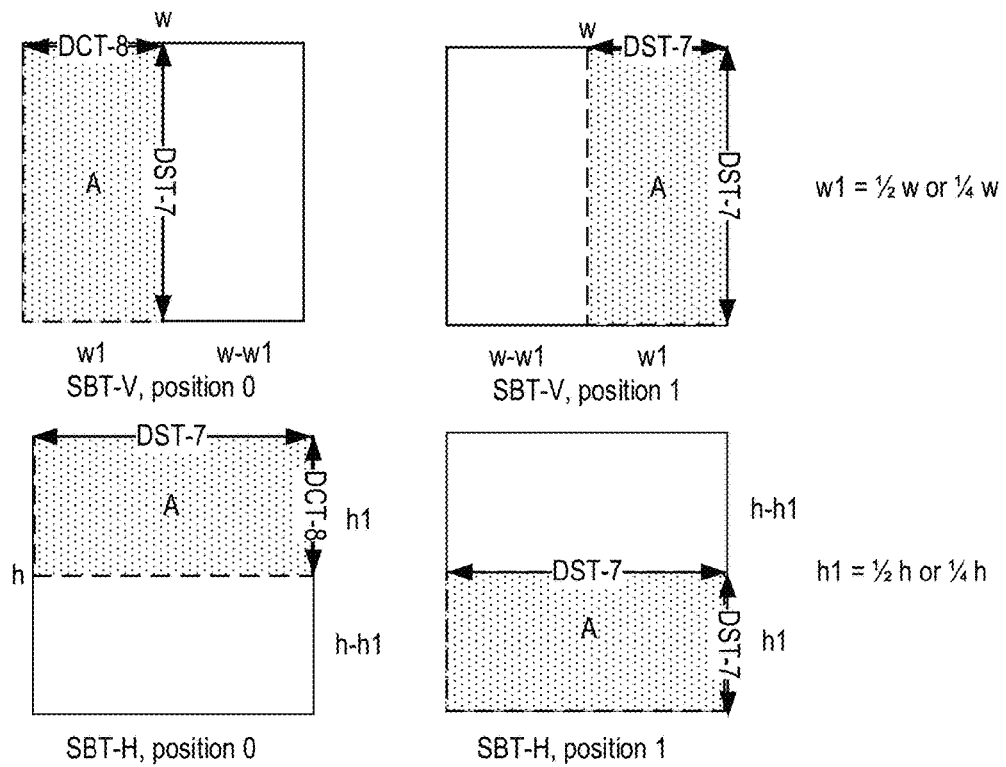
FIG. 35 illustrates SBT position, type and transform type.

When SBT is used for an inter-coded CU, SBT type and SBT position information are signaled in the bitstream. There are two SBT types and two SBT positions, as indicated in FIG. 35. For SBT-V (or SBT-H), the TU width (or height) may equal to half of the CU width (or height) or ¼ of the CU width (or height), resulting in 2:2 split or 1:3/3:1 split. The 2:2 split is like a binary tree (BT) split while the 1:3/3:1 split is like an asymmetric binary tree (ABT) split. In ABT splitting, only the small region contains the non-zero residual. If one dimension of a CU is 8 in luma samples, the 1:3/3:1 split along that dimension is disallowed. There are at most 8 SBT modes for a CU.

Position-dependent transform core selection is applied on luma transform blocks in SBT-V and SBT-H (chroma TB always using DCT-2). The two positions of SBT-H and SBT-V are associated with different core transforms. FIG. 35 shows SBT position, type and transform type. More specifically, the horizontal and vertical transforms for each SBT position is specified in FIG. 35. For example, the horizontal and vertical transforms for SBT-V position 0 is DCT-8 and DST-7, respectively. When one side of the residual TU is greater than 32, the transform for both dimensions is set as DCT-2. Therefore, the subblock transform jointly specifies the TU tiling, cbf, and horizontal and vertical core transform type of a residual block.

The SBT is not applied to the CU coded with combined inter-intra mode.

2.26. Template Matching Based Adaptive Merge Candidate Reorder

To improve the coding efficiency, after the merge candidate list is constructed, the order of each merge candidate is adjusted according to the template matching cost. The merge candidates are arranged in the list in accordance with the template matching cost of ascending order. It is operated in the form of sub-group.

Figure 36:
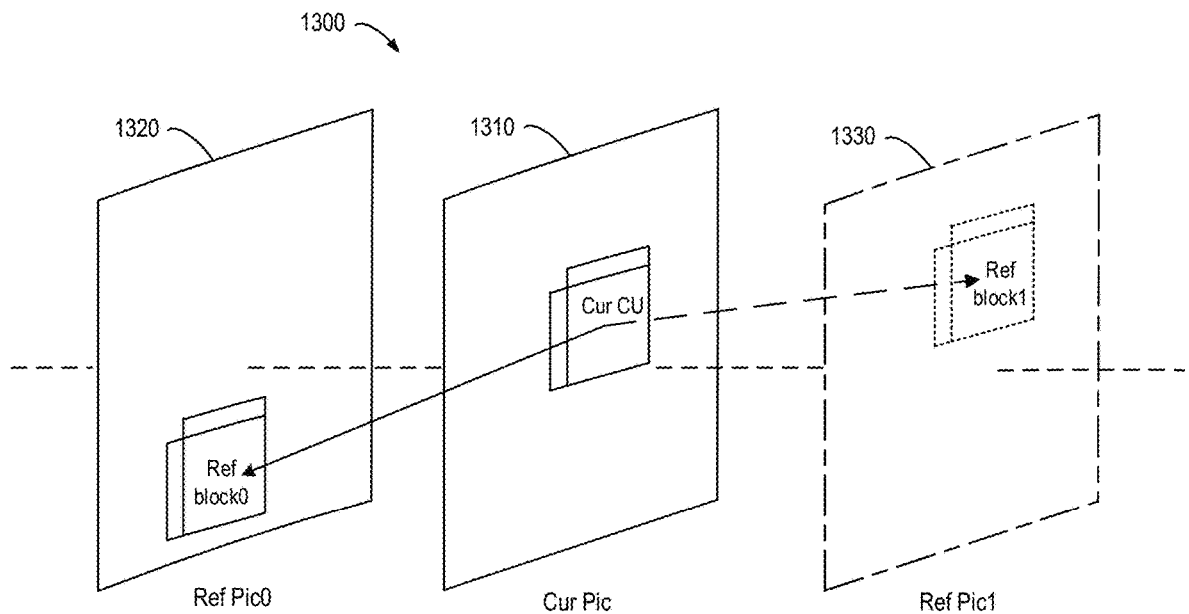
FIG. 36 illustrates neighbouring samples used for calculating SAD.
Figure 37:
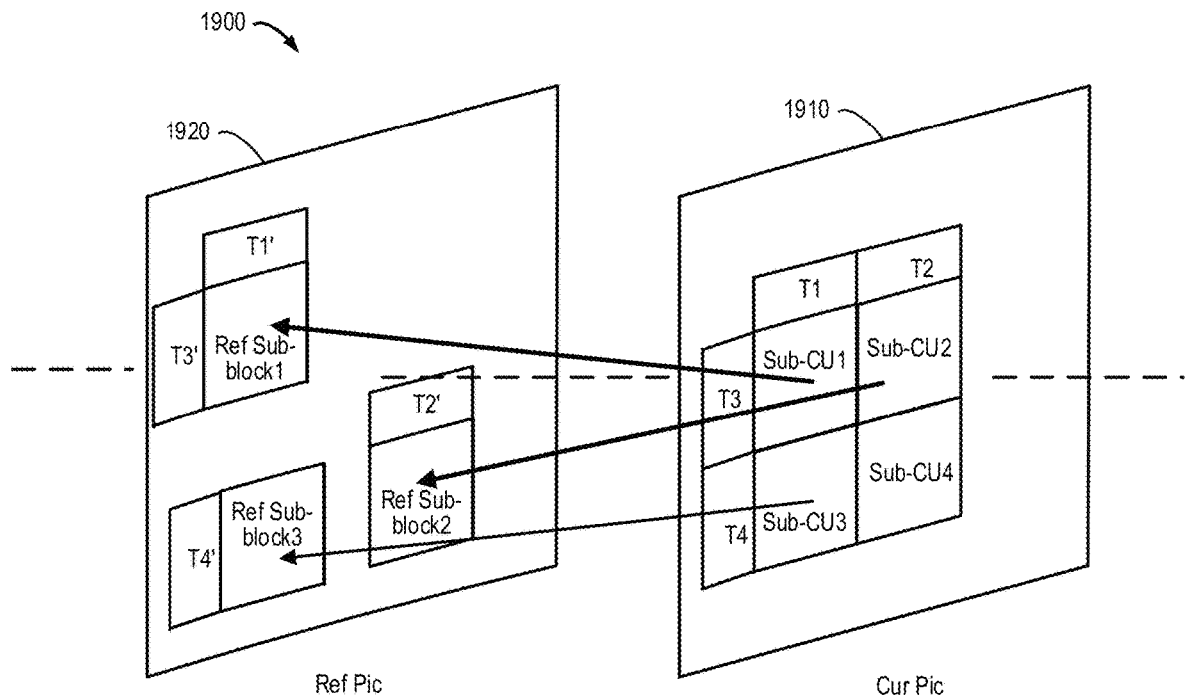
FIG. 37 illustrates neighbouring samples used for calculating SAD for sub-CU level motion information.

The template matching cost is measured by the SAD (Sum of absolute differences) between the neighbouring samples of the current CU and their corresponding reference samples. FIG. 36 shows neighbouring samples used for calculating SAD. If a merge candidate includes bi-predictive motion information, the corresponding reference samples are the average of the corresponding reference samples in reference list0 and the corresponding reference samples in reference list1, as illustrated in FIG. 36. FIG. 37 shows neighbouring samples used for calculating SAD for sub-CU level motion information If a merge candidate includes sub-CU level motion information, the corresponding reference samples consist of the neighbouring samples of the corresponding reference sub-blocks, as illustrated in FIG. 37.

Figure 38:
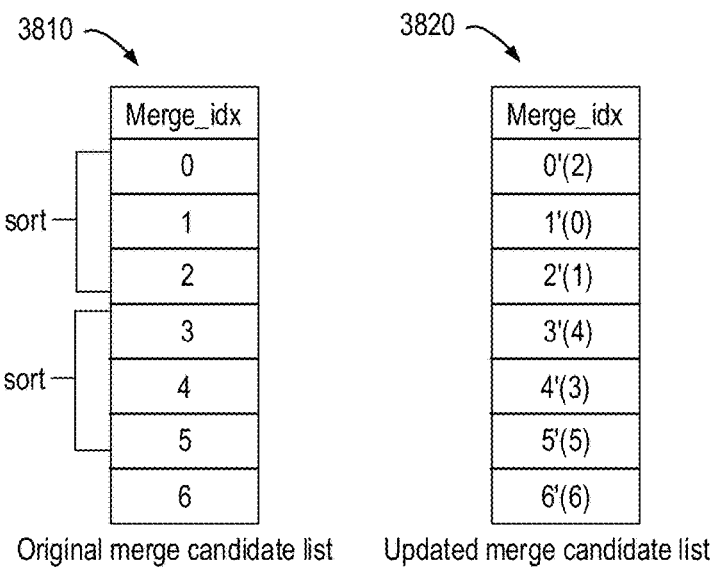
FIG. 38 illustrates the sorting process.

The sorting process is operated in the form of sub-group, as illustrated in FIG. 38. The first three merge candidates are sorted together. The following three merge candidates are sorted together. As shown in FIG. 38, an original merge candidate list 3810 is sorted to obtain an updated merge candidate list 380. In this example, the template size (width of the left template or height of the above template) is 1, and the sub-group size is 3.

2.27. Adaptive Merge Candidate List

Figure 39:
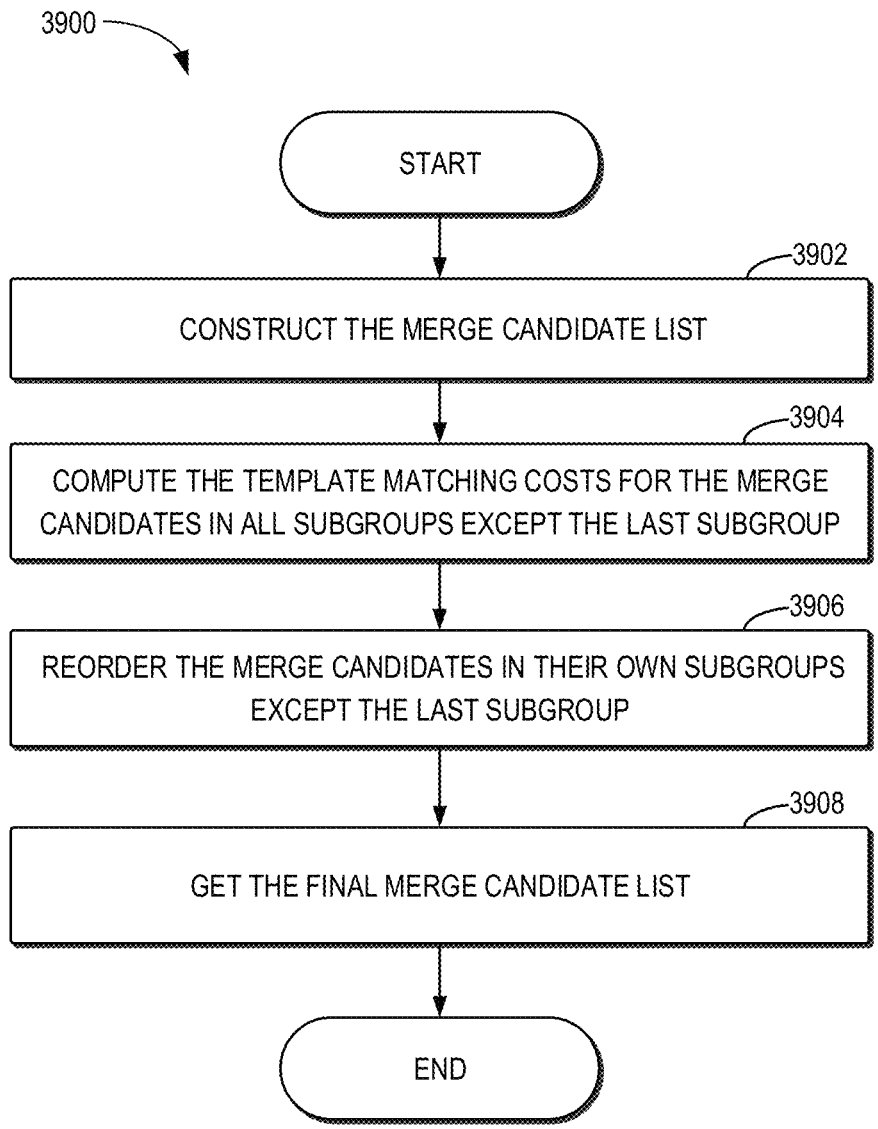
FIG. 39 illustrates reorder process in encoder.

It is to assume the number of the merge candidates is 8. The first 5 merge candidates are taken as a first subgroup and take the following 3 merge candidates as a second subgroup (i.e. the last subgroup). FIG. 39 which illustrates a flowchart of a reorder process 3900 in an encoder. For the encoder, after the merge candidate list is constructed at block 3902, some merge candidates are adaptively reordered in an ascending order of costs of merge candidates as shown in FIG. 39.

More specifically, at block 3904, the template matching costs for the merge candidates in all subgroups except the last subgroup are computed; then at block 3906, the merge candidates in their own subgroups are reordered except the last subgroup; finally, at block 3908, the final merge candidate list will be got.

Figure 40:
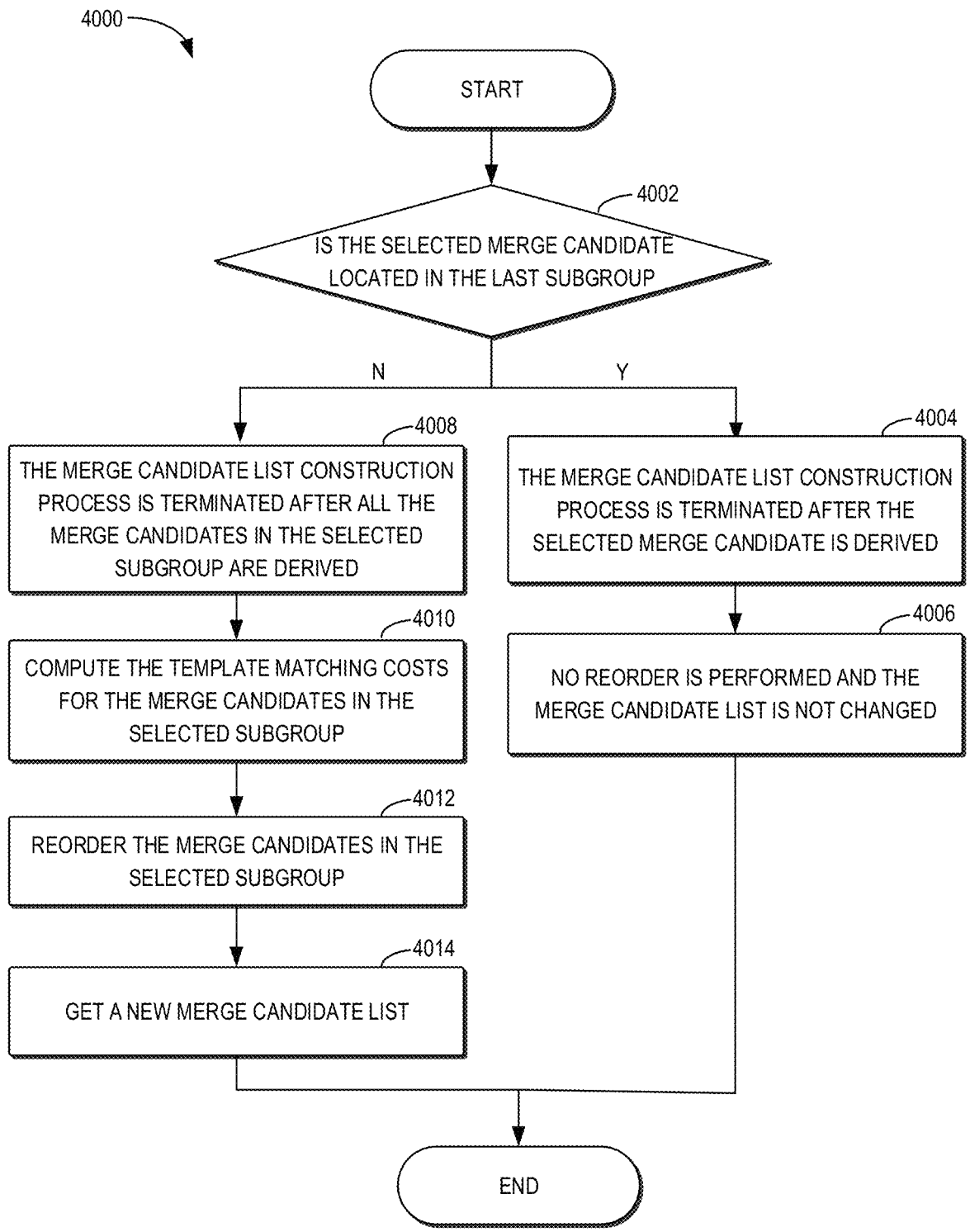
FIG. 40 illustrates reorder process in decoder.

For the decoder, after the merge candidate list is constructed, some/no merge candidates are adaptively reordered in ascending order of costs of merge candidates as shown in FIG. 40 which illustrates a flowchart of a reorder process 4000 in a decoder. In FIG. 40, the subgroup the selected (signaled) merge candidate located in is called the selected subgroup.

More specifically, at block 4002, it is determined if the selected merge candidate is located in the last subgroup. If the selected merge candidate is located in the last subgroup, at block 4004, the merge candidate list construction process is terminated after the selected merge candidate is derived, and at block 4006, no reorder is performed and the merge candidate list is not changed; otherwise, the execution process is as follows:

At block 4008, the merge candidate list construction process is terminated after all the merge candidates in the selected subgroup are derived; at block 4010, the template matching costs for the merge candidates in the selected subgroup are computed; at block 4012, the merge candidates in the selected subgroup are reordered; finally, at block 4014, a new merge candidate list will be got.

For both encoder and decoder, a template matching cost is derived as a function of T and RT, wherein T is a set of samples in the template and RT is a set of reference samples for the template.

When deriving the reference samples of the template for a merge candidate, the motion vectors of the merge candidate are rounded to the integer pixel accuracy.

The reference samples of the template (RT) for bi-directional prediction are derived by weighted averaging of the reference samples of the template in reference list0 ($RT_0$) and the reference samples of the template in reference list1 ($RT_1$) as follows.

$$RT = ((8-w)*RT_0 + w*RT_1 + 4) \gg 3 \qquad (2\text{-}32)$$

where the weight of the reference template in reference list0 (8−w) and the weight of the reference template in reference list1 (w) are decided by the BCW index of the merge candidate. BCW index equal to {0, 1, 2, 3, 4} corresponds to w equal to {−2, 3, 4, 5, 10}, respectively.

If the Local Illumination Compensation (LIC) flag of the merge candidate is true, the reference samples of the template are derived with LIC method.

The template matching cost is calculated based on the sum of absolute differences (SAD) of T and RT. The template size is 1. That means the width of the left template and/or the height of the above template is 1.

If the coding mode is MMVD, the merge candidates to derive the base merge candidates are not reordered.

If the coding mode is GPM, the merge candidates to derive the uni-prediction candidate list are not reordered.

2.28. Geometric Prediction Mode with Motion Vector Difference

In Geometric prediction mode with Motion Vector Difference (GMVD), each geometric partition in GPM can decide to use GMVD or not. If GMVD is chosen for a geometric region, the MV of the region is calculated as a sum of the MV of a merge candidate and an MVD. All other processing is kept the same as in GPM.

With GMVD, an MVD is signaled as a pair of direction and distance. There are nine candidate distances (¼-pel, ½-pel, 1-pel, 2-pel, 3-pel, 4-pel, 6-pel, 8-pel, 16-pel), and eight candidate directions (four horizontal/vertical directions and four diagonal directions) involved. In addition, when pic_fpel_mmvd_enabled_flag is equal to 1, the MVD in GMVD is also left shifted by 2 as in MMVD.

2.29. Affine MMVD

In affine MMVD, an affine merge candidate (which is called, base affine merge candidate) is selected, the MVs of the control points are further refined by the signalled MVD information.

The MVD information for the MVs of all the control points are the same in one prediction direction. When the starting MVs is bi-prediction MVs with the two MVs point to the different sides of the current picture (i.e. the POC of one reference is larger than the POC of the current picture, and the POC of the other reference is smaller than the POC of the current picture), the MV offset added to the list0 MV component of starting MV and the MV offset for the list1 MV has opposite value; otherwise, when the starting MVs is bi-prediction MVs with both lists point to the same side of the current picture (i.e. POCs of two references are both larger than the POC of the current picture, or are both smaller than the POC of the current picture), the MV offset added to the list0 MV component of starting MV and the MV offset for the list 1 MV are the same.

2.30. Adaptive Decoder Side Motion Vector Refinement (ADMVR)

In ECM-2.0, a multi-pass decoder-side motion vector refinement (DMVR) method is applied in regular merge mode if the selected merge candidate meets the DMVR conditions. In the first pass, bilateral matching (BM) is applied to the coding block. In the second pass, BM is applied to each 16×16 subblock within the coding block. In the third pass, MV in each 8×8 subblock is refined by applying bi-directional optical flow (BDOF).

Adaptive decoder side motion vector refinement method consists of the two new merge modes introduced to refine MV only in one direction, either L0 or L1, of the bi prediction for the merge candidates that meet the DMVR conditions. The multi-pass DMVR process is applied for the selected merge candidate to refine the motion vectors, however either MVD0 or MVD1 is set to zero in the 1st pass (i.e., PU level) DMVR.

Like the regular merge mode, merge candidates for the proposed merge modes are derived from the spatial neighboring coded blocks, TMVPs, non-adjacent blocks, HMVPs, and pair-wise candidate. The difference is that only those meet DMVR conditions are added into the candidate list. The same merge candidate list (i.e., ADMVR merge list) is used by the two proposed merge modes and merge index is coded as in regular merge mode.

3. PROBLEMS

In current design of template matching based adaptive merge candidate reorder, the motion information of the merge candidates are directly used in the reordering process. However, the motion information of some merge candidates may be modified by motion refinement, such as template matching and/or decoder-side motion vector refinement. Since the motion information used in the reordering process is not aligned with the motion information used in the reconstruction of a video unit, the reordering process may be not efficient.

4. EMBODIMENTS OF THE PRESENT DISCLOSURE

The detailed embodiments below should be considered as examples to explain general concepts. These embodiments should not be interpreted in a narrow way. Furthermore, these embodiments can be combined in any manner.

In the disclosure, a motion candidate list may refer to a motion candidate list for TM merge mode, and/or regular merge mode, and/or adaptive DMVR, and/or CIIP with TM merge mode, and/or AMVP, and/or affine, and/or GPM (GEO), and/or TPM, and/or MMVD, and/or CIIP, and/or MHP, and/or AMVP-Merge, affine AMVP, TM AMVP, GPM with MMVD, IBC merge, IBC AMVP, template-IBC, intra template matching, and/or any inter mode using a motion candidate list to derive the prediction/reconstruction of the block.

A motion candidate list may be the TM merge/AMVP list after block-based bilateral matching refinement and/or template matching refinement and/or subblock-based bilateral matching refinement. A motion candidate list may be the regular merge/AMVP list after the DMVR/multi-pass DMVR process.

A motion candidate list may be the ADMVR merge list after the DMVR/multi-pass DMVR process.

A motion candidate list may be the GPM merge list after the template matching refinement process (e.g., AGPMList, LGPMList, or LAGPMList).

In the following discussion, SatShift(x, n) is defined as $$SatShift(x, n) = \begin{cases} (x + offset0) \gg n & ; \ x >= 0 \\ -((-x + offset1) \gg n) & ; \ x < 0 \end{cases}$$

In one example, offset0 and/or offset1 are set to (1<<n) >>1 or (1<<(n−1)). In another example, offset0 and/or offset1 are set to 0.

Shift(x, n) is defined as Shift(x, n)=(x+offset0)>>n.

Clip3(x, y, z) is defined as $$\text{Clip3}(x, y, z) = \begin{cases} x & ; \quad z < x \\ y & ; \quad z > y \\ z & ; \quad \text{otherwise} \end{cases}$$

$$\text{Abs}(x) = \begin{cases} x & ; \quad x >= 0 \\ -x & ; \quad x < 0 \end{cases}$$

Reordering the Motion Candidate List Using Refined Motion Information

1. It is proposed that before conducting a first reordering procedure on a motion candidate list, at least one motion candidates in the list may be modified or refined.
   a. When one or more motion candidates in a motion candidate list are modified by a motion refinement process for a video unit, it is proposed to reorder the motion candidate list using the refined motion information.
   b. In one example, a second reordering procedure may be conducted on the motion candidate list before the first reordering procedure.
      i. In one example, the motion candidate list may be reordered using the original motion information when constructing the motion candidate list in the second reordering procedure.
   c. In one example, the motion candidate list may have not been reordered before being reordered using the first reordering procedure.
   d. In one example, the motion refinement process may refer to a template matching based motion refinement, such as template matching, and/or a bilateral matching based motion refinement, such as DMVR, multi-pass DMVR.
   e. In one example, a simplified version of the motion refinement process may be applied.
      i. In one example, template size may be set equal to 1 or 2 when template matching is used as one of the motion refinement processes.
   f. In one example, the refined motion information used in the first reordering process may be the final motion information of the motion refinement process.
      i. In one example, when the motion refinement process contains multiple steps, the motion information after the last step in the motion refinement process may be used in the first reordering process.
         1) In one example, the multiple steps may refine the motion information at different resolutions of motion vector.
            a) In one example, the refinement may be from an integer resolution motion vector to a fractional resolution motion vector.
            b) In another example, the refinement may be from a fractional resolution motion vector to a fractional resolution motion vector.
            c) In one example, the different resolutions of motion vector may refer to 16-pel, and/or 8-pel, and/or 4-pel, and/or 2-pel, and/or 1-pel, and/or ½-pel, and/or ¼-pel, and/or ⅛-pel, and/or ¹⁄₁₆-pel, and/or ¹⁄₃₂-pel, and/or ¹⁄₆₄-pel.
         2) In one example, the multiple steps may refer to different searching shapes to refine the motion vector, such as diamond and/or cross shape in template matching.
            a) In one example, the motion information after the diamond searching shape of template matching may be used in the first reordering process.
         3) In one example, which resolution of motion vector to be used may be dependent on a syntax element indicating the resolution of motion vector of a motion candidate, such as the value of adaptive motion vector resolution.
         4) In one example, when early termination is used in the motion refinement process, the motion information output due to the early termination may be used in the first reordering process.
      ii. In one example, when more than one motion refinement processes are involved and processed one by one, the motion information derived after the last motion refinement process may be used in the first reordering process.
         1) In one example, when the motion refinement processes include a 1st motion refinement process and a 2nd motion refinement process, the motion information of the 2nd motion refinement process may be used in the first reordering process.
            a) In one example, the 1st motion refinement process may refer to a template matching method, such as TM, or a bilateral matching method such as DMVR/multi-pass DMVR.
            b) In one example, the 2nd motion refinement process may refer to a template matching method, such as TM, or a bilateral matching method such as DMVR/multi-pass DMVR.
   g. In one example, the refined motion information used in the first reordering process may be the intermediate motion information of the motion refinement process.
      i. In one example, when the motion refinement process contains multiple steps, the motion information before the last step in the motion refinement process may be used.
         1) In one example, the motion information in the 1st step may be used.
         2) In another example, the motion information in the integer resolution (e.g., 16-pel, 8-pel, 4-pel, 2-pel, 1-pel) of motion vector may be used.
      ii. In one example, when more than one motion refinement processes are involved and processed one by one, the motion information derived from any motion refinement process before the last motion refinement process may be used in the first reordering process.
         1) In one example, when the motion refinement processes include a 1st motion refinement process and a 2nd motion refinement process, the motion information of the 1st motion refinement process may be used.
            a) In one example, the 1st motion refinement process may refer to a template matching method, such as TM, or a bilateral matching method such as DMVR/multi-pass DMVR.
            b) In one example, the 2nd motion refinement process may refer to a template matching method, such as TM, or a bilateral matching method such as DMVR/multi-pass DMVR.
      iii. In one example, when more than one motion refinement processes are involved and processed one by one, and the last motion refinement process contains multiple steps, the motion information derived from any step before the last step in the last motion refinement process may be used in the first reordering process.
- iv. In one example, when the motion refinement process contains TM and multi-pass DMVR and TM is processed between the first-pass DMVR (e.g., block based bilateral matching MV refinement) and the second-pass DMVR (e.g., sub-block based bilateral matching MV refinement), the motion information after TM may be used in the first reordering process.
  1) Alternatively, the motion information after the first-pass DMVR may be used.
  2) Alternatively, the motion information after the second-pass DMVR may be used.
  3) In one example, an early termination method used to skip the second-pass DMVR may be not applied when the refined motion information is used in the first reordering process.
- h. In one example, when the refined motion information is sub-block-based motion information, the refined motion information of one or more sub-blocks may be used in the first reordering process.
  - i. In one example, the refined motion information of one of sub-blocks may be used in the first reordering process.
    1) In one example, the refined motion information of the top-left sub-block, or one of sub-blocks locating at the left block boundary, or one of sub-blocks locating at the above block boundary may be used.
  - ii. In one example, the refined motion information of more than one sub-blocks may be used in the first reordering process.
    1) In one example, the motion information of all sub-blocks may be averaged and used.
       a) In one example, the motion information of all sub-blocks may be weighted averaged, and the weighting parameters may depend on the block/sub-block dimensions/sizes, and/or distances between sub-blocks and the template used in the reordering process.
    2) In another example, the motion information of sub-blocks at the above boundary, and/or the motion information of sub-blocks at the left boundary may be used.
- i. In one example, the motion candidates may be divided into X sub-groups, and the reordering process may be processed within each sub-group, where X is larger than 1.
  - i. In one example, the sub-group size (i.e., number of motion candidates within a sub-group, $N_s$) may be same for all sub-groups, such as $N_s$=2, 3, 4, 5, 6, 7, 8, 9, 10.
  - ii. In another example, at least one sub-group sizes may be different from other sub-groups.
  - iii. In one example, the size of the first sub-group is larger than, or less than that of the other sub-groups.
  - iv. In one example, the sub-group size may be pre-defined.
  - v. In one example, the motion candidates may be divided into multiple sub-groups according to the motion candidate type (e.g., adjacent spatial, temporal, non-adjacent spatial, HMVP).
  - vi. In one example, the subgroup size may be determined according to the available number of the types of motion candidates (e.g., adjacent spatial and/or temporal motion candidates).
2. In one example, whether to and/or how to apply the reordering process using the refined motion information may be signalled in the bitstreams, or determined on-the-fly, or dependent on coding information.
   a. In one example, the reordering process using the refined motion information may be applied for a video unit with size larger than T1, such as T1=8, or 16, or 32, or 64, or 128.
   b. In another example, the reordering process using the refined motion information may be applied for a video unit with size smaller than T1, such as T1=64, or 128, or 256, or 512, or 1024, or 2048.
3. In one example, when the reordering process using the refined motion information is applied to an inter mode with single-side DMVR, adaptive DMVR, the reordering process using refined motion may be applied to reorder the 1st motion candidate list, and/or the 2nd motion candidate list, wherein the motion candidates in the 1st motion candidate list are refined in one side (direction) and the motion candidates in the 2nd motion candidate list are refined in another side (direction).
   a. In one example, the single-side DMVR may refer to a DMVR method in which the motion information (e.g., motion vector) is refined in one direction at a step of DMVR.
     i. In one example, the motion information may be refined in one direction at the first pass of the multi-pass DMVR.
     ii. In one example, the motion information may be refined in one direction at the first pass and/or the second pass of the multi-pass DMVR.
   b. In one example, the inter mode may refer to adaptive DMVR.
   c. In one example, the reordering process may be applied to reorder the 1st motion candidate list and the 2nd motion candidate list individually.
   d. In another example, the 1st candidate list and the 2nd motion candidate list may be combined together, and the reordering process may be used to reorder the combined motion candidate list.
   e. In one example, the refined motion information used in the reordering process may be the block based MV of the first pass in multi-pass DMVR.
4. In one example, it is proposed to remove the redundant motion candidates from one or more motion candidate lists for adaptive DMVR.
   a. In one example, the redundant motion candidates may refer to those motion candidates in a 1st motion candidate list with the same motion information as one of motion candidates in a 2nd motion candidate list.
     i. In one example, the 1st motion candidate list may refer to the motion candidate list of the 1st direction, and the 2nd motion candidate list may refer to the motion candidate list of the 2nd direction.
     ii. In one example, the 1st motion candidate list may refer to the motion candidate list of the 2nd direction, and the 2nd motion candidate list may refer to the motion candidate list of the 1st direction.
   b. In one example, the redundant motion candidates may refer to motion candidates after the first pass DMVR.

5. It is proposed to generate N motion candidates (for a motion candidate list with M as the maximum allowed number of motion candidates, wherein N>M.
   a. The selected M motion candidates in an order are used in the prediction/reconstruction.
   b. The M motion candidates in an order are selected by reordering the N motion candidates, and the selected M motion candidates are the first M (e.g., with the lowest costs) of the N motion candidates after the reordering.
   c. In one example, N may be pre-defined, or signalled in the bitstream, or determined on the fly.
      i. In one example, N may be different for different coding modes.
      ii. In another example, N may be 2, 3, 4, 5, 6, 7, 8, 9, 10, 11, 12, 13, 14, 15, 16, 17, 18, 19, 20.
   d. In one example, the motion information derived from the motion candidate list may be used in the reordering process.
   e. In one example, the above reordering process using refined motion information may be applied.
6. In one example, a cost value generated in a refining process such as TM or DMVR/multi-pass DMVR may be reused in the reordering process which is after the refining process.
   a. In one example, the final (or the minimal or the maximal) cost value generated in a refining process for a motion candidate may be stored.
   b. In one example, the final (or the minimal or the maximal) cost value generated in a refining process for a first motion candidate may be compared the final (or the minimal or the maximal) cost value generated in a refining process for a second motion candidate in the reordering process.
7. In one example, merge candidates may be reordered according to merge type, and the first X merge candidates of each merge type are used to construct the adaptive DMVR merge candidate list.
   a. In one example, the merge type may refer to adjacent spatial, and/or temporal, and/or non-adjacent spatial, and/or HMVP, and/or pairwise.
   b. In one example, X may be different for different merge types.
      i. In one example, X may be set equal to 1 or 2 for temporal merge candidates.
      ii. In another example, X may be set equal to 1, or 2, or 3, or 4, or 5, or 6, or 7, or 8, or 9, or 10 for spatial merge candidates.
      iii. In another example, X may be set equal to 1, or 2, or 3, or 4, or 5, or 6, or 7, or 8, or 9, or 10 for non-adjacent spatial merge candidates.
      iv. In another example, X may be set equal to 1, or 2, or 3, or 4, or 5, or 6, or 7, or 8, or 9, or 10 for HMVP merge candidates.
      v. In another example, X may be set equal to 1, or 2, or 3, or 4, or 5, or 6, or 7, or 8, or 9, or 10 for pairwise merge candidates.

General Aspects
8. In above examples, the video unit may refer to the video unit may refer to colour component/sub-picture/slice/tile/coding tree unit (CTU)/CTU row/groups of CTU/coding unit (CU)/prediction unit (PU)/transform unit (TU)/coding tree block (CTB)/coding block (CB)/prediction block (PB)/transform block (TB)/a block/sub-block of a block/sub-region within a block/any other region that contains more than one sample or pixel.
9. Whether to and/or how to apply the disclosed methods above may be signalled at sequence level/group of pictures level/picture level/slice level/tile group level, such as in sequence header/picture header/SPS/VPS/DPS/DCI/PPS/APS/slice header/tile group header.
10. Whether to and/or how to apply the disclosed methods above may be signalled at PB/TB/CB/PU/TU/CU/VPDU/CTU/CTU row/slice/tile/sub-picture/other kinds of region contains more than one sample or pixel.
11. Whether to and/or how to apply the disclosed methods above may be dependent on coded information, such as block size, colour format, single/dual tree partitioning, colour component, slice/picture type.

5. EMBODIMENT

5.1. Embodiment 1

In current design of TM merge in ECM-3.1, the TM merge candidate list is constructed first. Then adaptive re-ordering of merge candidates (ARMC) is applied to re-order the merge candidates. Finally, the selected merge candidate is refined using template matching and multi-pass DMVR if the condition of multi-pass DMVR is satisfied. Initial motion information in the TM merge candidate list is used in ARMC, but the refined motion information after template matching and multi-pass DMVR is used for prediction, which may limit the coding performance.

It is proposed to apply ARMC using refined motion information for TM merge mode. Specifically, the TM merge candidate list is constructed first and is re-ordered for all merge candidates, while only first 5 TM merge candidates are re-ordered in ECM-3.1. Second, the TM merge candidates in the TM merge list are divided into N subgroups, the subgroup size is set equal to 4. Template matching and multi-pass DMVR are applied for all TM merge candidates in the selected subgroup which is determined by the signalled merge index. Finally, the refined merge candidates in the subgroup is re-ordered. To reduce the complexity, the following simplifications are applied:

1) The proposed method is only applied for blocks with luma sample size larger than T1, such as T1=16, or 32, or 64.
2) The proposed method is only applied for blocks with luma sample size smaller than T2, such as T2=128, or 256, or 512, or 1024, or 2048.
3) When multi-pass DMVR is applied for the selected subgroup, only the first-pass DMVR is used.
4) When template matching is applied for the selected subgroup, the template size for template matching is set equal to 1.
5) When template matching is applied for the selected subgroup, template matching is early terminated after diamond searching.

5.2. Embodiment 2

In current design of adaptive DMVR in ECM-3.1, the adaptive DMVR merge candidate list is first constructed, and the allowed merge candidates can be up to the maximum number of merge candidates for adaptive DMVR (N) which is signalled in the bitstream, and N can be selected from 0 to 6, and it is set equal to 4 in ECM-3.1. Then adaptive re-ordering of merge candidates (ARMC) is applied to re-order the merge candidates for adaptive DMVR.

It is proposed to increase the allowable number (M) of merge candidates when constructing the adaptive DMVR merge candidate list, where M is larger than N. Then ARMC is applied to re-order the merge candidates. At encoder, only first N merge candidates are involved in RDO of adaptive DMVR. M is set equal to 10.

Embodiments of the present disclosure are related to motion candidate list construction.

As used herein, the term 'block' may represent a coding tree block (CTB), a coding tree unit (CTU), a coding block (CB), a CU, a PU, a TU, a PB, a TB or a video processing unit comprising multiple samples/pixels. A block may be rectangular or non-rectangular. As used herein, the term "optical flow" may refer to motion vector.

Figure 41:
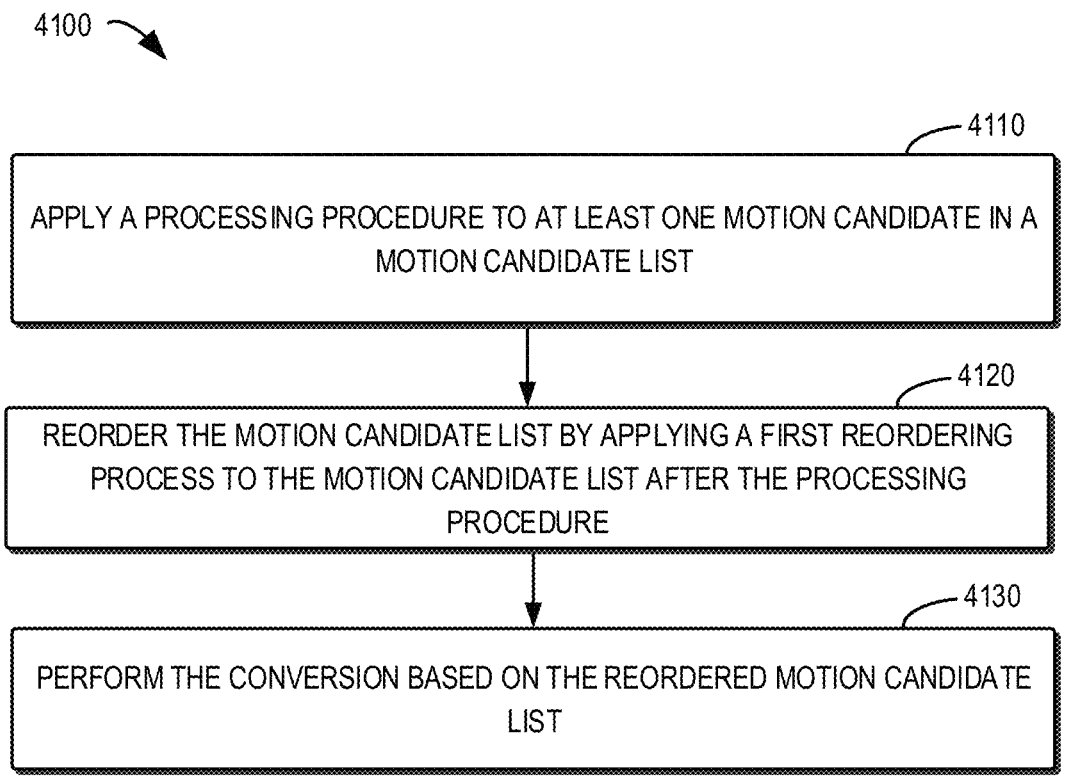
FIG. 41 illustrates a flow chart of a method according to embodiments of the present disclosure.

FIG. 41 illustrates a flowchart of a method 4100 for video processing in accordance with some embodiments of the present disclosure. The method 4100 may be implemented during a conversion between a target block and a bitstream of the target block.

As shown in FIG. 41, at block 4110, during a conversion between a target block of a video and a bitstream of the target block, a processing procedure is applied to at least one motion candidate in a motion candidate list. In some embodiments, the processing procedure comprises at least one of: a modification process, a motion refinement process, or a second reordering process.

At block 4120, the motion candidate list is recorded by applying a first reordering process to the motion candidate list after the processing procedure. In one example, before conducting a first reordering procedure on a motion candidate list, at least one motion candidates in the list may be modified or refined.

At block 4130, the conversion is performed based on the reordered motion candidate list. In some embodiments, the conversion may comprise encoding the target block the bitstream. In some embodiments, the conversion may comprise decoding the target block from the bitstream. Compared with conventional technologies, accuracy and continuity of optical flow motion field are improved. Furthermore, coding efficiency can be improved.

In some embodiments, the second reordering process is applied to the motion candidate list before the first reordering process. In some embodiments, the motion candidate list is reordered using original motion information, during a construction of the motion candidate list in the second reordering process.

In some embodiments, if the at least one motion candidate in the motion candidate list is modified by a motion refinement process for the target block, the motion candidate list is reordered using refined motion information. In some embodiments, the motion candidate list is not reordered before the first reordering process is applied.

In some embodiments, the motion refinement process comprises at least one of: a template matching based motion refinement, or a bilateral matching based motion refinement. In one example, the motion refinement process may refer to a template matching based motion refinement, such as template matching, and/or a bilateral matching based motion refinement, such as DMVR, multi-pass DMVR.

In some embodiments, a simplified version of the motion refinement process is applied. For example, if a template matching is used as the motion refinement process, a template size is set to 1 or 2.

In some embodiments, the processing procedure is a motion refinement process, and refined motion information used in the first reordering process is final motion information of the motion refinement process. In some embodiments, if the motion refinement process comprises a plurality of steps, motion information after a last step in the motion refinement process is used in the first reordering process. In some embodiments, the plurality of steps refine motion information at different resolutions of motion vector. For example, an integer resolution motion vector is refined to be a fractional resolution motion vector. In one example, the refinement may be from an integer resolution motion vector to a fractional resolution motion vector. In some embodiments, a fractional resolution motion vector is refined to be a fractional resolution motion vector. In another example, the refinement may be from a fractional resolution motion vector to a fractional resolution motion vector. In some embodiments, the different resolutions comprise at least one of: 16-pel, 8-pel, 4-pel, 2-pel, 1-pel, ½-pel, ¼-pel, ⅛-pel, 1/16-pel, 1/32-pel, or 1/64-pel.

In some embodiments, the plurality of steps comprises different searching shapes to refine the motion vector in a template matching. In one example, the multiple steps may refer to different searching shapes to refine the motion vector, such as diamond and/or cross shape in template matching.

In some embodiments, motion information after a step of diamond searching shape of the template matching is used in the first reordering process. In some embodiments, a resolution of motion vector to be used is dependent on a syntax element indicating the resolution of motion vector of a motion candidate. In some embodiments, if early termination is used in the motion refinement process, motion information output related to the early termination is used in the first reordering process.

In some embodiments, a plurality of motion refinement processes are applied to the target block, and the plurality of motion refinement processes are applied in order, and motion information derived after a last motion refinement process is used in the first reordering process. In one example, when more than one motion refinement processes are involved and processed one by one, the motion information derived after the last motion refinement process may be used in the first reordering process.

In some embodiments, if the plurality of motion refinement processes comprise a first motion refinement process and a second motion refinement process, motion information of the second motion refinement process is used in the first reordering process.

In some embodiments, the first motion refinement process comprises at least one of: a template matching method or a bilateral matching method. In one example, the 1st motion refinement process may refer to a template matching method, such as TM, or a bilateral matching method such as DMVR/multi-pass DMVR.

In some embodiments, the second motion refinement process comprises at least one of: a template matching method or a bilateral matching method. In one example, the 2nd motion refinement process may refer to a template matching method, such as TM, or a bilateral matching method such as DMVR/multi-pass DMVR.

In some embodiments, the processing procedure comprises a motion refinement process, and refined motion information used in the first reordering process is intermediate motion information of the motion refinement process. In some embodiments, the motion refinement process comprises a plurality of multiple steps, motion information before a last step in the motion refinement process is used in the first reordering process. In some embodiments, motion information in a first step in the motion refinement process is used in the first reordering process. In some embodiments, motion information in integer resolution of motion vector is used in the first reordering process. In another example, the motion information in the integer resolution (e.g., 16-pel, 8-pel, 4-pel, 2-pel, 1-pel) of motion vector may be used.

In some embodiments, if a plurality of motion refinement processes are applied in order, motion derived from a motion refinement process which is before a last motion refinement process is used in the first reordering process. In one example, when more than one motion refinement processes are involved and processed one by one, the motion information derived from any motion refinement process before the last motion refinement process may be used in the first reordering process.

In some embodiments, if the plurality of motion refinement processes comprises a first motion refinement process and a second motion refinement process, motion information of the first motion refinement process is used in the first reordering process.

In some embodiments, the first motion refinement process comprises at least one of: a template matching method or a bilateral matching method. In one example, the 1st motion refinement process may refer to a template matching method, such as TM, or a bilateral matching method such as DMVR/multi-pass DMVR.

In some embodiments, the second motion refinement process comprises at least one of: a template matching method or a bilateral matching method. In one example, the 2nd motion refinement process may refer to a template matching method, such as TM, or a bilateral matching method such as DMVR/multi-pass DMVR.

In some embodiments, a plurality of motion refinement processes are applied in order and a last motion refinement process comprises a plurality of steps. In this case, in some embodiments, motion information derived from a step which is before a last step in the last motion refinement process is used in the first reordering process.

In some embodiments, the processing procedure comprises a motion refinement process, the motion refinement process comprises a template matching (TM) and a multi-pass decoder side motion vector refinement (DMVR), and the TM is between a first-pass DMVR and a second-pass DMVR. In one example, when the motion refinement process contains TM and multi-pass DMVR and TM is processed between the first-pass DMVR (e.g., block based bilateral matching MV refinement) and the second-pass DMVR (e.g., sub-block based bilateral matching MV refinement), the motion information after TM may be used in the first reordering process.

In some embodiments, motion information after the TM is used in the first reordering process. In some embodiments, motion information after the first-pass DMVR is used in the first reordering process. In some embodiments, motion information after the second-pass DMVR is used in the first reordering process. In some embodiments, if refined motion information is used in the first reordering process, an early termination method used to skip the second-pass DMVR is not applied.

In some embodiments, if refined motion information is sub-block-based motion information, the refined motion information of one or more sub-blocks is used in the first reordering process. In some embodiments, refined motion information of one of the one or more sub-blocks is used in the first reordering process. In some embodiments, refined motion information of at least one of the followings is used in the first reordering process: a top-left sub-block, one of sub-blocks locating at a left block boundary, or one of sub-blocks locating at an above block boundary.

In some embodiments, refined motion information of a plurality of sub-blocks of the one or more sub-blocks is used in the first reordering process. In some embodiments, motion information of all sub-blocks is averaged and used in the first reordering process.

In some embodiments, the motion information of all sub-blocks is weighted averaged. In some embodiments, a set of weighting parameters depends on at least one of: a block dimension, a block size, a sub-block dimension, a sub-block size, or a distance between a sub-block and a template used in the first reordering process. In some embodiments, at least one of the followings is used in the first reordering process: the motion information of sub-blocks at the above boundary and the motion information of sub-blocks at the left boundary.

In some embodiments, motion candidates are divided into a first number of sub-groups, and the first reordering process is applied within each sub-group, and the first number is larger than 1. In one example, the motion candidates may be divided into X sub-groups, and the reordering process may be processed within each sub-group, where X is larger than 1.

In some embodiments, the number of motion candidates with each sub-group is same. For example, the number of motion candidates is one of: 2, 3, 4, 5, 6, 7, 8, 9, and 10. In one example, the sub-group size (i.e., number of motion candidates within a sub-group, $N_s$) may be same for all sub-groups, such as $N_s$=2, 3, 4, 5, 6, 7, 8, 9, 10.

In some embodiments, a size of at least one sub-group is different from sizes of other sub-groups. In some embodiments, a size of a first sub-group is larger than a size of other sub-groups. In some embodiments, the size of the first sub-group is less than the size of other sub-groups. In some embodiments, a size of sub-group is pre-defined.

In some embodiments, the motion candidates are divided into the first number of sub-groups based on a motion candidate type. In one example, the motion candidates may be divided into multiple sub-groups according to the motion candidate type (e.g., adjacent spatial, temporal, non-adjacent spatial, HMVP).

In some embodiments, a size of a sub-group is determined based on the number of available types of motion candidates. In one example, the subgroup size may be determined according to the available number of the types of motion candidates (e.g., adjacent spatial and/or temporal motion candidates).

In some embodiments, whether to and/or how to apply the first reordering process using refined motion information is indicated in the bitstream. In some embodiments, whether to and/or how to apply the first reordering process using the refined motion information is determined dynamically. In some embodiments, whether to and/or how to apply the first reordering process using the refined motion information is depending on coding information. In some embodiments, the first reordering process using the refined motion information is applied to the target block, and a size of the target block is larger than a first threshold. In some embodiments, the first reordering process using the refined motion information is applied to the target block, and the size of the target block is less than a second threshold. In some embodiments, the first threshold is one of: 8, 16, 32, 64, or 128. In some embodiments, the second threshold is one of: 64, 128, 256, 512, 1024 or 2048.

In some embodiments, the target block refers to one of: a color component, a sub-picture, a slice, a tile, a coding tree unit (CTU), a CTU row, groups of CTU, a coding unit (CU), a prediction unit (PU), a transform unit (TU), a coding tree block (CTB), a coding block (CB), a prediction block (PB), a transform block (TB), a block, a sub-block of a block, a sub-region within a block, or a region that contains more than one sample or pixel.

In some embodiments, an indication of whether to and/or how to reorder the motion candidate list by applying the first reordering process to the motion candidate list after the processing procedure is indicated at one of the followings: a sequence level, a group of pictures level, a picture level, a slice level, or a tile group level.

In some embodiments, an indication of whether to and/or how to reorder the motion candidate list by applying the first reordering process to the motion candidate list after the processing procedure is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

In some embodiments, an indication of whether to and/or how to reorder the motion candidate list by applying the first reordering process to the motion candidate list after the processing procedure is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

In some embodiments, whether to and/or how to reorder the motion candidate list by applying the first reordering process to the motion candidate list after the processing procedure may be determined based on coded information of the target block. The coded information may include at least one of: a block size, a colour format, a single and/or dual tree partitioning, a colour component, a slice type, or a picture type.

In some embodiments, a non-transitory computer-readable recording medium stores a bitstream of a video which is generated by a method performed by a video processing apparatus. The method comprises: applying a processing procedure to at least one motion candidate in a motion candidate list for the target block; reordering the motion candidate list by applying a first reordering process to the motion candidate list after the processing procedure; and generating a bitstream of the target block based on the reordered motion candidate list.

In some embodiments, a method for storing bitstream of a video, comprises: applying a processing procedure to at least one motion candidate in a motion candidate list for the target block; reordering the motion candidate list by applying a first reordering process to the motion candidate list after the processing procedure; generating a bitstream of the target block based on the reordered motion candidate list; and storing the bitstream in a non-transitory computer-readable recording medium.

Figure 42:
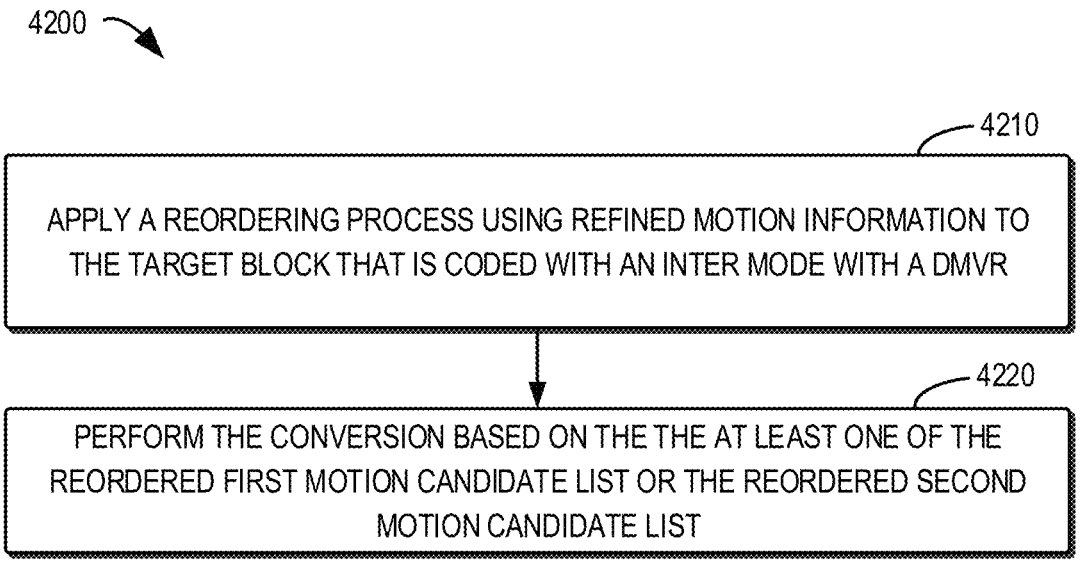
FIG. 42 illustrates a flow chart of a method according to embodiments of the present disclosure.

FIG. 42 illustrates a flowchart of a method 4200 for video processing in accordance with some embodiments of the present disclosure. The method 4200 may be implemented during a conversion between a target block and a bitstream of the target block.

As shown in FIG. 42, at block 4210, during a conversion between a target block of a video and a bitstream of the target block, a reordering process using refined motion information is applied to the target block that is coded with an inter mode with a decoder side motion vector refinement (DMVR), to reorder at least one of a first motion candidate list or a second motion candidate list, wherein a first set of motion candidates in the first motion candidate list are refined in one direction and a second set of motion candidates in the second motion candidate list are refined in another direction. In one example, when the reordering process using the refined motion information is applied to an inter mode with single-side DMVR, adaptive DMVR, the reordering process using refined motion may be applied to reorder the 1st motion candidate list, and/or the 2nd motion candidate list, wherein the motion candidates in the 1st motion candidate list are refined in one side (direction) and the motion candidates in the 2nd motion candidate list are refined in another side (direction).

At block 4220, the conversion is performed based on the at least one of the reordered first motion candidate list or the reordered second motion candidate list. In some embodiments, the conversion may comprise encoding the target block the bitstream. In some embodiments, the conversion may comprise decoding the target block from the bitstream. Compared with conventional technologies, accuracy and continuity of optical flow motion field are improved. Furthermore, coding efficiency can be improved.

In some embodiments, the DMVR comprises at least one of: a single-side DMVR, or an adaptive DMVR. In some embodiments, the single-side DMVR is a DMVR method wherein motion information is refined in one direction at a step of DMVR. In one example, the single-side DMVR may refer to a DMVR method in which the motion information (e.g., motion vector) is refined in one direction at a step of DMVR.

In some embodiments, the motion information is refined in one direction at a first pass of a multi-pass DMVR. In some embodiments, the motion information is refined in one direction at one or more of: a first pass of a multi-pass DMVR or a second pass of the multi-pass DMVR.

In some embodiments, the inter mode is an adaptive DMVR. In some embodiments, the reordering process is applied to reorder to the first motion candidate list and the second motion candidate list individually. In some embodiments, the first motion candidate list and the second motion candidate list are combined. In this case, the reordering process is used to reorder the combined first and second motion candidate lists. In some embodiments, the refined motion information is a block-based motion vector (MV) of a first pass in multi-pass DMVR.

In some embodiments, the target block refers to one of: a color component, a sub-picture, a slice, a tile, a coding tree unit (CTU), a CTU row, groups of CTU, a coding unit (CU), a prediction unit (PU), a transform unit (TU), a coding tree block (CTB), a coding block (CB), a prediction block (PB), a transform block (TB), a block, a sub-block of a block, a sub-region within a block, or a region that contains more than one sample or pixel.

In some embodiments, an indication of whether to and/or how to apply the reordering process using the refined motion information to the target block that is coded with the inter mode with the DMVR is indicated at one of the followings: a sequence level, a group of pictures level, a picture level, a slice level, or a tile group level.

In some embodiments, an indication of whether to and/or how to apply the reordering process using the refined motion information to the target block that is coded with the inter mode with the DMVR is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

In some embodiments, an indication of whether to and/or how to apply the reordering process using the refined motion information to the target block that is coded with the inter mode with the DMVR is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

In some embodiments, whether to and/or how to apply the reordering process using the refined motion information to the target block that is coded with the inter mode with the DMVR may be determined based on coded information of the target block. The coded information may include at least one of: a block size, a colour format, a single and/or dual tree partitioning, a colour component, a slice type, or a picture type.

In some embodiments, a non-transitory computer-readable recording medium stores a bitstream of a video which is generated by a method performed by a video processing apparatus. The method comprises: applying a reordering process using refined motion information to a target block of the video that is coded with an inter mode with a decoder side motion vector refinement (DMVR) to reorder at least one of a first motion candidate list or a second motion candidate list, wherein a first set of motion candidates in the first motion candidate list are refined in one direction and a second set of motion candidates in the second motion candidate list are refined in another direction; and generating a bitstream of the target block based on the at least one of the reordered first motion candidate list or the reordered second motion candidate list.

In some embodiments, a method for storing bitstream of a video, comprises: applying a reordering process using refined motion information to a target block of the video that is coded with an inter mode with a decoder side motion vector refinement (DMVR) to reorder at least one of a first motion candidate list or a second motion candidate list, wherein a first set of motion candidates in the first motion candidate list are refined in one direction and a second set of motion candidates in the second motion candidate list are refined in another direction; generating a bitstream of the target block based on the at least one of the reordered first motion candidate list or the reordered second motion candidate list; and storing the bitstream in a non-transitory computer-readable recording medium.

Figure 43:
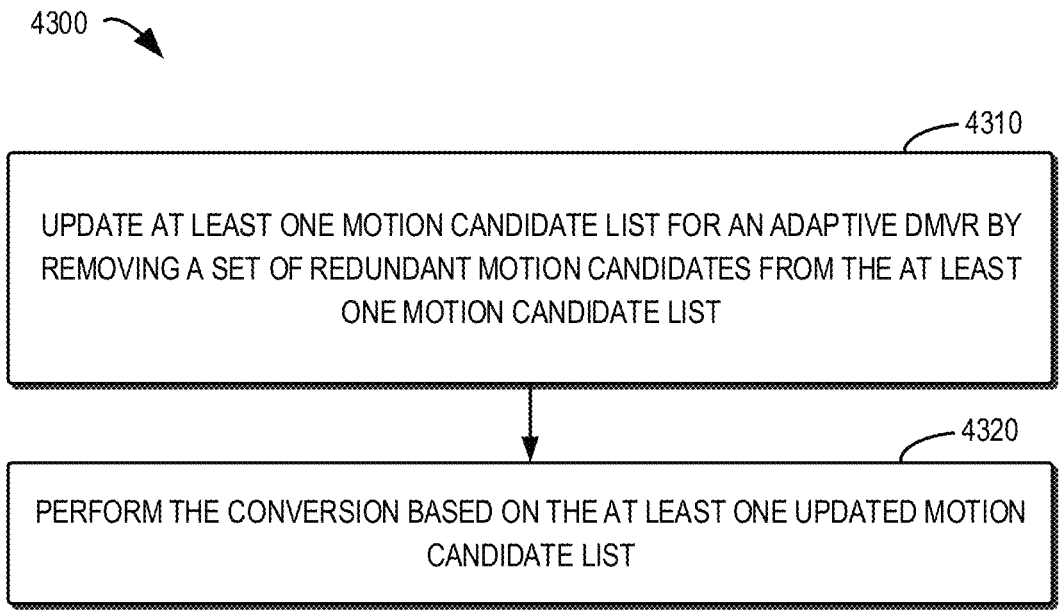
FIG. 43 illustrates a flow chart of a method according to embodiments of the present disclosure.

FIG. 43 illustrates a flowchart of a method 4300 for video processing in accordance with some embodiments of the present disclosure. The method 4300 may be implemented during a conversion between a target block and a bitstream of the target block.

As shown in FIG. 43, at block 4310, during a conversion between a target block of a video and a bitstream of the target block, at least one motion candidate list for an adaptive decoder side motion vector refinement (DMVR) is updated by removing a set of redundant motion candidates from the at least one motion candidate list.

At block 4320, performing the conversion based on the at least one updated motion candidate list. In some embodiments, the conversion may comprise encoding the target block the bitstream. In some embodiments, the conversion may comprise decoding the target block from the bitstream. Compared with conventional technologies, accuracy and continuity of optical flow motion field are improved. Furthermore, coding efficiency can be improved.

In some embodiments, the set of redundant motion candidates comprise motion candidates in a first motion candidate list with same motion information as one of motion candidates in a second motion candidate list. In some embodiments, the first motion candidate list is a motion candidate list of a first direction, the second motion candidate list is a motion candidate list of a second direction. In some embodiments, the first motion candidate list is a motion candidate list of a second direction, the second motion candidate list is a motion candidate list of a first direction. In some embodiments, the set of redundant motion candidates comprises motion candidates after a first pass DMVR.

In some embodiments, the target block refers to one of: a color component, a sub-picture, a slice, a tile, a coding tree unit (CTU), a CTU row, groups of CTU, a coding unit (CU), a prediction unit (PU), a transform unit (TU), a coding tree block (CTB), a coding block (CB), a prediction block (PB), a transform block (TB), a block, a sub-block of a block, a sub-region within a block, or a region that contains more than one sample or pixel.

In some embodiments, an indication of whether to and/or how to remove the set of redundant motion candidates from the at least one motion candidate list for the adaptive DMVR is indicated at one of the followings: a sequence level, a group of pictures level, a picture level, a slice level, or a tile group level.

In some embodiments, an indication of whether to and/or how to remove the set of redundant motion candidates from the at least one motion candidate list for the adaptive DMVR is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

In some embodiments, an indication of whether to and/or how to remove the set of redundant motion candidates from the at least one motion candidate list for the adaptive DMVR is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

In some embodiments, whether to and/or how to remove the set of redundant motion candidates from the at least one motion candidate list for the adaptive DMVR may be determined based on coded information of the target block. The coded information may include at least one of: a block size, a colour format, a single and/or dual tree partitioning, a colour component, a slice type, or a picture type.

In some embodiments, a non-transitory computer-readable recording medium stores a bitstream of a video which is generated by a method performed by a video processing apparatus. The method comprises: updating at least one motion candidate list for an adaptive decoder side motion vector refinement (DMVR) of a target block of the video by removing a set of redundant motion candidates from the at least one motion candidate list; and generating a bitstream of the target block based on the at least one updated motion candidate list.

In some embodiments, a method for storing bitstream of a video, comprises: updating at least one motion candidate list for an adaptive decoder side motion vector refinement (DMVR) of a target block of the video by removing a set of redundant motion candidates from the at least one motion candidate list; generating a bitstream of the target block based on the at least one updated motion candidate list; and storing the bitstream in a non-transitory computer-readable recording medium.

Figure 44:
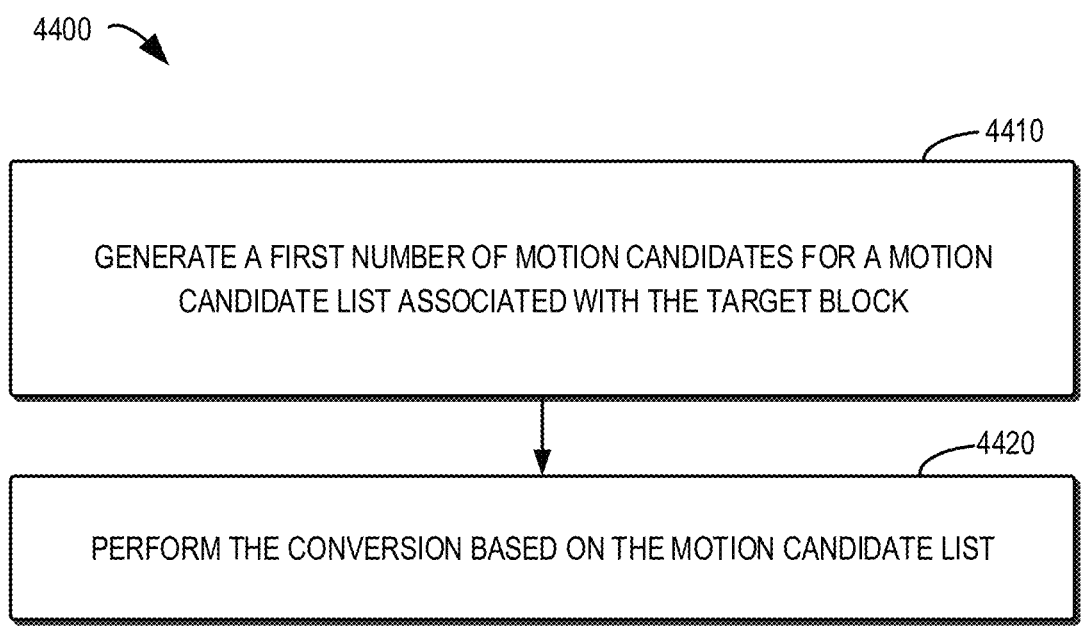
FIG. 44 illustrates a flow chart of a method according to embodiments of the present disclosure.

FIG. 44 illustrates a flowchart of a method 4400 for video processing in accordance with some embodiments of the present disclosure. The method 4400 may be implemented during a conversion between a target block and a bitstream of the target block.

As shown in FIG. 44, at block 4410, during a conversion between a target block of a video and a bitstream of the target block, a first number of motion candidates is generated for a motion candidate list associated with the target block. A second number of motion candidates are allowed for the motion candidate list. The first number is larger than the second number. For example, N motion candidates may be generated for a motion candidate list with M as the maximum allowed number of motion candidates, where N>M.

At block 4420, the conversion is performed based on the motion candidate list. In some embodiments, the conversion may comprise encoding the target block the bitstream. In some embodiments, the conversion may comprise decoding the target block from the bitstream. Compared with conventional technologies, accuracy and continuity of optical flow motion field are improved. Furthermore, coding efficiency can be improved.

In some embodiments, the second number of motion candidates is selected and used in prediction or reconstruction. For example, the selected M motion candidates in an order are used in the prediction/reconstruction.

In some embodiments, the second number of motion candidates is selected by reordering the first number of motion candidates. In this case, the selected second number of motion candidates are first M motion candidates of the first number of motion candidates after the reordering, and M is the second number. For example, the M motion candidates in an order are selected by reordering the N motion candidates, and the selected M motion candidates are the first M (e.g., with the lowest costs) of the N motion candidates after the reordering.

In some embodiments, the first number is pre-defined. In some embodiments, the first number is indicated in the bitstream. In some embodiments, the first number is determined dynamically. In some embodiments, the first number may be different for coding modes. In some embodiments, the first number is one of: 2, 3, 4, 5, 6, 7, 8, 9, 10, 11, 12, 13, 14, 15, 16, 17, 18, 19, or 20.

In some embodiments, motion information derived from the motion candidate list is used in a reordering process. In some embodiments, a reordering process using refined motion information is applied to the motion candidate list.

In some embodiments, the target block refers to one of: a color component, a sub-picture, a slice, a tile, a coding tree unit (CTU), a CTU row, groups of CTU, a coding unit (CU), a prediction unit (PU), a transform unit (TU), a coding tree block (CTB), a coding block (CB), a prediction block (PB), a transform block (TB), a block, a sub-block of a block, a sub-region within a block, or a region that contains more than one sample or pixel.

In some embodiments, an indication of whether to and/or how to generate the first number of motion candidates for the motion candidate list associated with the target block is indicated at one of the followings: a sequence level, a group of pictures level, a picture level, a slice level, or a tile group level.

In some embodiments, an indication of whether to and/or how to generate the first number of motion candidates for the motion candidate list associated with the target block is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

In some embodiments, an indication of whether to and/or how to generate the first number of motion candidates for the motion candidate list associated with the target block is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

In some embodiments, whether to and/or how to generate the first number of motion candidates for the motion candidate list associated with the target block may be determined based on coded information of the target block. The coded information may include at least one of: a block size, a colour format, a single and/or dual tree partitioning, a colour component, a slice type, or a picture type.

In some embodiments, a non-transitory computer-readable recording medium stores a bitstream of a video which is generated by a method performed by a video processing apparatus. The method comprises: generating a first number of motion candidates for a motion candidate list associated with a target block of the video, and wherein a second number of motion candidates are allowed for the motion candidate list, and wherein the first number is larger than the second number; and generating a bitstream of the target block based on the motion candidate list.

In some embodiments, a method for storing bitstream of a video, comprises: generating a first number of motion candidates for a motion candidate list associated with a target block of the video, and wherein a second number of motion candidates are allowed for the motion candidate list, and wherein the first number is larger than the second number; generating a bitstream of the target block based on the motion candidate list; and storing the bitstream in a non-transitory computer-readable recording medium.

Figure 45:
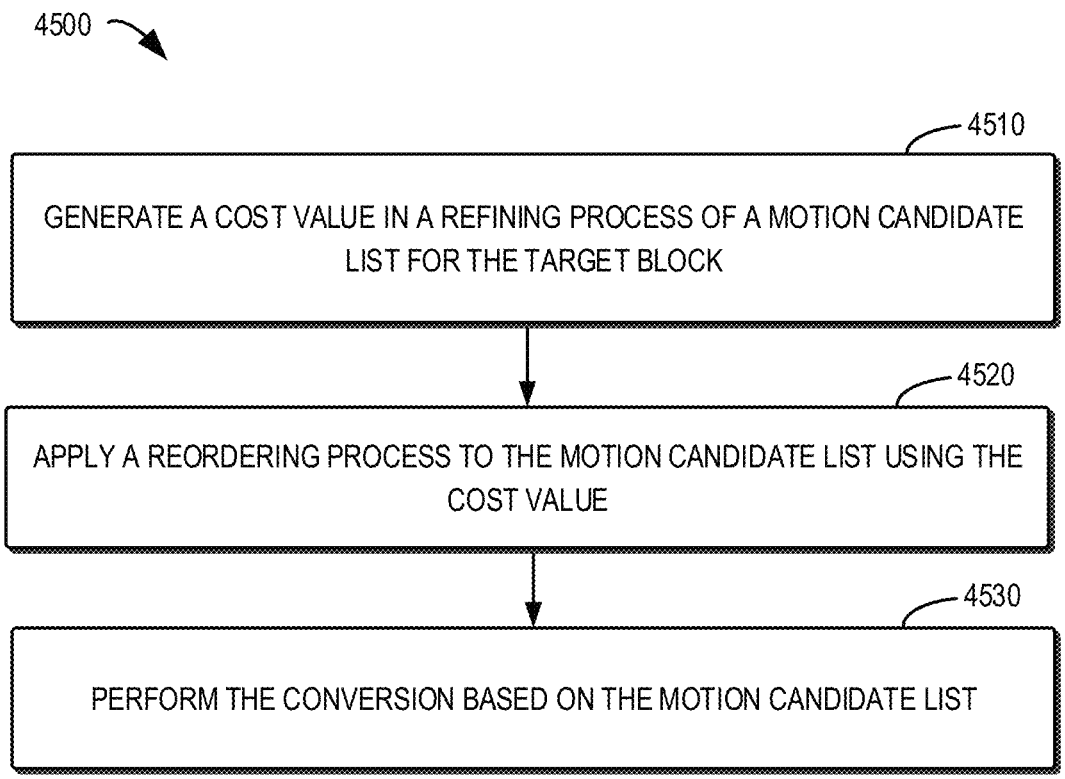
FIG. 45 illustrates a flow chart of a method according to embodiments of the present disclosure.

FIG. 45 illustrates a flowchart of a method 4500 for video processing in accordance with some embodiments of the present disclosure. The method 4500 may be implemented during a conversion between a target block and a bitstream of the target block.

As shown in FIG. 45, at block 4510, during a conversion between a target block of a video and a bitstream of the target block, a cost value is generated in a refining process of a motion candidate list for the target block. In some embodiments, the refining process comprises at least one of: a template matching (TM), a decoder side motion vector refinement (DMVR), or a multi-pass DMVR.

At block 4520, a reordering process is applied to the motion candidate list using the cost value. In one example, a cost value generated in a refining process such as TM or DMVR/multi-pass DMVR may be reused in the reordering process which is after the refining process.

At block 4530, the conversion is performed based on the motion candidate list. In some embodiments, the conversion may comprise encoding the target block the bitstream. In some embodiments, the conversion may comprise decoding the target block from the bitstream. Compared with conventional technologies, accuracy and continuity of optical flow motion field are improved. Furthermore, coding efficiency can be improved.

In some embodiments, a final cost value generated in the refining process for the motion candidate is stored. In one example, the final (or the minimal or the maximal) cost value generated in a refining process for a motion candidate may be stored.

In some embodiments, a first final cost value generated in a first refining process for a first motion candidate is compared a second final cost value generated in a second refining process for a second motion candidate in the reordering process. In one example, the final (or the minimal or the maximal) cost value generated in a refining process for a first motion candidate may be compared the final (or the minimal or the maximal) cost value generated in a refining process for a second motion candidate in the reordering process.

In some embodiments, the target block refers to one of: a color component, a sub-picture, a slice, a tile, a coding tree unit (CTU), a CTU row, groups of CTU, a coding unit (CU), a prediction unit (PU), a transform unit (TU), a coding tree block (CTB), a coding block (CB), a prediction block (PB), a transform block (TB), a block, a sub-block of a block, a sub-region within a block, or a region that contains more than one sample or pixel.

In some embodiments, an indication of whether to and/or how to apply the reordering process to the motion candidate list using the cost value is indicated at one of the followings: a sequence level, a group of pictures level, a picture level, a slice level, or a tile group level.

In some embodiments, an indication of whether to and/or how to apply the reordering process to the motion candidate list using the cost value is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

In some embodiments, an indication of whether to and/or how to apply the reordering process to the motion candidate list using the cost value is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

In some embodiments, whether to and/or how to apply the reordering process to the motion candidate list using the cost value may be determined based on coded information of the target block. The coded information may include at least one of: a block size, a colour format, a single and/or dual tree partitioning, a colour component, a slice type, or a picture type.

In some embodiments, a non-transitory computer-readable recording medium stores a bitstream of a video which is generated by a method performed by a video processing apparatus. The method may comprise: generating a cost value in a refining process of a motion candidate list for a target block of the video; applying a reordering process to the motion candidate list using the cost value; and generating a bitstream of the target block based on the motion candidate list.

In some embodiments, a method for storing bitstream of a video, comprises: generating a cost value in a refining process of a motion candidate list for a target block of the video; applying a reordering process to the motion candidate list using the cost value; generating a bitstream of the target block based on the motion candidate list; and storing the bitstream in a non-transitory computer-readable recording medium.

Figure 46:
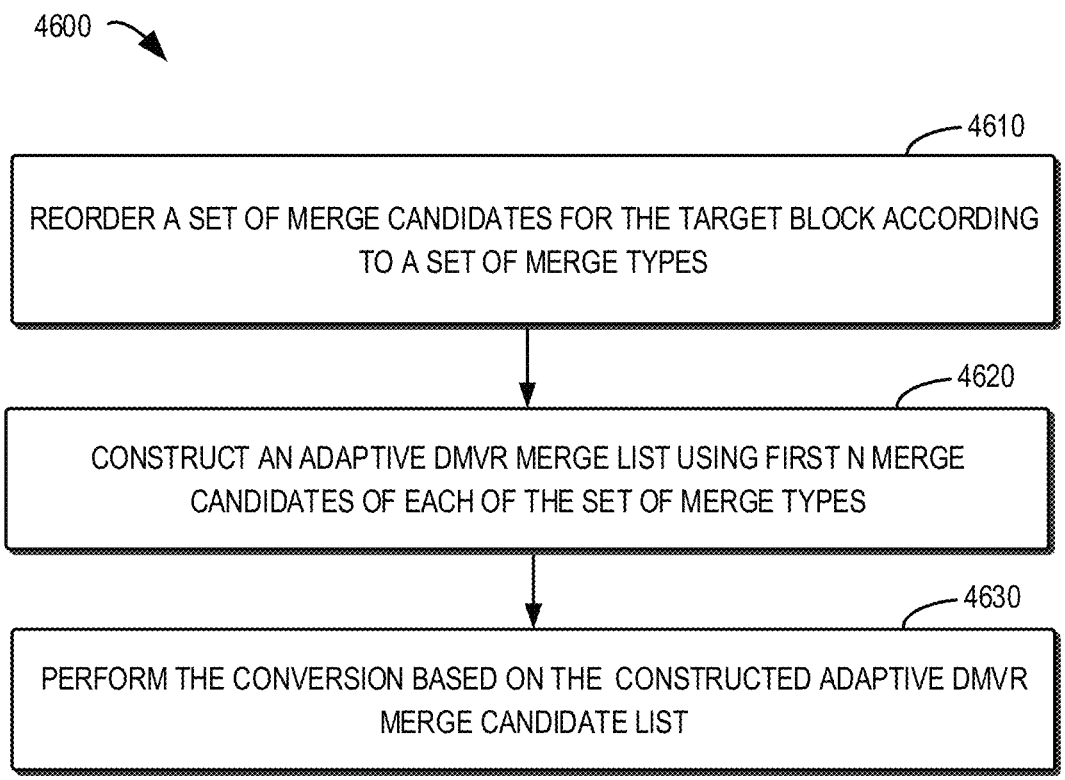
FIG. 46 illustrates a flow chart of a method according to embodiments of the present disclosure.

FIG. 46 illustrates a flowchart of a method 4600 for video processing in accordance with some embodiments of the present disclosure. The method 4600 may be implemented during a conversion between a target block and a bitstream of the target block.

As shown in FIG. 46, at block 4610, during a conversion between a target block of a video and a bitstream of the target block, a set of merge candidates for the target block is reordered according to a set of merge type.

At block 4620, an adaptive decoder side motion vector refinement (DMVR) merge candidate list is constructed using first N merge candidates of each of the set of merge types, and where N is an integer number. In one example, merge candidates may be reordered according to merge type, and the first X merge candidates of each merge type are used to construct the adaptive DMVR merge candidate list.

At block 4630, the conversion is performed based on the constructed adaptive DMVR merge candidate list. In some embodiments, the conversion may comprise encoding the target block the bitstream. In some embodiments, the conversion may comprise decoding the target block from the bitstream. Compared with conventional technologies, accuracy and continuity of optical flow motion field are improved. Furthermore, coding efficiency can be improved.

In some embodiments, the set of merge types is at least one of: adjacent spatial, temporal, non-adjacent spatial, history-based motion vector prediction (HMVP), or pairwise. In one example, the merge type may refer to adjacent spatial, and/or temporal, and/or non-adjacent spatial, and/or HMVP, and/or pairwise.

In some embodiments, values of N are different for different merge types. In some embodiments, N is set equal to 1 or 2 for temporal merge candidates. In some embodiments, N is set equal to one of the followings for spatial merge candidates: 1, or 2, or 3, or 4, or 5, or 6, or 7, or 8, or 9, or 10. In some embodiments, N is set equal to one of the followings for non-adjacent spatial merge candidates: 1, or 2, or 3, or 4, or 5, or 6, or 7, or 8, or 9, or 10. In some embodiments, N is set equal to one of the followings for HMVP merge candidates: 1, or 2, or 3, or 4, or 5, or 6, or 7, or 8, or 9, or 10. In some embodiments, N is set equal to one of the followings for pairwise merge candidates: 1, or 2, or 3, or 4, or 5, or 6, or 7, or 8, or 9, or 10.

In some embodiments, the target block refers to one of: a color component, a sub-picture, a slice, a tile, a coding tree unit (CTU), a CTU row, groups of CTU, a coding unit (CU), a prediction unit (PU), a transform unit (TU), a coding tree block (CTB), a coding block (CB), a prediction block (PB), a transform block (TB), a block, a sub-block of a block, a sub-region within a block, or a region that contains more than one sample or pixel.

In some embodiments, an indication of whether to and/or how to construct the adaptive DMVR merge candidate list using first N merge candidates of each of the set of merge types is indicated at one of the followings: a sequence level, a group of pictures level, a picture level, a slice level, or a tile group level.

In some embodiments, an indication of whether to and/or how to construct the adaptive DMVR merge candidate list using first N merge candidates of each of the set of merge types is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

In some embodiments, an indication of whether to and/or how to construct the adaptive DMVR merge candidate list using first N merge candidates of each of the set of merge types is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

In some embodiments, whether to and/or how to construct the adaptive DMVR merge candidate list using first N merge candidates of each of the set of merge types may be determined based on coded information of the target block. The coded information may include at least one of: a block size, a colour format, a single and/or dual tree partitioning, a colour component, a slice type, or a picture type.

In some embodiments, a non-transitory computer-readable recording medium stores a bitstream of a video which is generated by a method performed by a video processing apparatus. The method may include: reordering a set of merge candidates for a target block of the video according to a set of merge types; constructing an adaptive decoder side motion vector refinement (DMVR) merge candidate list using first N merge candidates of each of the set of merge types, and wherein N is an integer number; and generating a bitstream of the target block based on the constructed adaptive DMVR merge candidate list.

In some embodiments, a method for storing bitstream of a video, comprises: reordering a set of merge candidates for a target block of the video according to a set of merge types; constructing an adaptive decoder side motion vector refinement (DMVR) merge candidate list using first N merge candidates of each of the set of merge types, and wherein N is an integer number; generating a bitstream of the target block based on the constructed adaptive DMVR merge candidate list; and storing the bitstream in a non-transitory computer-readable recording medium.

Implementations of the present disclosure can be described in view of the following clauses, the features of which can be combined in any reasonable manner.

Clause 1. A method of video processing, comprising: applying, during a conversion between a target block of a video and a bitstream of the target block, a processing procedure to at least one motion candidate in a motion candidate list; reordering the motion candidate list by applying a first reordering process to the motion candidate list after the processing procedure; and performing the conversion based on the reordered motion candidate list.

Clause 2. The method of clause 1, wherein the processing procedure comprises at least one of: a modification process, a motion refinement process, or a second reordering process.

Clause 3. The method of clause 2, wherein the second reordering process is applied to the motion candidate list before the first reordering process.

Clause 4. The method of clause 3, wherein the motion candidate list is reordered using original motion information, during a construction of the motion candidate list in the second reordering process.

Clause 5. The method of clause 1, wherein if the at least one motion candidate in the motion candidate list is modified by a motion refinement process for the target block, the motion candidate list is reordered using refined motion information.

Clause 6. The method of clause 1, wherein the motion candidate list is not reordered before the first reordering process is applied.

Clause 7. The method of clause 2, wherein the motion refinement process comprises at least one of: a template matching based motion refinement, or a bilateral matching based motion refinement.

Clause 8. The method of clause 2, wherein a simplified version of the motion refinement process is applied.

Clause 9. The method of clause 8, wherein if a template matching is used as the motion refinement process, a template size is set to 1 or 2.

Clause 10. The method of clause 1, wherein the processing procedure is a motion refinement process, and wherein refined motion information used in the first reordering process is final motion information of the motion refinement process.

Clause 11. The method of clause 10, wherein if the motion refinement process comprises a plurality of steps, motion information after a last step in the motion refinement process is used in the first reordering process.

Clause 12. The method of clause 11, wherein the plurality of steps refine motion information at different resolutions of motion vector.

Clause 13. The method of clause 12, wherein an integer resolution motion vector is refined to be a fractional resolution motion vector.

Clause 14. The method of clause 12, wherein a fractional resolution motion vector is refined to be a fractional resolution motion vector.

Clause 15. The method of clause 12, wherein the different resolutions comprise at least one of: 16-pel, 8-pel, 4-pel, 2-pel, 1-pel, ½-pel, ¼-pel, ⅛-pel, 1/16-pel, 1/32-pel, or 1/64-pel.

Clause 16. The method of clause 11, wherein the plurality of steps comprises different searching shapes to refine the motion vector in a template matching.

Clause 17. The method of clause 16, wherein motion information after a step of diamond searching shape of the template matching is used in the first reordering process.

Clause 18. The method of clause 11, wherein a resolution of motion vector to be used is dependent on a syntax element indicating the resolution of motion vector of a motion candidate.

Clause 19. The method of clause 11, wherein if early termination is used in the motion refinement process, motion information output related to the early termination is used in the first reordering process.

Clause 20. The method of clause 1, wherein a plurality of motion refinement processes are applied to the target block, and the plurality of motion refinement processes are applied in order, and wherein motion information derived after a last motion refinement process is used in the first reordering process.

Clause 21. The method of clause 20, wherein if the plurality of motion refinement processes comprise a first motion refinement process and a second motion refinement process, motion information of the second motion refinement process is used in the first reordering process.

Clause 22. The method of clause 21, wherein the first motion refinement process comprises at least one of: a template matching method or a bilateral matching method.

Clause 23. The method of clause 21, wherein the second motion refinement process comprises at least one of: a template matching method or a bilateral matching method.

Clause 24. The method of clause 1, wherein the processing procedure comprises a motion refinement process, and refined motion information used in the first reordering process is intermediate motion information of the motion refinement process.

Clause 25. The method of clause 24, wherein the motion refinement process comprises a plurality of multiple steps, motion information before a last step in the motion refinement process is used in the first reordering process.

Clause 26. The method of clause 24, wherein motion information in a first step in the motion refinement process is used in the first reordering process.

Clause 27. The method of clause 24, wherein motion information in integer resolution of motion vector is used in the first reordering process.

Clause 28. The method of clause 1, wherein if a plurality of motion refinement processes are applied in order, motion derived from a motion refinement process which is before a last motion refinement process is used in the first reordering process.

Clause 29. The method of clause 28, wherein if the plurality of motion refinement processes comprises a first motion refinement process and a second motion refinement process, motion information of the first motion refinement process is used in the first reordering process.

Clause 30. The method of clause 29, wherein the first motion refinement process comprises at least one of: a template matching method or a bilateral matching method.

Clause 31. The method of clause 29, wherein the second motion refinement process comprises at least one of: a template matching method or a bilateral matching method.

Clause 32. The method of clause 1, wherein a plurality of motion refinement processes are applied in order and a last motion refinement process comprises a plurality of steps, and wherein motion information derived from a step which is before a last step in the last motion refinement process is used in the first reordering process.

Clause 33. The method of clause 1, wherein the processing procedure comprises a motion refinement process, the motion refinement process comprises a template matching (TM) and a multi-pass decoder side motion vector refinement (DMVR), and the TM is between a first-pass DMVR and a second-pass DMVR.

Clause 34. The method of clause 33, wherein motion information after the TM is used in the first reordering process, or wherein motion information after the first-pass DMVR is used in the first reordering process, or wherein motion information after the second-pass DMVR is used in the first reordering process.

Clause 35. The method of clause 33, wherein if refined motion information is used in the first reordering process, an early termination method used to skip the second-pass DMVR is not applied.

Clause 36. The method of clause 1, wherein if refined motion information is sub-block-based motion information, the refined motion information of one or more sub-blocks is used in the first reordering process.

Clause 37. The method of clause 36, wherein refined motion information of one of the one or more sub-blocks is used in the first reordering process.

Clause 38. The method of clause 36, wherein refined motion information of at least one of the followings is used in the first reordering process: a top-left sub-block, one of sub-blocks locating at a left block boundary, or one of sub-blocks locating at an above block boundary.

Clause 39. The method of clause 36, wherein refined motion information of a plurality of sub-blocks of the one or more sub-blocks is used in the first reordering process.

Clause 40. The method of clause 36, wherein motion information of all sub-blocks is averaged and used in the first reordering process.

Clause 41. The method of clause 40, wherein the motion information of all sub-blocks is weighted averaged, and wherein a set of weighting parameters depends on at least one of: a block dimension, a block size, a sub-block dimension, a sub-block size, or a distance between a sub-block and a template used in the first reordering process.

Clause 42. The method of clause 40, wherein at least one of the followings is used in the first reordering process: the motion information of sub-blocks at the above boundary and the motion information of sub-blocks at the left boundary.

Clause 43. The method of clause 1, wherein motion candidates are divided into a first number of sub-groups, and the first reordering process is applied within each sub-group, and wherein the first number is larger than 1.

Clause 44. The method of clause 43, wherein the number of motion candidates with each sub-group is same.

Clause 45. The method of clause 44, wherein the number of motion candidates is one of: 2, 3, 4, 5, 6, 7, 8, 9, and 10.

Clause 46. The method of clause 43, wherein a size of at least one sub-group is different from sizes of other sub-groups.

Clause 47. The method of clause 43, wherein a size of a first sub-group is larger than a size of other sub-groups, or wherein the size of the first sub-group is less than the size of other sub-groups.

Clause 48. The method of clause 43, wherein a size of sub-group is pre-defined.

Clause 49. The method of clause 43, wherein the motion candidates are divided into the first number of sub-groups based on a motion candidate type.

Clause 50. The method of clause 43, wherein a size of a sub-group is determined based on the number of available types of motion candidates.

Clause 51. The method of clause 1, wherein whether to and/or how to apply the first reordering process using refined motion information is indicated in the bitstream, or wherein whether to and/or how to apply the first reordering process using the refined motion information is determined dynamically, or whether to and/or how to apply the first reordering process using the refined motion information is depending on coding information.

Clause 52. The method of clause 51, wherein the first reordering process using the refined motion information is applied to the target block, and a size of the target block is larger than a first threshold, or wherein the first reordering process using the refined motion information is applied to the target block, and the size of the target block is less than a second threshold.

Clause 53. The method of clause 52, wherein the first threshold is one of: 8, 16, 32, 64, or 128, and wherein the second threshold is one of: 64, 128, 256, 512, 1024 or 2048.

Clause 54. The method of any of clauses 1-53, wherein the target block refers to one of: a color component, a sub-picture, a slice, a tile, a coding tree unit (CTU), a CTU row, groups of CTU, a coding unit (CU), a prediction unit (PU), a transform unit (TU), a coding tree block (CTB), a coding block (CB), a prediction block (PB), a transform block (TB), a block, a sub-block of a block, a sub-region within a block, or a region that contains more than one sample or pixel.

Clause 55. The method of any of clauses 1-53, wherein an indication of whether to and/or how to reorder the motion candidate list by applying the first reordering process to the motion candidate list after the processing procedure is indicated at one of the followings: a sequence level, a group of pictures level, a picture level, a slice level, or a tile group level.

Clause 56. The method of any of clauses 1-53, wherein an indication of whether to and/or how to reorder the motion candidate list by applying the first reordering process to the motion candidate list after the processing procedure is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

Clause 57. The method of any of clauses 1-53, wherein an indication of whether to and/or how to reorder the motion candidate list by applying the first reordering process to the motion candidate list after the processing procedure is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

Clause 58. The method of any of clauses 1-53, further comprising: determining, based on coded information of the target block, whether to and/or how to reorder the motion candidate list by applying the first reordering process to the motion candidate list after the processing procedure, the coded information including at least one of: a block size, a colour format, a single and/or dual tree partitioning, a colour component, a slice type, or a picture type.

Clause 59. A method of video processing, comprising: applying, during a conversion between a target block of a video and a bitstream of the target block, a reordering process using refined motion information to the target block that is coded with an inter mode with a decoder side motion vector refinement (DMVR), to reorder at least one of a first motion candidate list or a second motion candidate list, wherein a first set of motion candidates in the first motion candidate list are refined in one direction and a second set of motion candidates in the second motion candidate list are refined in another direction; and performing the conversion based on the at least one of the reordered first motion candidate list or the reordered second motion candidate list.

Clause 60. The method of clause 59, wherein the DMVR comprises at least one of: a single-side DMVR, or an adaptive DMVR.

Clause 61. The method of clause 60, wherein the single-side DMVR is a DMVR method wherein motion information is refined in one direction at a step of DMVR.

Clause 62. The method of clause 61, wherein the motion information is refined in one direction at a first pass of a multi-pass DMVR.

Clause 63. The method of clause 61, wherein the motion information is refined in one direction at one or more of: a first pass of a multi-pass DMVR or a second pass of the multi-pass DMVR.

Clause 64. The method of clause 59, wherein the inter mode is an adaptive DMVR.

Clause 65. The method of clause 59, wherein the reordering process is applied to reorder to the first motion candidate list and the second motion candidate list individually.

Clause 66. The method of clause 59, wherein the first motion candidate list and the second motion candidate list are combined, and wherein the reordering process is used to reorder the combined first and second motion candidate lists.

Clause 67. The method of clause 59, wherein the refined motion information is a block based motion vector (MV) of a first pass in multi-pass DMVR.

Clause 68. The method of any of clauses 59-67, wherein the target block refers to one of: a color component, a sub-picture, a slice, a tile, a coding tree unit (CTU), a CTU row, groups of CTU, a coding unit (CU), a prediction unit (PU), a transform unit (TU), a coding tree block (CTB), a coding block (CB), a prediction block (PB), a transform block (TB), a block, a sub-block of a block, a sub-region within a block, or a region that contains more than one sample or pixel.

Clause 69. The method of any of clauses 59-67, wherein an indication of whether to and/or how to apply the reordering process using the refined motion information to the target block that is coded with the inter mode with the DMVR is indicated at one of the followings: a sequence level, a group of pictures level, a picture level, a slice level, or a tile group level.

Clause 70. The method of any of clauses 59-67, wherein an indication of whether to and/or how to apply the reordering process using the refined motion information to the target block that is coded with the inter mode with the DMVR is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

Clause 71. The method of any of clauses 59-67, wherein an indication of whether to and/or how to apply the reordering process using the refined motion information to the target block that is coded with the inter mode with the DMVR is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

Clause 72. The method of any of clauses 59-67, further comprising: determining, based on coded information of the target block, whether to and/or how to apply the reordering process using the refined motion information to the target block that is coded with the inter mode with the DMVR, the coded information including at least one of: a block size, a colour format, a single and/or dual tree partitioning, a colour component, a slice type, or a picture type.

Clause 73. A method of video processing, comprising: updating, during a conversion between a target block of a video and a bitstream of the target block, at least one motion candidate list for an adaptive decoder side motion vector refinement (DMVR) by removing a set of redundant motion candidates from the at least one motion candidate list; and performing the conversion based on the at least one updated motion candidate list.

Clause 74. The method of clause 73, wherein the set of redundant motion candidates comprise motion candidates in a first motion candidate list with same motion information as one of motion candidates in a second motion candidate list.

Clause 75. The method of clause 74, wherein the first motion candidate list is a motion candidate list of a first direction, the second motion candidate list is a motion candidate list of a second direction.

Clause 76. The method of clause 74, wherein the first motion candidate list is a motion candidate list of a second direction, the second motion candidate list is a motion candidate list of a first direction.

Clause 77. The method of clause 73, wherein the set of redundant motion candidates comprises motion candidates after a first pass DMVR.

Clause 78. The method of any of clauses 73-77, wherein the target block refers to one of: a color component, a sub-picture, a slice, a tile, a coding tree unit (CTU), a CTU row, groups of CTU, a coding unit (CU), a prediction unit (PU), a transform unit (TU), a coding tree block (CTB), a coding block (CB), a prediction block (PB), a transform block (TB), a block, a sub-block of a block, a sub-region within a block, or a region that contains more than one sample or pixel.

Clause 79. The method of any of clauses 73-77, wherein an indication of whether to and/or how to remove the set of redundant motion candidates from the at least one motion candidate list for the adaptive DMVR is indicated at one of the followings: a sequence level, a group of pictures level, a picture level, a slice level, or a tile group level.

Clause 80. The method of any of clauses 73-77, wherein an indication of whether to and/or how to remove the set of redundant motion candidates from the at least one motion candidate list for the adaptive DMVR is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

Clause 81. The method of any of clauses 73-77, wherein an indication of whether to and/or how to remove the set of redundant motion candidates from the at least one motion candidate list for the adaptive DMVR is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

Clause 82. The method of any of clauses 73-77, further comprising: determining, based on coded information of the target block, whether to and/or how to remove the set of redundant motion candidates from the at least one motion candidate list for the adaptive DMVR, the coded information including at least one of: a block size, a colour format, a single and/or dual tree partitioning, a colour component, a slice type, or a picture type.

Clause 83. A method of video processing, comprising: generating, during a conversion between a target block of a video and a bitstream of the target block, a first number of motion candidates for a motion candidate list associated with the target block, and wherein a second number of motion candidates are allowed for the motion candidate list, and wherein the first number is larger than the second number; and performing the conversion based on the motion candidate list.

Clause 84. The method of clause 83, wherein the second number of motion candidates is selected and used in prediction or reconstruction.

Clause 85. The method of clause 83, wherein the second number of motion candidates is selected by reordering the first number of motion candidates, and wherein the selected second number of motion candidates are first M motion candidates of the first number of motion candidates after the reordering, and M is the second number.

Clause 86. The method of clause 83, wherein the first number is pre-defined, or wherein the first number is indicated in the bitstream, or wherein the first number is determined dynamically.

Clause 87. The method of clause 83, wherein the first number may be different for coding modes.

Clause 88. The method of clause 83, wherein the first number is one of: 2, 3, 4, 5, 6, 7, 8, 9, 10, 11, 12, 13, 14, 15, 16, 17, 18, 19, or 20.

Clause 89. The method of clause 83, wherein motion information derived from the motion candidate list is used in a reordering process.

Clause 90. The method of any of clauses 83-89, further comprising: applying a reordering process using refined motion information to the motion candidate list.

Clause 91. The method of any of clauses 83-90, wherein the target block refers to one of: a color component, a sub-picture, a slice, a tile, a coding tree unit (CTU), a CTU row, groups of CTU, a coding unit (CU), a prediction unit (PU), a transform unit (TU), a coding tree block (CTB), a coding block (CB), a prediction block (PB), a transform block (TB), a block, a sub-block of a block, a sub-region within a block, or a region that contains more than one sample or pixel.

Clause 92. The method of any of clauses 83-90, wherein an indication of whether to and/or how to generate the first number of motion candidates for the motion candidate list associated with the target block is indicated at one of the followings: a sequence level, a group of pictures level, a picture level, a slice level, or a tile group level.

Clause 93. The method of any of clauses 83-90, wherein an indication of whether to and/or how to generate the first number of motion candidates for the motion candidate list associated with the target block is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

Clause 94. The method of any of clauses 83-90, wherein an indication of whether to and/or how to generate the first number of motion candidates for the motion candidate list associated with the target block is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

Clause 95. The method of any of clauses 83-90, further comprising: determining, based on coded information of the target block, whether to and/or how to generate the first number of motion candidates for the motion candidate list associated with the target block, the coded information including at least one of: a block size, a colour format, a single and/or dual tree partitioning, a colour component, a slice type, or a picture type.

Clause 96. A method of video processing, comprising: generating, during a conversion between a target block of a video and a bitstream of the target block, a cost value in a refining process of a motion candidate list for the target block; applying a reordering process to the motion candidate list using the cost value; and performing the conversion based on the motion candidate list.

Clause 97. The method of clause 96, wherein the refining process comprises at least one of: a template matching (TM), a decoder side motion vector refinement (DMVR), or a multi-pass DMVR.

Clause 98. The method of clause 96, wherein a final cost value generated in the refining process for the motion candidate is stored.

Clause 99. The method of clause 96, wherein a first final cost value generated in a first refining process for a first motion candidate is compared a second final cost value generated in a second refining process for a second motion candidate in the reordering process.

Clause 100. The method of any of clauses 96-99, wherein the target block refers to one of: a color component, a sub-picture, a slice, a tile, a coding tree unit (CTU), a CTU row, groups of CTU, a coding unit (CU), a prediction unit (PU), a transform unit (TU), a coding tree block (CTB), a coding block (CB), a prediction block (PB), a transform block (TB), a block, a sub-block of a block, a sub-region within a block, or a region that contains more than one sample or pixel.

Clause 101. The method of any of clauses 96-99, wherein an indication of whether to and/or how to apply the reordering process to the motion candidate list using the cost value is indicated at one of the followings: a sequence level, a group of pictures level, a picture level, a slice level, or a tile group level.

Clause 102. The method of any of clauses 96-99, wherein an indication of whether to and/or how to apply the reordering process to the motion candidate list using the cost value is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

Clause 103. The method of any of clauses 96-99, wherein an indication of whether to and/or how to apply the reordering process to the motion candidate list using the cost value is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

Clause 104. The method of any of clauses 96-99, further comprising: determining, based on coded information of the target block, whether to and/or how to apply the reordering process to the motion candidate list using the cost value, the coded information including at least one of: a block size, a colour format, a single and/or dual tree partitioning, a colour component, a slice type, or a picture type.

Clause 105. A method of video processing, comprising: reordering, during a conversion between a target block of a video and a bitstream of the target block, a set of merge candidates for the target block according to a set of merge types; constructing an adaptive decoder side motion vector refinement (DMVR) merge candidate list using first N merge candidates of each of the set of merge types, and wherein N is an integer number; and performing the conversion based on the constructed adaptive DMVR merge candidate list.

Clause 106. The method of clause 105, wherein the set of merge types is at least one of: adjacent spatial, temporal, non-adjacent spatial, history-based motion vector prediction (HMVP), or pairwise.

Clause 107. The method of clause 105, wherein values of N are different for different merge types.

Clause 108. The method of clause 105, wherein N is set equal to 1 or 2 for temporal merge candidates.

Clause 109. The method of clause 105, wherein N is set equal to one of the followings for spatial merge candidates: 1, or 2, or 3, or 4, or 5, or 6, or 7, or 8, or 9, or 10.

Clause 110. The method of clause 105, wherein N is set equal to one of the followings for non-adjacent spatial merge candidates: 1, or 2, or 3, or 4, or 5, or 6, or 7, or 8, or 9, or 10.

Clause 111. The method of clause 105, wherein N is set equal to one of the followings for HMVP merge candidates: 1, or 2, or 3, or 4, or 5, or 6, or 7, or 8, or 9, or 10.

Clause 112. The method of clause 105, wherein N is set equal to one of the followings for pairwise merge candidates: 1, or 2, or 3, or 4, or 5, or 6, or 7, or 8, or 9, or 10.

Clause 113. The method of any of clauses 105-112, wherein the target block refers to one of: a color component, a sub-picture, a slice, a tile, a coding tree unit (CTU), a CTU row, groups of CTU, a coding unit (CU), a prediction unit (PU), a transform unit (TU), a coding tree block (CTB), a coding block (CB), a prediction block (PB), a transform block (TB), a block, a sub-block of a block, a sub-region within a block, or a region that contains more than one sample or pixel.

Clause 114. The method of any of clauses 105-112, wherein an indication of whether to and/or how to construct the adaptive DMVR merge candidate list using first N merge candidates of each of the set of merge types is indicated at one of the followings: a sequence level, a group of pictures level, a picture level, a slice level, or a tile group level.

Clause 115. The method of any of clauses 105-112, wherein an indication of whether to and/or how to construct the adaptive DMVR merge candidate list using first N merge candidates of each of the set of merge types is indicated in one of the following: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

Clause 116. The method of any of clauses 105-112, wherein an indication of whether to and/or how to construct the adaptive DMVR merge candidate list using first N merge candidates of each of the set of merge types is included in one of the following: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

Clause 117. The method of any of clauses 105-112, further comprising: determining, based on coded information of the target block, whether to and/or how to construct the adaptive DMVR merge candidate list using first N merge candidates of each of the set of merge types, the coded information including at least one of: a block size, a colour format, a single and/or dual tree partitioning, a colour component, a slice type, or a picture type.

Clause 118. The method of any of clauses 1-117, wherein the conversion includes encoding the target block into the bitstream.

Clause 119. The method of any of clauses 1-117, wherein the conversion includes decoding the target block from the bitstream.

Clause 120. An apparatus for processing video data comprising a processor and a non-transitory memory with instructions thereon, wherein the instructions upon execution by the processor, cause the processor to perform a method in accordance with any of clauses 1-119.

Clause 121. A non-transitory computer-readable storage medium storing instructions that cause a processor to perform a method in accordance with any of clauses 1-119.

Clause 122. A non-transitory computer-readable recording medium storing a bitstream of a video which is generated by a method performed by a video processing apparatus, wherein the method comprises: applying a processing procedure to at least one motion candidate in a motion candidate list for the target block; reordering the motion candidate list by applying a first reordering process to the motion candidate list after the processing procedure; and generating a bitstream of the target block based on the reordered motion candidate list.

Clause 123. A method for storing bitstream of a video, comprising: applying a processing procedure to at least one motion candidate in a motion candidate list for the target block; reordering the motion candidate list by applying a first reordering process to the motion candidate list after the processing procedure; generating a bitstream of the target block based on the reordered motion candidate list; and storing the bitstream in a non-transitory computer-readable recording medium.

Clause 124. A non-transitory computer-readable recording medium storing a bitstream of a video which is generated by a method performed by a video processing apparatus, wherein the method comprises: applying a reordering process using refined motion information to a target block of the video that is coded with an inter mode with a decoder side motion vector refinement (DMVR) to reorder at least one of a first motion candidate list or a second motion candidate list, wherein a first set of motion candidates in the first motion candidate list are refined in one direction and a second set of motion candidates in the second motion candidate list are refined in another direction; and generating a bitstream of the target block based on the at least one of the reordered first motion candidate list or the reordered second motion candidate list.

Clause 125. A method for storing bitstream of a video, comprising: applying a reordering process using refined motion information to a target block of the video that is coded with an inter mode with a decoder side motion vector refinement (DMVR) to reorder at least one of a first motion candidate list or a second motion candidate list, wherein a first set of motion candidates in the first motion candidate list are refined in one direction and a second set of motion candidates in the second motion candidate list are refined in another direction; generating a bitstream of the target block based on the at least one of the reordered first motion candidate list or the reordered second motion candidate list; and storing the bitstream in a non-transitory computer-readable recording medium.

Clause 126. A non-transitory computer-readable recording medium storing a bitstream of a video which is generated by a method performed by a video processing apparatus, wherein the method comprises: updating at least one motion candidate list for an adaptive decoder side motion vector refinement (DMVR) of a target block of the video by removing a set of redundant motion candidates from the at least one motion candidate list; and generating a bitstream of the target block based on the at least one updated motion candidate list.

Clause 127. A method for storing bitstream of a video, comprising: updating at least one motion candidate list for an adaptive decoder side motion vector refinement (DMVR) of a target block of the video by removing a set of redundant motion candidates from the at least one motion candidate list; generating a bitstream of the target block based on the at least one updated motion candidate list; and storing the bitstream in a non-transitory computer-readable recording medium.

Clause 128. A non-transitory computer-readable recording medium storing a bitstream of a video which is generated by a method performed by a video processing apparatus, wherein the method comprises: generating a first number of motion candidates for a motion candidate list associated with a target block of the video, and wherein a second number of motion candidates are allowed for the motion candidate list, and wherein the first number is larger than the second number; and generating a bitstream of the target block based on the motion candidate list.

Clause 129. A method for storing bitstream of a video, comprising: generating a first number of motion candidates for a motion candidate list associated with a target block of the video, and wherein a second number of motion candidates are allowed for the motion candidate list, and wherein the first number is larger than the second number; generating a bitstream of the target block based on the motion candidate list; and storing the bitstream in a non-transitory computer-readable recording medium.

Clause 130. A non-transitory computer-readable recording medium storing a bitstream of a video which is generated by a method performed by a video processing apparatus, wherein the method comprises: generating a cost value in a refining process of a motion candidate list for a target block of the video; applying a reordering process to the motion candidate list using the cost value; and generating a bitstream of the target block based on the motion candidate list.

Clause 131. A method for storing bitstream of a video, comprising: generating a cost value in a refining process of a motion candidate list for a target block of the video; applying a reordering process to the motion candidate list using the cost value; generating a bitstream of the target block based on the motion candidate list; and storing the bitstream in a non-transitory computer-readable recording medium.

Clause 132. A non-transitory computer-readable recording medium storing a bitstream of a video which is generated by a method performed by a video processing apparatus, wherein the method comprises: reordering a set of merge candidates for a target block of the video according to a set of merge types; constructing an adaptive decoder side motion vector refinement (DMVR) merge candidate list using first N merge candidates of each of the set of merge types, and wherein N is an integer number; and generating a bitstream of the target block based on the constructed adaptive DMVR merge candidate list.

Clause 133. A method for storing bitstream of a video, comprising: reordering a set of merge candidates for a target block of the video according to a set of merge types; constructing an adaptive decoder side motion vector refinement (DMVR) merge candidate list using first N merge candidates of each of the set of merge types, and wherein N is an integer number; generating a bitstream of the target block based on the constructed adaptive DMVR merge candidate list; and storing the bitstream in a non-transitory computer-readable recording medium.

Example Device

Figure 47:
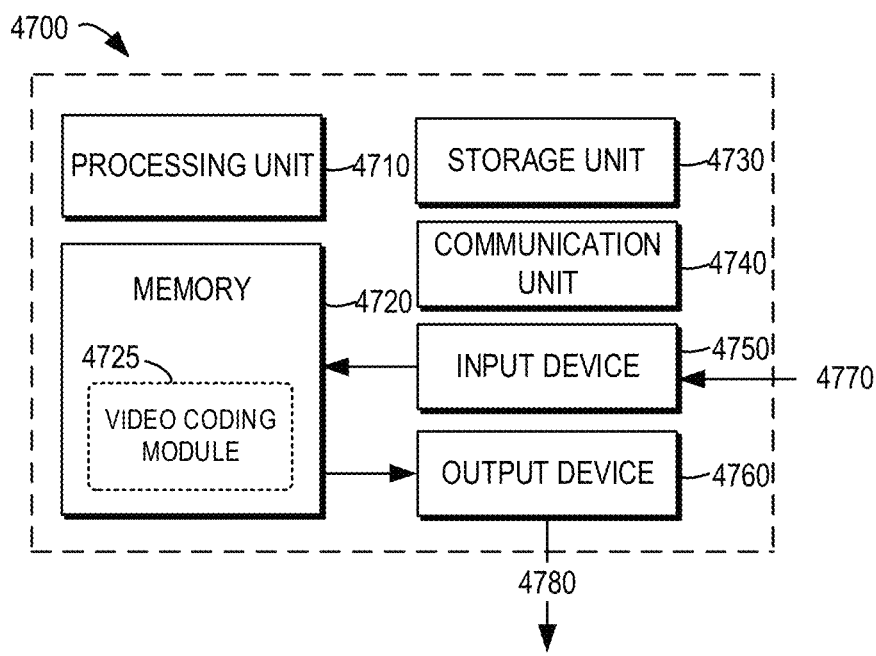
FIG. 47 illustrates a block diagram of a computing device in which various embodiments of the present disclosure can be implemented.

FIG. 47 illustrates a block diagram of a computing device 4700 in which various embodiments of the present disclosure can be implemented. The computing device 4700 may be implemented as or included in the source device 110 (or the video encoder 114 or 200) or the destination device 120 (or the video decoder 124 or 300).

It would be appreciated that the computing device 4700 shown in FIG. 47 is merely for purpose of illustration, without suggesting any limitation to the functions and scopes of the embodiments of the present disclosure in any manner.

As shown in FIG. 47, the computing device 4700 includes a general-purpose computing device 4700. The computing device 4700 may at least comprise one or more processors or processing units 4710, a memory 4720, a storage unit 4730, one or more communication units 4740, one or more input devices 4750, and one or more output devices 4760.

In some embodiments, the computing device 4700 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 4700 can support any type of interface to a user (such as "wearable" circuitry and the like).

The processing unit 4710 may be a physical or virtual processor and can implement various processes based on programs stored in the memory 4720. In a multi-processor system, multiple processing units execute computer executable instructions in parallel so as to improve the parallel processing capability of the computing device 4700. The processing unit 4710 may also be referred to as a central processing unit (CPU), a microprocessor, a controller or a microcontroller.

The computing device 4700 typically includes various computer storage medium. Such medium can be any medium accessible by the computing device 4700, including, but not limited to, volatile and non-volatile medium, or detachable and non-detachable medium. The memory 4720 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 4730 may be any detachable or non-detachable medium and may include a machine-readable medium such as a memory, flash memory drive, magnetic disk or another other media, which can be used for storing information and/or data and can be accessed in the computing device 4700.

The computing device 4700 may further include additional detachable/non-detachable, volatile/non-volatile memory medium. Although not shown in FIG. 47, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 4740 communicates with a further computing device via the communication medium. In addition, the functions of the components in the computing device 4700 can be implemented by a single computing cluster or multiple computing machines that can communicate via communication connections. Therefore, the computing device 4700 can operate in a networked environment using a logical connection with one or more other servers, networked personal computers (PCs) or further general network nodes.

The input device 4750 may be one or more of a variety of input devices, such as a mouse, keyboard, tracking ball, voice-input device, and the like. The output device 4760 may be one or more of a variety of output devices, such as a display, loudspeaker, printer, and the like. By means of the communication unit 4740, the computing device 4700 can further communicate with one or more external devices (not shown) such as the storage devices and display device, with one or more devices enabling the user to interact with the computing device 4700, or any devices (such as a network card, a modem and the like) enabling the computing device 4700 to communicate with one or more other computing devices, if required. Such communication can be performed via input/output (I/O) interfaces (not shown).

In some embodiments, instead of being integrated in a single device, some or all components of the computing device 4700 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 4700 may be used to implement video encoding/decoding in embodiments of the present disclosure. The memory 4720 may include one or more video coding modules 4725 having one or more program instructions. These modules are accessible and executable by the processing unit 4710 to perform the functionalities of the various embodiments described herein.

In the example embodiments of performing video encoding, the input device 4750 may receive video data as an input 4770 to be encoded. The video data may be processed, for example, by the video coding module 4725, to generate an encoded bitstream. The encoded bitstream may be provided via the output device 4760 as an output 4780.

In the example embodiments of performing video decoding, the input device 4750 may receive an encoded bitstream as the input 4770. The encoded bitstream may be processed, for example, by the video coding module 4725, to generate decoded video data. The decoded video data may be provided via the output device 4760 as the output 4780.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method of video processing, comprising: applying, during a conversion between a target block of a video and a bitstream of the target block, a processing procedure to at least one motion candidate in a motion candidate list; reordering the motion candidate list by applying a first reordering process to the motion candidate list after the processing procedure; and performing the conversion based on the reordered motion candidate list, wherein if the at least one motion candidate in the motion candidate list is modified by a motion refinement process for the target block, the motion candidate list is reordered using refined motion information, or wherein the motion candidate list is not reordered before the first reordering process is applied.

2. The method of claim 1, wherein the processing procedure comprises at least one of:
   a modification process,
   a motion refinement process, or
   a second reordering process.

3. The method of claim 2, wherein the second reordering process is applied to the motion candidate list before the first reordering process.

4. The method of claim 3, wherein the motion candidate list is reordered using original motion information, during a construction of the motion candidate list in the second reordering process.

5. The method of claim 2, wherein the motion refinement process comprises at least one of:
   a template matching based motion refinement, or
   a bilateral matching based motion refinement.

6. The method of claim 2, wherein a simplified version of the motion refinement process is applied.

7. The method of claim 6, wherein if a template matching is used as the motion refinement process, a template size is set to 1 or 2.

8. The method of claim 1, wherein the processing procedure is a motion refinement process, and
   wherein refined motion information used in the first reordering process is final motion information of the motion refinement process.

9. The method of claim 8, wherein if the motion refinement process comprises a plurality of steps, motion information after a last step in the motion refinement process is used in the first reordering process.

10. The method of claim 9, wherein the plurality of steps refine motion information at different resolutions of motion vector.

11. The method of claim 10, wherein an integer resolution motion vector is refined to be a fractional resolution motion vector, or
   wherein a fractional resolution motion vector is refined to be a fractional resolution motion vector, or
   wherein the different resolutions comprise at least one of: 16-pel, 8-pel, 4-pel, 2-pel, 1-pel, ½-pel, ¼-pel, ⅛-pel, 1/16-pel, 1/32-pel, or 1/64-pel.

12. The method of claim 9, wherein the plurality of steps comprises different searching shapes to refine the motion vector in a template matching.

13. The method of claim 12, wherein motion information after a step of diamond searching shape of the template matching is used in the first reordering process.

14. The method of claim 9, wherein a resolution of motion vector to be used is dependent on a syntax element indicating the resolution of motion vector of a motion candidate, or
   wherein if early termination is used in the motion refinement process, motion information output related to the early termination is used in the first reordering process.

15. The method of claim 1, wherein a plurality of motion refinement processes are applied to the target block, and the plurality of motion refinement processes are applied in order, and
   wherein motion information derived after a last motion refinement process is used in the first reordering process.

16. The method of claim 1, wherein the conversion includes encoding the target block into the bitstream, or
   wherein the conversion includes decoding the target block from the bitstream.

17. An apparatus for processing video data comprising a processor and a non-transitory memory with instructions thereon, wherein the instructions upon execution by the processor, cause the processor to perform acts comprising: applying, during a conversion between a target block of a video and a bitstream of the target block, a processing procedure to at least one motion candidate in a motion candidate list; reordering the motion candidate list by applying a first reordering process to the motion candidate list after the processing procedure; and performing the conversion based on the reordered motion candidate list, wherein if the at least one motion candidate in the motion candidate list is modified by a motion refinement process for the target block, the motion candidate list is reordered using refined motion information, or wherein the motion candidate list is not reordered before the first reordering process is applied.

18. A non-transitory computer-readable storage medium storing instructions that cause a processor to perform acts comprising: applying, during a conversion between a target block of a video and a bitstream of the target block, a processing procedure to at least one motion candidate in a motion candidate list; reordering the motion candidate list by applying a first reordering process to the motion candidate list after the processing procedure; and performing the conversion based on the reordered motion candidate list, wherein if the at least one motion candidate in the motion candidate list is modified by a motion refinement process for the target block, the motion candidate list is reordered using refined motion information, or wherein the motion candidate list is not reordered before the first reordering process is applied.

19. A non-transitory computer-readable recording medium storing a bitstream of a video which is generated by a method performed by a video processing apparatus, wherein the method comprises: applying a processing procedure to at least one motion candidate in a motion candidate list for the target block; reordering the motion candidate list by applying a first reordering process to the motion candidate list after the processing procedure; and generating a bitstream of the target block based on the reordered motion candidate list, wherein if the at least one motion candidate in the motion candidate list is modified by a motion refinement process for the target block, the motion candidate list is reordered using refined motion information, or wherein the motion candidate list is not reordered before the first reordering process is applied.

* * * * *